(12) United States Patent
Bhatt et al.

(10) Patent No.: US 10,884,598 B2
(45) Date of Patent: Jan. 5, 2021

(54) ANALYTICS FOR A BOT SYSTEM

(71) Applicant: Oracle International Corporation, Redwood Shores, CA (US)

(72) Inventors: Neerja Bhatt, Sunnyvale, CA (US); Vinay K. Gandhi, Cupertino, CA (US); Ganesh Kumar, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 132 days.

(21) Appl. No.: 16/147,249

(22) Filed: Sep. 28, 2018

(65) Prior Publication Data
US 2019/0102078 A1 Apr. 4, 2019

Related U.S. Application Data

(60) Provisional application No. 62/566,219, filed on Sep. 29, 2017, provisional application No. 62/623,645, filed on Jan. 30, 2018.

(51) Int. Cl.
| | |
|---|---|
| *G06F 40/30* | (2020.01) |
| *G06F 3/0484* | (2013.01) |
| *G06F 3/0482* | (2013.01) |
| *G06F 9/451* | (2018.01) |
| *G06F 3/16* | (2006.01) |
| *G06N 20/00* | (2019.01) |

(Continued)

(52) U.S. Cl.
CPC ........ *G06F 3/04847* (2013.01); *G06F 3/0481* (2013.01); *G06F 3/0482* (2013.01); *G06F 3/167* (2013.01); *G06F 9/451* (2018.02); *G06F 40/30* (2020.01); *G06N 20/00* (2019.01); *G06N 3/006* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,577,671 | B1* | 11/2013 | Barve | G06F 16/2457 704/9 |
| 10,037,768 | B1* | 7/2018 | Akkiraju | H04M 3/2236 |

(Continued)

OTHER PUBLICATIONS

Chen, "Hierarchical SVM", Available on internet at: http://www.csr.utexas.edu/hyperspectral/oldwebsite/yangchi/HSVM.htm, accessed from the internet on Jul. 3, 2018, 1 page.

(Continued)

*Primary Examiner* — Hien L Duong
(74) *Attorney, Agent, or Firm* — Kilpatrick Townsend & Stockton LLP

(57) ABSTRACT

The present disclosure relates generally to techniques for monitoring and improving a bot system. An analytic system is integrated with a bot system for monitoring, analyzing, visualize, and improving the performance of the bot system. The analytic system monitors events occurred in conversations between end users and the bot system, aggregates and analyzes the collected events, and provides information regarding the conversations graphically on a graphic user interface at different generalization levels. The analytic system can also provide suggestions, options, or other information for improving the bot system through the graphic user interface.

19 Claims, 38 Drawing Sheets

(51) Int. Cl.
    *G06F 3/0481*     (2013.01)
    *G06N 3/00*     (2006.01)

(56) References Cited

U.S. PATENT DOCUMENTS

| | | | |
|---|---|---|---|
| 2004/0162724 A1* | 8/2004 | Hill | G10L 15/1822 704/231 |
| 2009/0292778 A1* | 11/2009 | Makar | G06F 16/00 709/206 |
| 2011/0213642 A1* | 9/2011 | Makar | G06F 40/30 705/7.38 |
| 2012/0041903 A1* | 2/2012 | Beilby | H04L 51/02 706/11 |
| 2012/0323682 A1 | 12/2012 | Shanbhag et al. | |
| 2014/0122083 A1* | 5/2014 | Xiaojiang | H04L 51/02 704/270.1 |
| 2014/0122619 A1* | 5/2014 | Duan | G06F 40/20 709/206 |
| 2014/0195378 A1* | 7/2014 | Sri | G10L 15/142 705/26.41 |
| 2014/0200891 A1* | 7/2014 | Larcheveque | G06F 16/3329 704/243 |
| 2015/0256675 A1* | 9/2015 | Sri | H04L 12/1827 379/265.09 |
| 2016/0117726 A1 | 4/2016 | Lee | |
| 2016/0196820 A1* | 7/2016 | Williams | G10L 15/18 704/244 |
| 2016/0284010 A1 | 9/2016 | Zimmerman et al. | |
| 2016/0299973 A1* | 10/2016 | Oakeson | G06F 16/9535 |
| 2017/0124457 A1* | 5/2017 | Jerram | G06Q 40/04 |
| 2017/0228366 A1* | 8/2017 | Bui | G06F 40/247 |
| 2017/0293834 A1* | 10/2017 | Raison | G06F 40/35 |
| 2017/0357638 A1* | 12/2017 | Schlesinger | G10L 15/265 |
| 2018/0203755 A1* | 7/2018 | Das | G06F 11/0793 |
| 2018/0337872 A1* | 11/2018 | Fawcett | G06F 16/3329 |
| 2018/0358001 A1* | 12/2018 | Amid | G06F 16/3329 |
| 2019/0005023 A1* | 1/2019 | Olsen | G06F 16/93 |
| 2019/0068527 A1* | 2/2019 | Chen | H04L 51/16 |
| 2019/0103095 A1* | 4/2019 | Singaraju | G06N 20/10 |

OTHER PUBLICATIONS

Chen et al., "Integrating Support Vector Machines in a Hierarchical Output Space Decomposition Framework", IEEE, vol. 2, Sep. 2004, pp. 949-952.
Marchick, "VoiceLabs Path Explorer for Amazon Alexa and Google Assistant Analytics" http://voicelabs.co/2017/03/23/voicelabs-path-explorer-dive-deeper-in-voice-pathing-for-amazon-alexa-and-google-assistant-analytics/, Mar. 23, 2017, accessed from the internet on Oct. 23, 2018, 6 pages.
U.S. Appl. No. 16/147,270, filed Sep. 28, 2018, 87 pages.
U.S. Appl. No. 16/147,273, filed Sep. 28, 2018, 90 pages.
U.S. Appl. No. 16/147,266, filed Sep. 28, 2018, 77 pages.
Oracle Intelligent Bots, Oracle Mobile Cloud Enterprise—Data Sheet, Integrated Cloud Application & Platform Service, Copyright Sep. 2017, 5 pages.
Building Intelligent Chatbots, Oracle Developers, https://developer.oracle.com/chatbots, accessed from the internet on Oct. 31, 2018, 5 pages.
Uliyar, A Primer: Oracle Intelligent Bots, Powered by artificial intelligent, White Paper, Sep. 2017, 28 pages.
Actionable Chatbot & Voice Analytics, Dashbot, Available online at: https://www.dashbot.io/, Accessed from Internet on Mar. 14, 2019, 9 pages.
Analytics for Conversations, Botanalytics, Available online at: https://botanalytics.co/, Accessed from Internet on Mar. 14, 2019, 1 page.
Bot Analytics: Leverage the Power of Data to Better Understand your Customers, Recast.AI, SAP Conversational AI, Available online at: https://cai.tools.sap/bot-analytics, Accessed from Internet on Mar. 14, 2019, 3 pages.
Build Your Best Customer Service Virtual Agent, Google Chatbase, Available online at: https://www.chatbase.com/welcome, Accessed from Internet on Mar. 14, 2019, 8 pages.
Cart Closer, Conversions on Demand—Products, Available online at: https://www.conversionsondemand.com/cart-closer.php, Accessed from Internet on Mar. 14, 2019, 7 pages.
Johnson, Howdy Brings bCRM to its Botkit to Manage Marketing Campaigns for Slack and Facebook Messenger, Available online at: https://venturebeat.com/2016/12/22/howdy-brings-bcrm-to-its-botkit-to-manage-marketing-campaigns-for-slack-and-facebook-messenger/, Dec. 22, 2016, 7 pages.
Facebook Analytics, Drive Growth to Web, Mobile & More, Available online at: https://analytics.facebook.com/, Accessed from Internet on Mar. 14, 2019, 4 pages.
Features and Reports Tour, Dashbot, Available online at: https://www.dashbot.io/tour, Accessed from Internet on Mar. 14, 2019, 2 pages.
Smart Report, Botanalytics, Build Better Sots with AI powered analytics, Available online at: https://botanalytics.co/smart-report, Accessed from Internet on Mar. 14, 2019, 5 pages.
Beverly, New: Access Transcripts from Multiple Reports, Google Chatbase, Available online at: http://blog.chatbase.com/2018/04/new-access-transcripts-from-multiple.html, Apr. 16, 2018, 3 pages.
Ezer, Web Tracking for Yahoo Cart and Browse Abandonment, Remarkety, Support & Knowledge Base, Available online at: https://support.remarkety.com/hc/en-us/articles/115003181803-Web-Tracking-for-Yahoo-Cart-and-Browse-Abandonment-?, Jun. 28, 2017, 2 pages.
Lee, The Practical Guide to Chatbot Metrics and Analytics, GrowthBot Blog, Available online at: https://blog.growthbot.org/the-practical-guide-to-chatbot-metrics-and-analytics, Jun. 28, 2018, 9 pages.
Marchick, Voice Pathing—Visualizing the Conversation, VoiceLabs, Medium, Available online at: https://medium.com/@marchick/voice-pathing-visualizing-the-conversation-6210f4ab9919, Sep. 7, 2016, 6 pages.
Phillips, Chatbot Analytics 101: The Essential Metrics You Need to Track, Chatbots Magazine, Available online at: https://chatbotsmagazine.com/chatbot-analytics-101-e73ba7013f00, Jun. 8, 2018, 8 pages.
Ronen, Chatbase Now Generally Available to Help Bot Builders Create Better User Experiences, Chatbase Blog, Available online at: http://blog.chatbase.com/2017/11/chatbase-now-generally-available-to.html, Nov. 16, 2017, 5 pages.

* cited by examiner

| Icon | Name | Description | Sizes |
|---|---|---|---|
|  | Bot | Main context navigation to Bot report. | 24x24 selected, unselected |
|  | Intents | Main context navigation to Intents report | 24x24 selected, unselected |
|  | Path Visualizer | Main context navigation to Path Visualizer | 24x24 selected, unselected |
|  | Conversations | Main context navigation to Conversations. Also used to navigate to individual conversations from main conversations page. | 24x24 selected, unselected. 48x48 single state in conversations page. |
|  | Time | Time taken to complete path | 32x32 single state. |
|  | Subway | Length of path | 32x32 single state |
|  | Language | Filter icon for language. | 48x48 single state |
|  | Channel | Filter icon for channel | 48x48 single state |

FIG. 24

ANALYTICS FOR A BOT SYSTEM

CROSS-REFERENCE TO RELATED APPLICATIONS

The present application claims the benefit of and priority to U.S. Provisional Patent Application No. 62/566,219, filed on Sep. 29, 2017, entitled "Techniques For Improving A Bot System," and U.S. Provisional Patent Application No. 62/623,645, filed on Jan. 30, 2018, entitled "PATH VISUALIZER FOR A BOT SYSTEM," which are herein incorporated by reference in their entireties for all purposes.

BACKGROUND

Many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

SUMMARY

The present disclosure relates generally to techniques for analyzing and improving a bot system, and more particularly to an analytic system integrated with a bot system for monitoring, analyzing, visualizing, diagnosing, and improving the performance of the bot system. Various inventive embodiments are described herein, including methods, systems, non-transitory computer-readable storage media storing programs, code, or instructions executable by one or more processors, and the like.

According to some embodiments, the analytic system may monitor events occurred in conversations between end users and the bot system, aggregate and analyze the collected events, and provide information regarding the conversations graphically on a graphic user interface at different generalization levels, such as from an overall summary of all conversations to different categories of conversations, and down to individual conversations. For example, the graphic user interface may display options to filter or select certain types of conversations or individual conversations, and display information regarding the selected types of conversations or individual conversations graphically, for example, by visualizing the paths of conversations. The analytic system may also provide suggestions, options, or other information for improving the bot system.

In some embodiments, a graphical user interface (GUI) may display information related to individual and/or aggregated end user conversations or other interactions with a bot system as paths that include different nodes representing different stages or states of the conversations. For example, end user conversations with the bot system may be represented by paths showing the transitions from state to state, where each state may be represented by a node on the path. Statistics of the user conversations with the bot system may be generated and displayed graphically through the GUI. The visualization of conversations as paths by the analytic system may allow an administrator or developer of the bot system to filter or select groups of conversations with the bot system based on different criteria. The analytic system may also provide options for the administrator or developer of the bot system to select and review individual conversations of interest. The visualized path information may allow the administrator or developer of the bot system to visually monitor and analyze how end users are interacting with the bot system and how the bot system performs during the conversations with the end users to identify underperforming elements of and possible improvements to the bot system.

Thus, the analytic system may provide, through a graphic user interface, information regarding end user conversations with the bot system at different generalization levels, including all conversations, groups of conversations meeting certain criteria, conversations associated with specific intents or end states, and individual conversations. As such, the analytic system may allow the administrator or developer of the bot system to identify specific end user utterances and end user intents associated with incomplete or unsuccessful conversations, thus identifying and improving underperforming elements of the bot system. By analyzing and improving the performance of the bot system, user experience from interactions with the bot system may be improved.

In certain embodiments, a system may include an event collector, an analytic engine, and a graphic user interface server communicatively coupled to the analytic engine. The event collector may be configurable to collect one or more attributes for one or more events associated with a set of conversations with a bot system. The analytic engine may be configured to use one or more filtering criteria selected by a user to select one or more conversations from the set of conversations based upon the one or more attributes for the one or more events and generate one or more reports for the selected one or more conversations. The graphic user interface (GUI) server may be configured to display, graphically on a GUI, a first report from the one or more reports and one or more user-selectable items associated with the first report, where the one or more user-selectable items may include at least one element of the first report, and at least one of the one or more user-selectable items may correspond to a filtering criterion of the one or more filtering criteria. The GUI server may also receive a user selection of the one or more user-selectable items, and display, graphically on the GUI based upon the user selection, a second report from the one or more reports.

In certain embodiments, a computer-implemented method may include collecting, by an event collector of an analytic system, one or more attributes for one or more events associated with a set of conversations with a bot system; selecting, by an analytic engine of the analytic system using one or more filtering criteria selected by a user, one or more conversations from the set of conversations based upon the one or more attributes for the one or more events; and generating, by the analytic engine of the analytic system, one or more reports for the selected one or more conversations. The computer-implemented method may also include displaying, graphically on a GUI, a first report from the one or more reports and one or more user-selectable items associated with the first report, where the one or more user-selectable items may include at least one element of the first report, and at least one of the one or more user-selectable items corresponds to a filtering criterion of the one or more filtering criteria. The computer-implemented method may further include receiving a user selection of the one or more user-selectable items through the GUI, and displaying a second report from the one or more reports graphically on the GUI based upon the user selection. In some embodiments, the computer-implemented method may also include receiving a user input through a user-selectable item of the one or more user-selectable items, and training the bot system based upon the user input.

In certain embodiments, a system may include one or more processors, and a memory coupled to the one or more processors and storing instructions. The instructions, when executed by the one or more processors, may cause the system to collect, by an event collector of the system, one or more attributes for one or more events associated with a set of conversations with a bot system; select, by an analytic engine of the system using one or more filtering criteria selected by a user, one or more conversations from the set of conversations based upon the one or more attributes for the one or more events; and generate, by the analytic engine, one or more reports for the selected one or more conversations. The instructions may also cause the system to display, graphically on a GUI, a first report from the one or more reports and one or more user-selectable items associated with the first report, where the one or more user-selectable items may include at least one element of the first report, and at least one of the one or more user-selectable items may correspond to a filtering criterion of the one or more filtering criteria.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Illustrative examples are described in detail below with reference to the following figures.

FIG. 24 depicts some icons used in some of the graphic user interface screens described herein.

DETAILED DESCRIPTION

Figure 1:
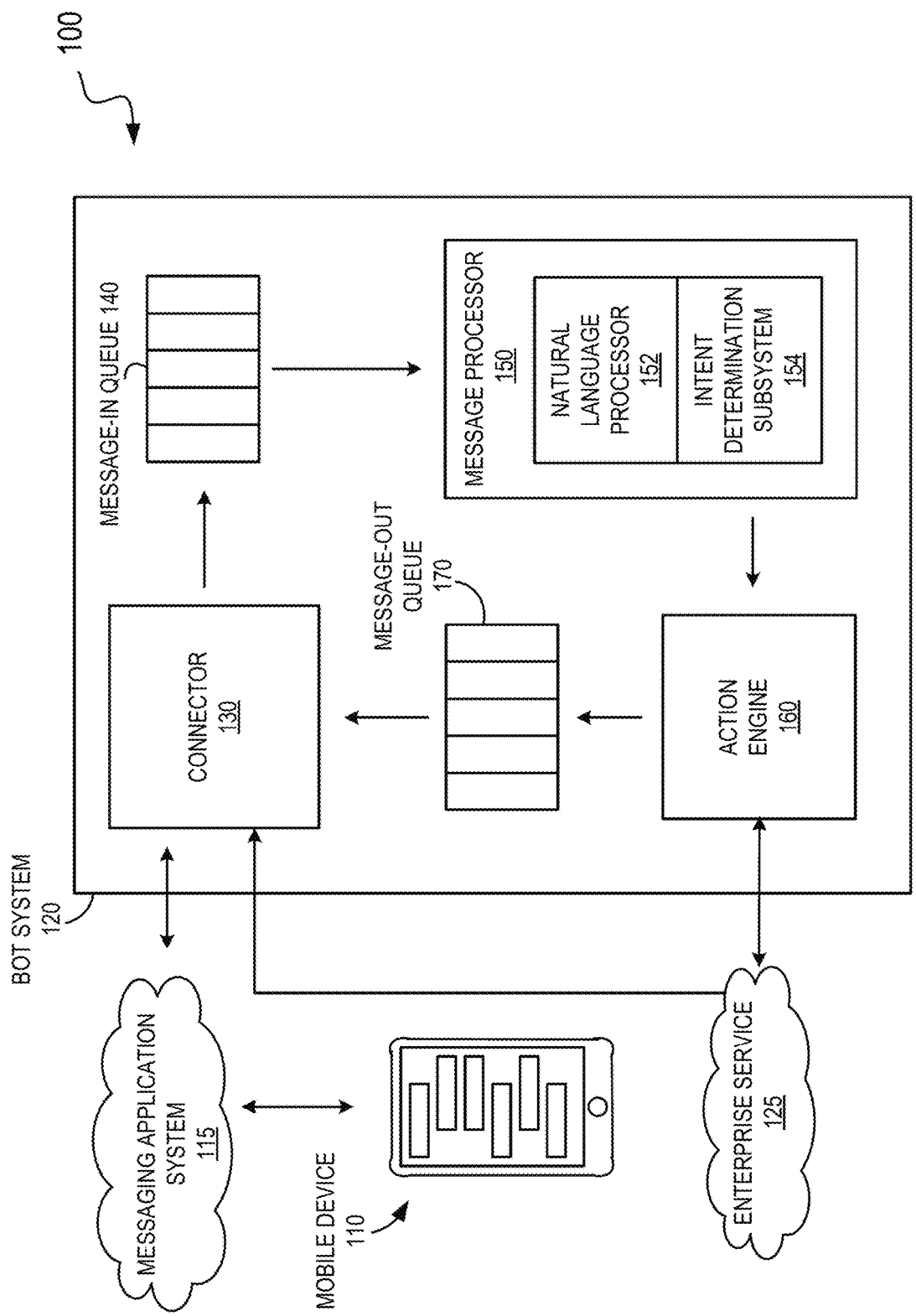
FIG. 1 depicts a distributed system that implements a bot system for communicating with end users using a messaging application according to certain embodiments.

The present disclosure relates generally to techniques for analyzing and improving a bot system, and more particularly to an analytic system integrated with a bot system for monitoring, analyzing, visualizing, diagnosing, and improving the performance of the bot system. Various inventive embodiments are described herein, including methods, systems, non-transitory computer-readable storage media storing programs, code, or instructions executable by one or more processors, and the like.

Enterprises may want to create bot systems for various purposes. A bot system may include one or more user intent classification engines for identifying end user intents based on end user utterances, and one or more dialog engines for intelligently and contextually responding to user utterances according to the determined end user intents. However, building the bot system, such as the user intent classification engine that can determine the end users' intents based upon user utterances, is a challenging task in part due to the subtleties and ambiguity of natural languages and the dimension of the input space (e.g., possible user utterances) and the size of the output space (number of intents). As such, a new bot system may need to be monitored, debugged, and modified in order to improve the performance of the bot system and user experience with the bot system. In many cases. it may be difficult to more specifically identify the root causes of the lower than desired performance of the bot system and determine how to improve the bot system without an analytics or optimization tool.

According to some embodiments, an analytic system may be integrated with a bot system. The analytic system may monitor events occurred during conversations between end users and the bot system, aggregate and analyze the collected events, and provide information regarding the conversations graphically on a graphic user interface at different generalization levels, such as from all conversations to different categories of conversations, and down to individual conversations. For example, the graphic user interface may display options to filter or select certain types of conversations or individual conversations, and display the selected information graphically by, for example, visualizing the paths of the conversations. The analytic system may also provide information regarding unsuccessful conversations and provide suggestions, options, or other information for improving the bot system.

In some embodiments, a graphical user interface (GUI) may display information related to individual and/or aggregated end user conversations with a bot system as paths that include different nodes representing different stages or states of the conversations. For example, end user conversations with the bot system may be represented by paths showing the transitions from state to state, where each state may be represented by a node on the path. Statistics of the user conversation with the bot system may be generated and displayed graphically through the GUI. The path visualization by the analytic system may allow an administrator or developer to filter or select groups of end user conversations with the bot system based on different criteria. The analytic system may also provide options for the administrator or developer of the bot system to select and review individual conversations of interest. The visualized path information may allow an administrator or developer of the bot system to visually monitor and analyze how end users are interacting with the bot system and how the bot system performs during the conversations to identify underperforming elements of and possible improvements to the bot system.

As described above, the analytic system may provide, through a graphic user interface, information regarding end user conversations with the bot system at different generalization levels, including all conversations, conversations meeting certain criteria, conversations associated with specific intents or end states, and individual conversations. As such, the analytic system may allow the administrator or developer of the bot system to identify specific end user utterances and intents associated with incomplete or unsuccessful conversations, thus identifying and improving underperforming elements of the bot system. By analyzing and improving the performance of the bot system, end user experience with the bot system may be improved.

In some embodiments, data used for the analytics may be produced by a bot system as described in U.S. patent application Ser. No. 15/462,729, filed on Mar. 17, 2017, entitled "INTERNET CLOUD-HOSTED NATURAL LANGUAGE INTERACTIVE MESSAGING SYSTEM SESSIONIZER" and U.S. Provisional Patent Application No. 62/566,219, filed on Sep. 29, 2017, entitled "TECHNIQUES FOR IMPROVING A BOT SYSTEM," each of which is incorporated herein by reference for all intents and purposes. At least some of the relevant material maybe described below.

As used herein, an utterance or a message may refer to one or more sentences exchanged during a conversation, where a conversation may refer to a communication session that may include one or more utterances or messages. A conversation may include one or more stages or states. A conversation flow may be an abstraction of multiple conversations that include the same stages or states and the same transitions from stage (or state) to stage (or state). Each conversation may be a specific instance of a corresponding conversation flow. A conversation flow may be represented by a linear path that may include multiple nodes and connections between nodes. Each nodes may correspond to a state or stage of a conversation or a conversation flow, and each connection may correspond to a transition from one state to a next state in the conversation flow. A state or stage of a conversation or conversation flow may be associated with a state of a state machine maintained by a bot system for conducting conversations with other bot systems or persons. In some cases, a state may correspond to an intent or goal of an end user. As used herein, an end user may refer to an end user of a bot system, such as a person or another entity that engages in a conversation with a bot system through a messaging application or platform. For example, an end user may be a customer or a client of an enterprise that owns the bot system. As used herein, a user of an analytic system may refer to an owner, an operator, an administrator, or a developer of a bot system.

In the following description, for the purposes of explanation, specific details are set forth in order to provide a thorough understanding of examples of the disclosure. However, it will be apparent that various examples may be practiced without these specific details. The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like) but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The word "example" or "exemplary" is used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some examples, the systems may be configured as a distributed system where one or more components of the system are distributed across one or more networks in a cloud computing system.

Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

A bot (also referred to as a chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, a person of ordinary skill in the art will recognize that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input, the bot may determine the end user's intent in order to determine the appropriate next action to take.

An intent may include a goal that the end user would like to accomplish. An intent maps an end user input to actions that a backend system should perform for the end user. Therefore, based on the phrases uttered by the end user in natural language, the bot would map the end user utterance to a specific use case or job, such as ordering pizza, getting account balance, transferring money, making a purchase, making a return, etc. Human conversations are often non-linear in nature. End users may often branch into different states during a conversation. For example, if an end user wants to transfer funds from account A to a recipient, the end user may start a conversation with the bot system by, for example, asking the bot to pay the recipient for dinner. The bot may respond with, for example, "from which account?". The end user may pick a checking account but may then realize that he or she is not sure about the balance in the account. Thus, the end user may switch context to ask for balance and recent transactions, and so on. In other words, the end user may trigger changes in the flow and states, for example, from transferring money to checking balance, and then to recent transactions. At a certain time point, the end user may decide to return to the original intent—paying the recipient. Thus, one task of the bot system is to dynamically determine end user intents from natural language utterances.

A bot may use a natural language processing (NLP) engine and/or a machine learning model (e.g., an intent classifier) to map end user utterances to specific intents. For example, a machine learning based NLP engine may learn to understand and categorize the natural language conversations from the end users and to extract necessary information from the conversations to be able to take precise actions, such as performing a transaction or looking up data from a backend system of record.

FIG. 1 depicts a distributed system 100 that may be used to implement a bot system for communicating with an end user using a messaging application according to certain embodiments. System 100 may include a bot system 120, one or more messaging application systems 115, and one or more end user devices, such as one or more mobile devices 110. In some examples, the messaging application may be installed on an electronic device (e.g., a desktop computer, a laptop, mobile device 110, or the like). While the discussion herein will reference a mobile device and a messaging application, a person of ordinary skill in the art will recognize that any electronic device may be used and any messaging platform or messaging application may be used, such as FACEBOOK® Messenger, WHATSAPP® instant messaging software, WECHAT® mobile text and voice messaging communication service, KIK® Messenger, TELEGRAM® Messenger, SKYPE MOBILE® messenger, Short Message Service (SMS), or any other messaging application that provides a platform for end users to communicate. In other examples, the messaging application may be run through a browser (e.g., GOOGLE CHROME® browser, MOZILLA® FIREFOX® browser, and INTERNET EXPLORER browser) that is installed on mobile device 110. In some embodiments, two or more messaging applications may be installed on an end user device for communicating through two or more messaging platforms (such as two or more messaging application systems 115).

The messaging application may be facilitated by a messaging platform, such as messaging application system 115. Mobile device 110 may be connected to messaging application system 115 by a first network (e.g., the Internet). Messaging application system 115 may be a messaging platform provided by a third party, such as Facebook, Tencent, Google, Microsoft, etc. Messaging application system 115 may manage content sent and received through the messaging application across multiple mobile devices or other end user devices.

A bot system 120 (e.g., implemented on one or more servers) may also be communicatively connected to messaging application system 115 to send and receive massages. The communication between messaging application system 115 and bot system 120 may be through a second network (e.g., the Internet). The first network and the second network may be the same network, or they may be similar or completely different networks. Messaging application system 115 may route content (e.g., a message or information from a message) from mobile device 110 to bot system 120 using the Internet. In some embodiments, the destination of the content (e.g., an identification of bot system 120) may be included in the content as a nominal addressee. In some embodiments, bot system 120 may also be configured to communicate with two or more messaging application systems 115.

As discussed above, the content being exchanged between end users or between an end user and a bot system may include, for example, text, emojis, audio, media (e.g., a picture, a video, a link), or any other method of conveying a message. An example of a message received by bot system 120 from, for example, FACEBOOK® Messenger may include:

```
{
    "channel": {
        "tenant_id": "DemoTenant",
        "client_data": {
            "channel_user_id": "1103645260000000",
            "type": "facebook",
            "chat_id": "1103645260000000"
        },
        "type": "facebook",
        "bot_id": "DemoBot",
        "client_id": "facebook"
    },
    "id": "411fc848-350b-47de-89c3-a0ecee314401",
```

```
    "text": "May I have a cheese pizza?",
    "type": "text"
}
```

Bot system 120 may receive the content from messaging application system 115 using a connector 130 that acts as an interface between messaging application system 115 and bot system 120. In some embodiments, connector 130 may normalize content from messaging application system 115 such that bot system 120 may analyze content across different messaging application systems. The content normalization processing may include formatting content from each type of messaging application to a common format for processing. In some embodiments, bot system 120 may include one or more connectors for each of the messaging applications (such as FACEBOOK® Messenger, WHATSAPP® instant messaging software, WECHAT® mobile text and voice messaging communication service, KIK® Messenger, TELEGRAM® Messenger, and SKYPE MOBILE® messenger, a Short Message Service (SMS)). In some implementations, connector 130 may route the content to a message-in queue 140. Message-in queue 140 may include a buffer (e.g., a first-in first-out (FIFO) buffer) that stores content in the order received. In some embodiments, each connector 130 may be associated with one or more message-in queues.

Message-in queue 140 may send the content to a message processor 150 when message processor 150 becomes available. In some embodiments, message processor 150 may pull the content from message-in queue 140. Message processor 150 may parse a message and determine an intent of the parsed message as described in detail below. In some embodiments, message processor 150 may include a natural language processor 152 and an intent determination subsystem 154. Natural language processor 152 may parse a message and perform certain semantic analysis, such as identifying a subject, a predicate (e.g., an action), and/or an object. Intent determination subsystem 154 may determine an end user intent based on the parsed message. As described above, the intent may include a purpose of the message. For example, a purpose of the message may be to order a pizza, order a computer, transfer money, ask a question regarding delivery, etc. In some embodiments, parameters associated with the intent that more specifically define or clarify the action to take, which may be referred to as entities, may also be extracted from the message by natural language processor 152 and/or intent determination subsystem 154.

After the end user intent is determined based on the content by message processor 150, the determined intent (and the parameters associated with the intent) may be sent to an action engine 160. Action engine 160 may be used to determine an action to perform based on the intent (and the parameters associated with the intent) and the current state (or context) of a state machine as described above. For example, action engine 160 may send certain outbound content to message-out queue 170 as the response and/or may send a command to or retrieve information from some enterprise services, such as enterprise service 125. Message-out queue 170 may send the outbound content to connector 130. Connector 130 may then send the outbound content to a messaging application system indicated by action engine 160, which may be the same as or different from messaging application system 115. Messaging application system 115 may then forward the outbound content to the messaging application on mobile device 110.

Bot system 120 may communicate with one or more enterprise services (e.g., enterprise service 125), one or more storage systems for storing and/or analyzing messages received by bot system 120, or a content system for providing content to bot system 120. Enterprise service 125 may communicate with one or more of connector 130, action engine 160, or any combination thereof. Enterprise service 125 may communicate with connector 130 in a manner similar to messaging application system 115. Enterprise service 125 may send content to connector 130 to be associated with one or more end users. Enterprise service 125 may also send content to connector 130 to cause bot system 120 to perform an action associated with an end user. Action engine 160 may communicate with enterprise service 125 to obtain information from enterprise service 125 and/or to instruct enterprise service 125 to take an action identified by action engine 160.

In some embodiments, bot system 120 may include one or more timers. A timer may cause action engine 160 to send content to an end user using connector 130 and messaging application system 115 after an amount of time has lapsed. In some embodiments, a timer may send content to bot system 120 similar to an end user or enterprise service 125. For example, the timer may send a message to bot system 120 to be analyzed as a message from an end user would be analyzed.

In one specific embodiment, an end user may send a message to bot system 120 using mobile device 110 through messaging application system 115. The message may include a greeting, such as "Hello" or "Hi." The bot system may determine that a new conversation has begun with the end user and start a state machine. In some embodiments, the bot system may identify one or more characteristics of the end user. For example, the bot system may identify a name of the end user using a profile associated with the end user on the messaging application system. Using the one or more characteristics, the bot system may respond to the end user on the messaging application. The response may include a message to the end user that responds to the message received from the end user. For example, the response may include a greeting with the name of the end user, such as "Hi Tom, What can I do for you?". Depending on the enterprise associated with the bot system, the bot system may progress to accomplish a goal of the enterprise. For example, if the bot system is associated with a pizza delivery enterprise, the bot system may send a message to the end user asking if the end user would like to order pizza. The conversation between the bot system and the end user may continue from there, going back and forth, until the bot system has completed the conversation or the end user stops responding to the bot system.

In some embodiments, the bot system may initiate a conversation with an end user. The bot system-initiated conversation may be in response to a previous conversation with the end user. For example, the end user may order a pizza in the previous conversation. The bot system may then initiate a conversation when the pizza is ready. In some embodiments, the bot system may determine the pizza is ready when an indication is received from the enterprise associated with the bot system (e.g., an employee sending a message to the bot system that the pizza is ready). The conversation may include a message sent to the end user indicating that the pizza is ready.

In some embodiments, the bot system may send a message to the end user on a different messaging application than the messaging application that a previous message was received. For example, the bot system may determine to send the message using Short Message Service (SMS) rather than FACEBOOK® Messenger. In such implementations, the bot system may integrate multiple messaging applications.

In some embodiments, the bot system may determine to start a conversation based on a timer. For example, the bot system may determine to have a one-week-timer for an end user after a pizza is ordered. Expiration of the one-week timer may cause the bot system to start a new conversation with the end user for ordering another pizza. The timer may be configured by the enterprise and implemented by the bot system.

As described above, in some embodiments, action engine 160 may send command to or retrieve information from some enterprise services 125. For example, when bot system 120 (more specifically, message processor 150) determines an intent to check balance, bot system 120 may determine which of several accounts (e.g., checking or savings account) to check the balance for. If the end user inputs "What's my balance in my savings account," bot system 120 may extract "savings" and send a command to a bank server to check the balance, and then send the received balance information to the end user through a message. If the end user initially only uttered "what's the balance in my account?", bot system 120 may send a message to the end user prompting the end user to further specify the specific account, or may retrieve information for all accounts of the end user and send the account information to the end user for the end user to make a selection.

In some embodiments, the bot system may maintain information between conversations. The information may be used later so that the bot system does not need to ask some questions every time a new conversation is started between the end user and the bot system. For example, the bot system may store information regarding a previous order of pizza by the end user. In a new conversation, the bot system may send a message to the end user that asks if the end user wants the same order as last time.

In some embodiments, bot system 120 may store information associated with end users in a cache. The cache may write to a database to save the information after an outbound message is sent to the messaging application system from connector 130. In other embodiments, the cache may write to the data at different times (e.g., after a particular event, after each event, after an amount of time, or any other metric to determine when to write to the database).

Bot system 120 may allow each component to be scaled when slowdowns are identified. For example, if bot system 120 identifies that the number of messages that are arriving at connector 130 exceeds a threshold, an additional one or more connectors may be added to connector 130. In addition, the number of message-in queues, message processors, instances of action engines, and message-out queues may be increased depending on where the slowdown occurs. In such implementations, additional components may be added without having to add other additional components. For example, a connector may be added without having to add an additional instance of the action engine. In some implementations, one or more components, or a portion of a component, of bot system 120 may be run on a virtual machine. By running on a virtual machine, additional virtual machines may be initiated at desired.

As described above, building the bot system, such as the user intent classification engine that can determine the end user's intents based upon end user utterances, is a challenging task in part due to the subtleties and ambiguity of natural languages and the dimension of the input space (e.g., possible end user utterances) and the size of the output space (number of intents). As such, a new bot system may need to be monitored, debugged, and modified in order to improve the performance of the bot system and user experience with the bot system. In many cases, it may be difficult to more specifically identify the root causes of the lower than desired performance of the bot system and determine how to improve the bot system without using an analytics or optimization tool.

In some circumstances, a bot owner, developer, or administrator may want to monitor the operational status of a bot, and understand how the bot is being used and where end users abandoned the bot, in order to improve the bot. For example, the bot owner, developer, or administrator may want to know which bot conversations are successful and which ones are not, in order to identify and diagnose underperforming elements of the bot system.

According to some embodiments, an analytic system may be integrated with a bot system. The analytic system may monitor events occurred during conversations between end users and the bot system, aggregate and analyze the collected events, and provide information regarding the conversations graphically on a graphic user interface at different generalization levels, such as all conversations, different categories of conversation, and individual conversations. For example, the graphic user interface may display options to filter or select certain types of conversations or individual conversations, and display the selected information graphically, for example, by visualizing the paths of the conversations. The analytic system may also provide suggestions, options, or other information for improving the bot system.

Figure 2:
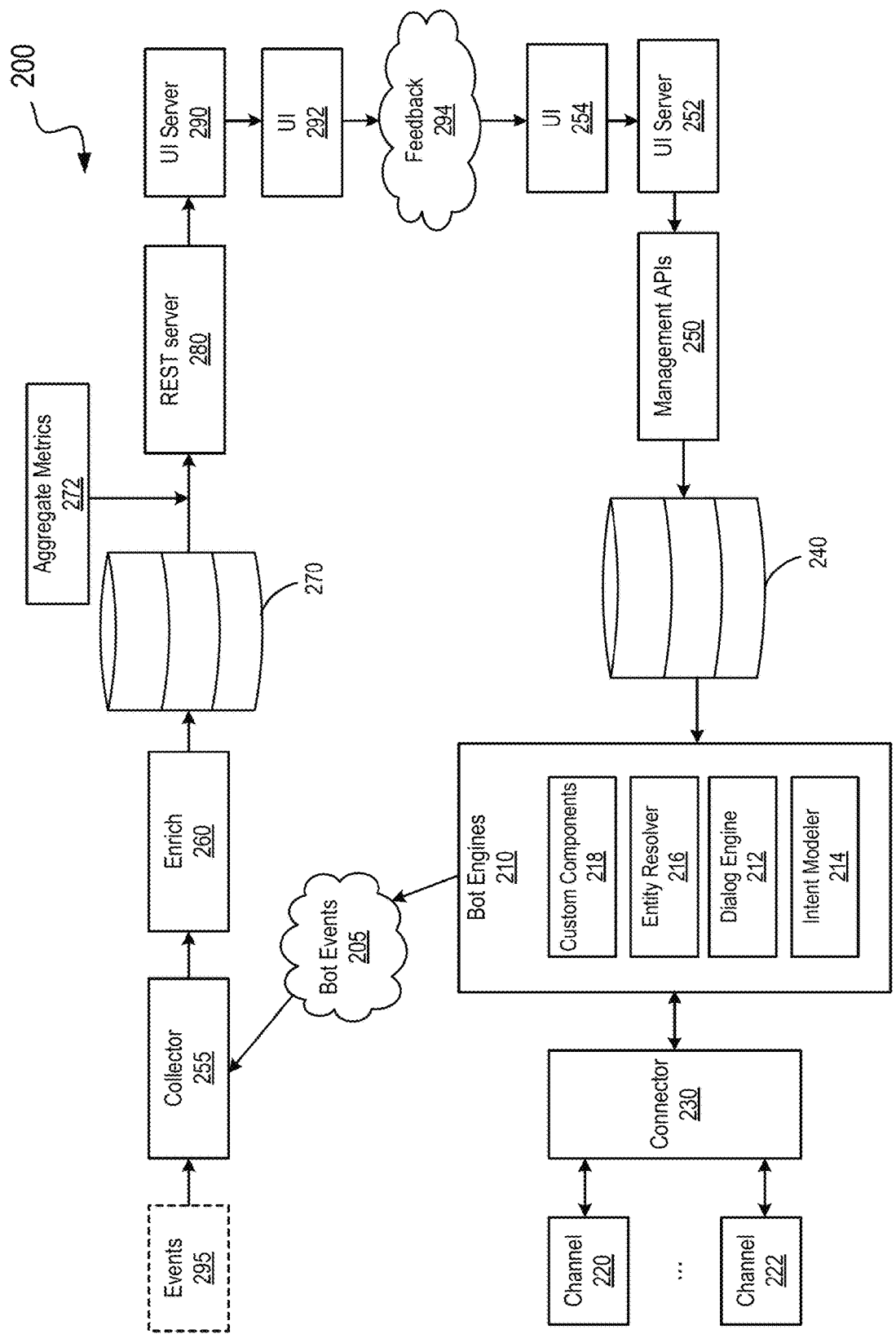
FIG. 2 depicts an integrated system including a bot system and a bot analytic system for monitoring, analyzing, visualizing, and improving the performance of a bot system according to certain embodiments.

FIG. 2 depicts an integrated system 200 including a bot system (such as bot system 120) and a bot analytic system for monitoring, analyzing, visualizing, and improving the performance of the bot system according to certain embodiments. As illustrated, the bot system may include a connector 230 and a plurality of bot engines, such as a dialog engine 212, an intent modeler 214, an entity resolver 216, and custom components 218. The bot system may also include a database 240, management APIs 250, a user interface 254, and a UI server 252. The bot analytic system may include a collector 255, an enrichment engine 260, a database 270, and a REST server 280. The bot analytic system may also include a user interface 292 and a UI server 290. Collector 255 of the bot analytic system may collect events 205 occurred at the bot system. Feedback 294 from the bot analytic system may be provided to the bot system through user interface 292 and user interface 254.

Connector 230 may act as an interface between the bot system and one or more end users through one or more channels, such as channels 220 and 222. Each channel may be a messaging application, such as a messaging channel (such as Facebook Messenger, Facebook WhatsApp, WeChat, Line, Kik, Telegram, Talk, Skype, Slack, or SMS), a virtual private assistant (such as Amazon Dot, Echo, or Show, Google Home, Apple HomePod, etc.), a mobile and web app extension that extends native or hybrid/responsive mobile app or web application with chat capabilities, or voice based input (such as devices or apps with interfaces that use Siri, Cortana, Google Voice, or other speech input for interaction). In some embodiments, connector 130 may normalize content from different channels such that the bot system may analyze content across different messaging application systems. The content normalization processing may include formatting content from each type of messaging application to a common format for processing. In some embodiments, the bot system may include one or more connectors for each of the channels.

Intent modeler 214 may be used to determine end user intents associated with end user utterances. In some embodiments, intent modeler 214 for determining an intent of an end user based on one or more messages received by the bot system from the end user may use a natural language processor to tag the parts of speech (verb, noun, adjective), find lemmas/stems (runs/running/ran->run), and tag entities (Texas->LOCATION). In some embodiments, intent modeler 214 may normalize the message. For example, "Mary ran to Texas" may become "PERSON run to LOCATION." Intent modeler may also include logic to detect words which have the same meaning within an end user message. For example, if the training dataset includes: "Mary ran to Texas" and "Bob walked to Detroit," both mapped to the same intent, and run/walk appear in the same set of intents, intent modeler 214 may learn that for the purposes of intent resolution run=walk. In one illustrative example, "Mary ran to Texas" may become "PERSON run to LOCATION" and "Bob walked to Detroit" may become "PERSON walk to LOCATION." In the illustrate example, both sentences may be associated with a same intent because "noun run to noun" is the same as "noun walk to noun" for the purpose of intent resolution. In another example, "I want to order a large cheese pizza" and "I want to order a small pepperoni pizza" may both be normalized into "I want to order a Bots_PizzaSize Bots_Toppings pizza."

After normalization, a probability that the occurrence of a word may signify a certain intent may be determined. In some examples, probabilities can be combined using basic probability arithmetic as if they were independent. For example, if "order" suggests a 20% probability of ordering pizza, and "pizza" suggests a 10% probability of ordering pizza, the total probability would be 1−(1−0.2)(1−0.1)=28%. Some probabilities may be based on presence of words, or based on certain language elements, like presence of negations or personal pronouns.

Another level of rule may be a template rule, which is a combination of words. In some examples, every sentence in a training dataset, once normalized, may automatically become a rule. In such examples, a training dataset may include a very small number of short sentences. The template rule may return a probability of 1. New rules may be generated from rules via a process of induction. For example, the following sentences may belong to track spending: "How much did I spend last month on gas?" and "How much did I spend in May on food?." The sentences may be used to induce the rule "How much did I spend" as that is the part which is shared between them. In other examples, the training dataset may include the phrase "How much did I spend" to achieve the same result.

Examples described above allow definitions of an intent to not include duplicates, such as variations on named entities (e.g., "Send money to Sue" and "Send money to Bob"). However, similar sentences where one or two words are different may be used for the training. Similar sentences may allow the model to learn which words may have the same meaning for intent resolution and which words may be common misspellings.

If a particular word or set of words (like the verb) is important to an intent, the probabilities may be manipulated by having more examples using such a word (and its synonyms) and fewer examples with such a word for other intents.

Examples may also be provided to prevent the model from making wrong assertions. For example, particular sub-phrases, or words only appearing for a certain intent, may cause wrong assertions. Similarly, the model may be prevented from synthesizing broad rules using similar sentences belonging to different intents for the training.

Entity resolver 216 may identify entities (e.g., objects) associated with the end user intents. For example, in addition to the end user intent identified by intent modeler 214, such as "order pizza," entity resolver 216 may resolve entities associated with the intent, such as the pizza type, toppings, and the like.

Dialog engine 212 may be used to handle the conversations between the end users and the bot system. For example, dialog engine 212 may respond to end user utterances based on the end user intent identified by intent modeler 214 and entities associated with the end user intent identified by entity resolver 216. In some embodiments, dialog engine 212 may use a state machine that includes user defined states (e.g., end user intents) and actions to take in the states or from state to state to handle the conversations with end users.

Custom components 218 may include customized modules for the specific bot system. For example, a financial bot may include custom components that may be used to, for example, checking balance, transfer funds, or pay bills.

Database 240 may be used to store data for the bot system, such as data for the classification models, logs of conversation, and the like. Management APIs 250 may be used by an administrator or developer of the bot system to manage the bot system, such as re-training the classification models, editing intents, or otherwise modifying the bot system. The administrator or developer may use user interface 254 and UI server 252 to manage the bot system.

Various events may be generated while the bot system is running. The events may be generated based upon one or more instructions included in the bot system. For example, an event may be generated when the bot system has entered into a particular state, where the particular state is defined by an administrator or developer of the bot system. As events are generated, the events may be collected, stored, and analyzed by the bot analytic system. When capturing an event, additional information associated with the event may also be collected, where the additional information may indicate a present context in which the event is generated.

For example, conversation events may be generated by dialog engine 212. A conversation event may include a message received by a bot system from an end user device (referred to as msg_received). Msg_received may include one or more of the following parameters or variables: the content of the message, the time when the message is received by the bot system, the language of the message received, a device property (e.g., version or name), an operating system property (e.g., version or name), a geolocation property (e.g., an Internet Protocol address, a latitude, a longitude, or the like), identification information (e.g., a user ID, a session ID, a bot system ID, a tenant ID, or the like), a time stamp (e.g., device created, device sent, collector derived time stamp), the channel, or the like.

A conversation event may also include a message sent by a bot system to an end user device (referred to as msg_sent). Msg sent may include one or more of the following: the content of the message (e.g., text or HTML of the message), the time when the message is sent by the bot system, the language of the message, a creator of the message (e.g., the bot system or an end user device), a device property, an operating system property, a browser property (e.g., version or name), an app property (e.g., version or name), a geolocation property (e.g., an Internet Protocol address, a latitude, a longitude, or the like), identification information (e.g., a user ID, a session ID, a bot system ID, a tenant ID, or the like), a channel (e.g., Facebook or Webhook), or the like.

Dialog engine 212 may also generate dialog state execution events. As described above, dialog engine 212 may use a state machine to determine the flow of the conversations with end users. The state machine may include a set of states and rules of transition between the states. Dialog engine 212 may execute the state machine for each end user conversation, and a dialog state execution event may be produced for each state that dialog engine 212 steps through to process end user utterances. Attributes of a dialog state execution event may include, for example, a state name, component name, next action, entity match, intent match, variable, user query statement, response statement, time of execution, communication language, device property, operating system property, geolocation property, identification information, a time stamp, a channel, or the like. The state name be a name of a state currently executed or an "error state." The component name may be a name of a bot component executed for a current state. The next action may be a next action to be executed. The entity match may be an entity resolved in a current message. The intent match may be an intent resolved with a score value. The variable may be a variable value for a current state. The query statement may be a message sent by an end user. A response statement may be a message sent to an end user. The time of execution may be a time stamp of a completed state execution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

An intent resolution event may occur as a result of the execution of intent modeler 214. Intent modeler 214 may use trained or otherwise defined classification models to identify the end user intents from a set of intents based on the end user utterances. The result of the intent classification may be captured as intent resolution event attributes, which may include, for example, the final intent classification result (e.g., the identified intent) and confidence score associated with each respective intent in the set of intents.

Entity resolver 216 may generate entity resolver events. Entities are objects associated with end user intents. Entity definition rules may be determined when the bot system is created. For example, in addition to resolving end user intents, such as "order pizza," the bot system may also use entity resolver 216 to resolve associated entities, such as pizza type, toppings, and the like. An entity resolver event may be captured at an entity resolution. Examples of attributes associated with an entity resolver event may include an entity name, a rule applied, a search term, a state resolved, a query statement, an entity type, a time of execution, a communication language, a device property, an operating system property, a browser property, an app property, a geolocation property, identification information, a time stamp, a channel, or the like. The entity name may be a name of an entity currently being resolved. The rule applied may be, for example, preceding, following, or aggregate. The search term may be from, to, destination, origin, or the like. The state resolved may be a dialog state resolved for the entity. The query statement may be a message containing entity value. The entity type may be system or derived. The time of execution may be a time stamp of an entity resolution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

A custom component may also generate events, such as a predefined event or a custom event. The predefined event may be a property captured at an execution of a custom component. Examples of attributes pf the predefined event may include: a component name, an event name, a payload, a time of execution, a communication language, a device property, an operating system property, a browser property, an app property, a geolocation property, identification information, a time stamp, a channel, or the like. The component name may be a name of a custom component currently being executed. The event name may be invoked, invocation_failed, replied, replied_failed, or the like. The payload may be, in case of failure, reason for failure, stack trace, or the like. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

The custom component may also issue a custom event during execution of a custom component. Examples of attributes of the custom event may include a component name, an event name, a custom payload, a time of execution, a communication language, a device property, an operating system property, a browser property, an app property, a geolocation property, identification information, a time stamp, a channel, or the like. The component name may be a name of a custom component currently being executed. The event name may be a user-defined event name (e.g., Balance_Retrieved). The payload may be, for example, {"amount" : "USD 100", "account": "checking"}. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

Error events and timeout events may also be generated by the bot system during execution. An error event may be generated when an error occurs. A timeout event may be generated when the end user conversation has been inactive for a period of time, which may be configured at the channel.

The bot analytic system may collect the events and additional information as the bot system conducts conversations with end users and generates the corresponding events. For example, collector 255 may collect the events and the additional information and send the collected information to a queue. In some embodiments, collector 255 may be configurable and can be programmed to collected different events and/or event attributes described above as desired. For example, collector 255 may be configured to capture dialog state attributes, intent resolution attributes, entity resolution attributes, and error and timeout attributes. In some embodiments, collector 255 may also be configured to collect information regarding events 295 generated by a system other than the bot system.

Enrichment engine 260 may perform validation and enrichment on the collected events and other information and write them to database 270. For example, based on a collected IP address, enrichment engine 260 may determine the location of the end user associated with the IP address. As another example, enrichment engine 260 may extract certain features from the collected information, such as determining a web browser or channel used by the end user. REST server 280 may analyze the enriched events and other information and generate various reports based on certain aggregate metrics 272. The reports may be displayed to an owner, administrator, or developer of the bot system on user interface 292 through UI server 290. The owner, administrator, or developer of the bot system may provide feedback 294 to the bot system for improving the bot system.

Figure 3:
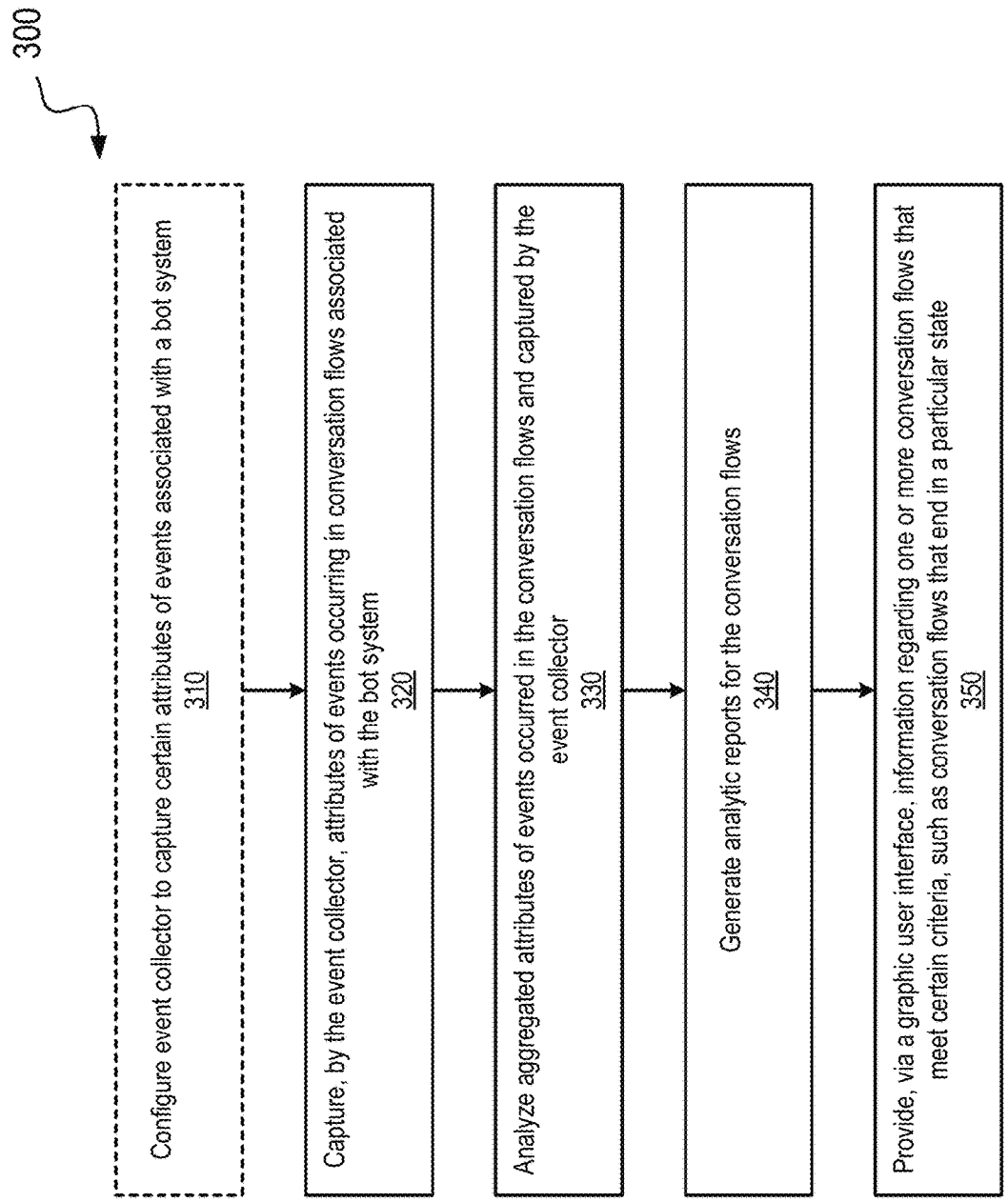
FIG. 3 is a simplified flowchart illustrating processing for monitoring, analyzing, visualizing, and improving the performance of a bot system according to certain embodiments.

FIG. 3 is a simplified flowchart 300 illustrating an example of processing for monitoring, analyzing, visualizing, and improving the performance of a bot system according to certain embodiments. The processing depicted in FIG. 3 may be performed by a bot analytic system, such as the bot analytic system described with respect to FIG. 2. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel.

At 310, an event collector of a bot analytic system, such as collector 255, may be configured to capture certain attributes associated with certain events generated by a bot system. As described above, the events generated by the bot system may include, for example, conversation events, dialog state execution events, intent resolution events, entity resolution events, and events generated by custom components. The event collector may be configured to collect desired events or desired attributes associated with the various events. At 320, the event collector may collect the attributes of events occurred during conversations with the bot system based on the configuration of the event collector. At 330, the attributes of the events occurred during the conversations and captured by the event collector may be aggregated and analyzed. As described above, the attributes of the events may also be enriched and saved in a database before being aggregated based on some aggregate metrics. At 340, various analytic reports may be generated for the conversations based on the aggregate metrics, such as an overview report, an intent report, a path report, a conversation report, and a bot improvement report as described in detail below. At 350, the analytic system may provide, at the request of a bot owner, administrator, or developer, information regarding one or more conversations that meet certain criteria, such as conversations that end in a particular state (e.g., an incomplete or aborted state or an error state). The bot owner, administrator, or developer may filter or select conversations by selecting different options provided through a graphic user interface for monitoring, analyzing, visualizing, debugging, or improving the performance of the bot system.

As described above, the analytic reports may include, for example, an overview report, an intent report, a path report, a conversation report, and a bot improvement report. The overview report may include, for example, a trend chart illustrating completed/incomplete conversations over time, and a bar chart showing conversation counts for each intent. The intent report may include, for example, information regarding conversations and errors for each intent, and the most popular or least popular conversation flow. The path report may include charts depicting different conversation flows for the bot system, and information such as the conversation counts and error metrics. The conversation report may show the summary of the conversation log. The bot improvement report may provide information regarding the intent classification results, which may be used by the administrator or developer of the bot system to correct some classification results and use the corrected classification results to retrain the classification models.

In some embodiments, a report may include information indicating one or more messages from one or more end users for which an intent was not able to be identified (sometimes referred to as an unresolved intent). For example, a bot system may calculate a likelihood that a message from an end user is associated with an intent. If the likelihood is less than a threshold, the message may not be associated with the intent. If the message is not associated with any intent, the bot system may not be able to further a conversation. Instead, the bot system may have to ask one or more additional questions to identify the intent. By presenting information regarding a message where an intent was not able to be identified, the report may enable a user to reconfigure the bot system to properly identify the intent when receiving a new message similar to the message. For example, the report may present one or more potential intents based upon likelihoods such that the user may select an intent from the one or more potential intents so that the message may be added to a training dataset used for training the classification model for identifying the intent from a message.

In some embodiments, a user may be presented with information regarding which conversations are successful and which conversations are not. In addition, a user may drill down into conversation data to identify errors and improve a performance of the bot system. By analyzing paths of end user conversations, one or more performance metrics may be provided for different conversation types (e.g., intents). For example, a user may view, by intent, how many conversations are successful and how many were not. In some embodiments, there may be a pre-defined threshold to determine what percentage of successful conversations is considered good, what percentage is considered medium, and what percentage is considered low. A performance metric of conversation success may be shown with a different color according to the threshold. The user may also view a source of each visit to the bot system (e.g., Facebook, webhook, etc.). A user may view a total number of conversations, a state length, a time length per intent, etc., or the like. Conversations may be grouped into pre-defined types such as abandoned and completed. A conversation metric may be filtered based upon conversation types to view a subset of conversations.

In some embodiments, the conversations may be viewed by state. A conversation flow (or path) may be a graphical visualization that includes one or more states of a conversation. In some embodiments, a path may be filtered by conversation type (e.g., abandoned, most popular, etc., or the like). In some embodiments, an error condition for a path may be viewed, for example, for a given state in the path.

In some embodiments, a metric and/or metadata may be viewed for a path. The metric may include a number of instances of the path, a length of the path, a rank in terms of popularity of the path, and an average time to complete the path.

In some embodiments, an instance of a conversation type may be viewed and analyzed via a sequence of states. In such embodiments, states and conversations may be synchronized to identify errors and performance issues.

A metric may be computed based upon one or more events described above. The metric may be computed daily, weekly, month, or a custom range. Examples of basic metrics include (1) a number of unique, total, new, active, inactive, or returning end users, (2) total sessions/conversations, (3) average, maximum, median, or minimum conversation duration, (4) average time between two conversations of an end user, (5) sentiment (positive, negative, or neutral), (6) number of end users, number of conversations, or number of unique end users, (7) average, maximum, median, or minimum message count, or the like. Each metric may be filtered by channel (e.g., Facebook or webhook), geography (e.g., country, state, city, or zip code), language (e.g., English or Spanish), device and its type (e.g., iPhone, Samsung, Motorola, LG, HP, or Dell), OS and its version (e.g., Windows, iOS, Android, Mac, or Linux), browser and its version (e.g., Firefox, Safari, Internet Explorer, or Chrome), app name and its version (e.g., integrated chat within an app), agent type (e.g., bot system or user device), or the like. In some examples, a custom event from a custom component may have a custom report that is developed by a bot developer using CxA.

A conversation may be analyzed using a buzz graph and/or word cloud of most frequent terms used. Conversations may also be categorized with rankings for each category. A comparative buzz graph for utterances and conversations may also be used.

In some embodiments, a bot analytic system may identify what parts of a conversation with a bot system are working well and what are not. The bot analytic system may enable a user to drill down into a conversation history, track abandoned/completed intents and conversations, identify most/least popular path taken for a completed path based upon depth, time, or both, or identify a history of all abandoned conversations with transcripts to trouble-shoot why the conversations were abandoned (e.g., number of states traversed, error conditions, or the like). In some embodiments, the result generated by the bot analytic system may be filtered. The filtering may be based upon the channel, length, intent, abandoned/completed, or the like.

In the following descriptions, some examples of analytic reports and graphic user interface screens are described. It is noted that these examples are for illustration purposes only and are not intended to limit the scope of the present disclosure to the specific examples.

Figure 4:
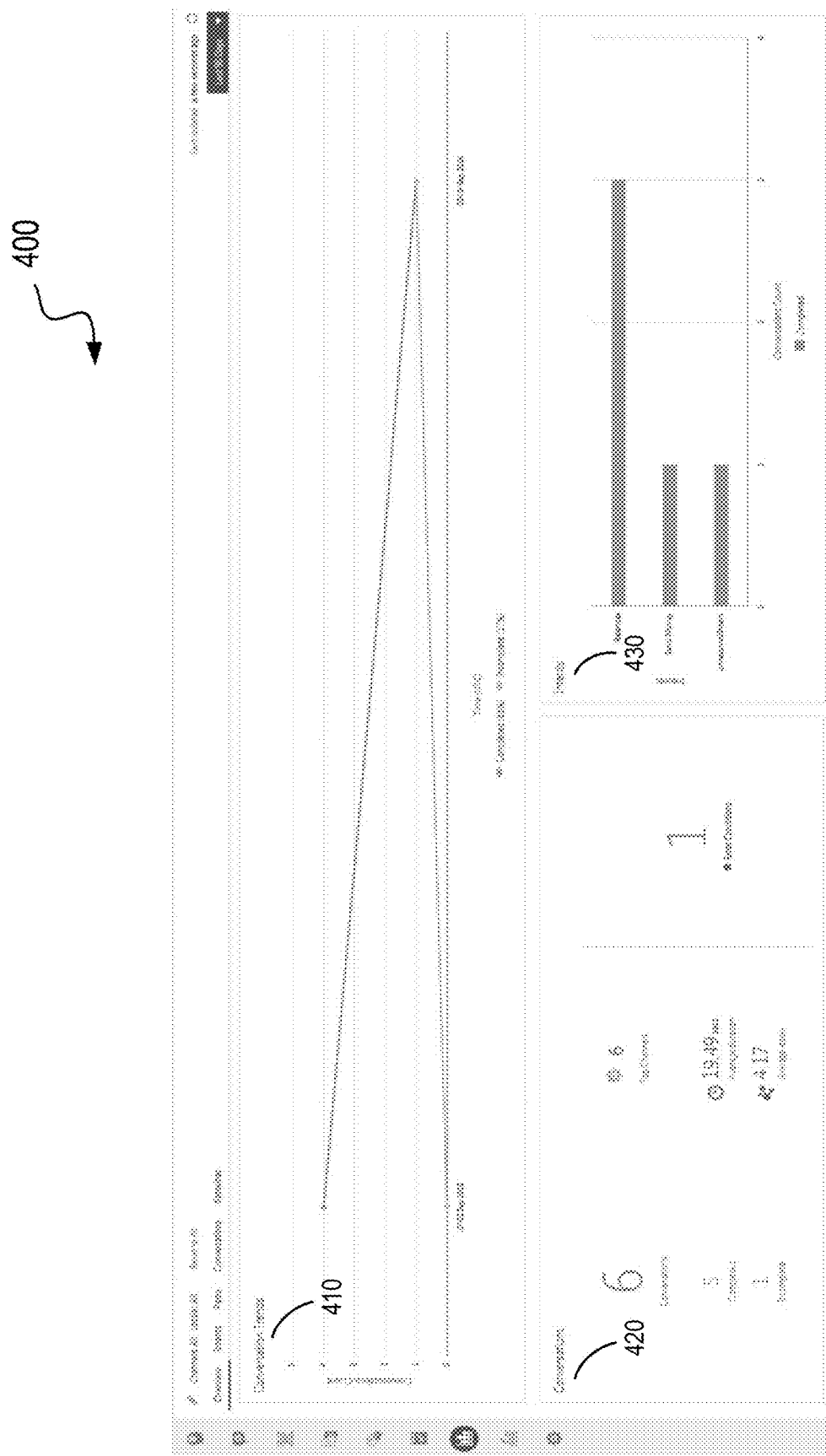
FIG. 4 depicts an example of a graphical user interface screen displaying summarized information of conversations associated with a bot system according to certain embodiments.

FIG. 4 depicts an example of a graphical user interface screen 400 displaying summarized information of conversations associated with a bot system according to certain embodiments. The summarized information may be generated for conversations associated with any channel and any locale or any combination of channels and locales. The summarized information may also be generated for conversations occurred within a specific time period, such as the last 90 days. GUI screen 400 may include a first panel 410 showing the overall trend of completed and incomplete conversations over time. GUI screen 400 may also include a second panel 420 showing the total numbers of all conversations, completed conversations, and incomplete conversations, along with the number of errors, the average conversation duration, and the top channels. GUI screen 400 may also include a third panel 430 showing the total number of conversations for each intent in a bar chart format. A user may click on a bar of the bar chart corresponding to an intent to open an intent report.

Figure 5:
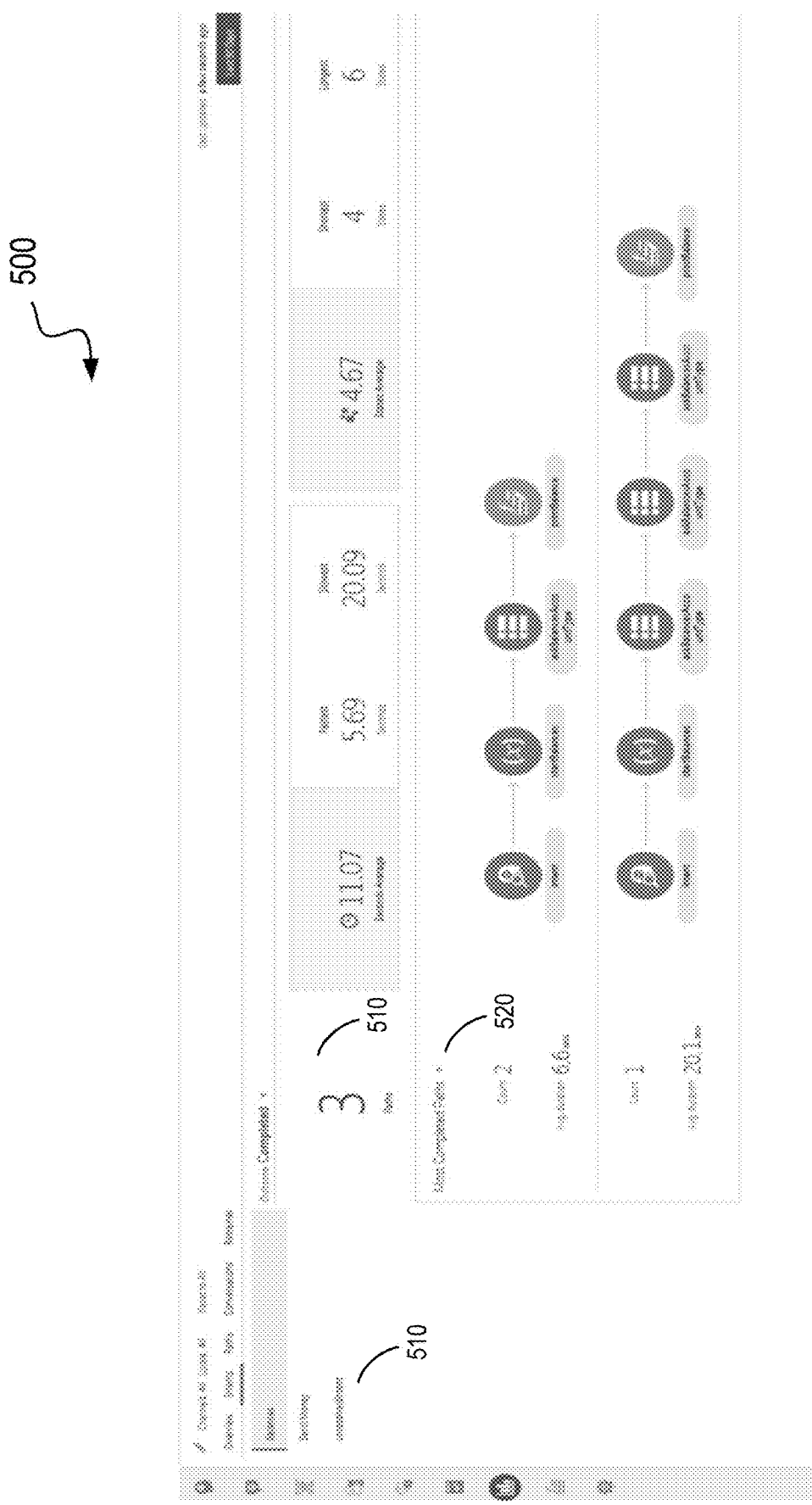
FIG. 5 depicts an example of a graphical user interface screen displaying summarized information regarding end user intents for completed conversations associated with a bot system according to certain embodiments.

FIG. 5 depicts an example of a graphical user interface screen 500 displaying summarized information regarding end user intents in completed conversations associated with a bot system according to certain embodiments. The summarized information may be generated for conversations associated with any channel and any locale or any combination of channels and locales. The summarized information may also be generated for conversations occurred within a specific time period, such as the last 90 days. GUI screen 500 may include a first panel 510 showing all intents associated with completed conversations. GUI screen 500 may include a second panel 520 showing statistics of intents for completed conversations, such as the number of distinct paths, the average conversation duration, and the durations of the shortest and longest conversations. GUI screen 500 may further include a third panel 530 showing a linear path diagram for each of the most frequently completed path and the least frequently completed path, including the number of conversations and the average duration for each of the most frequently completed path and the least frequently completed path. Each linear path diagram represents a conversation flow and shows transitions between multiple states during the conversation as described above.

Figure 6:
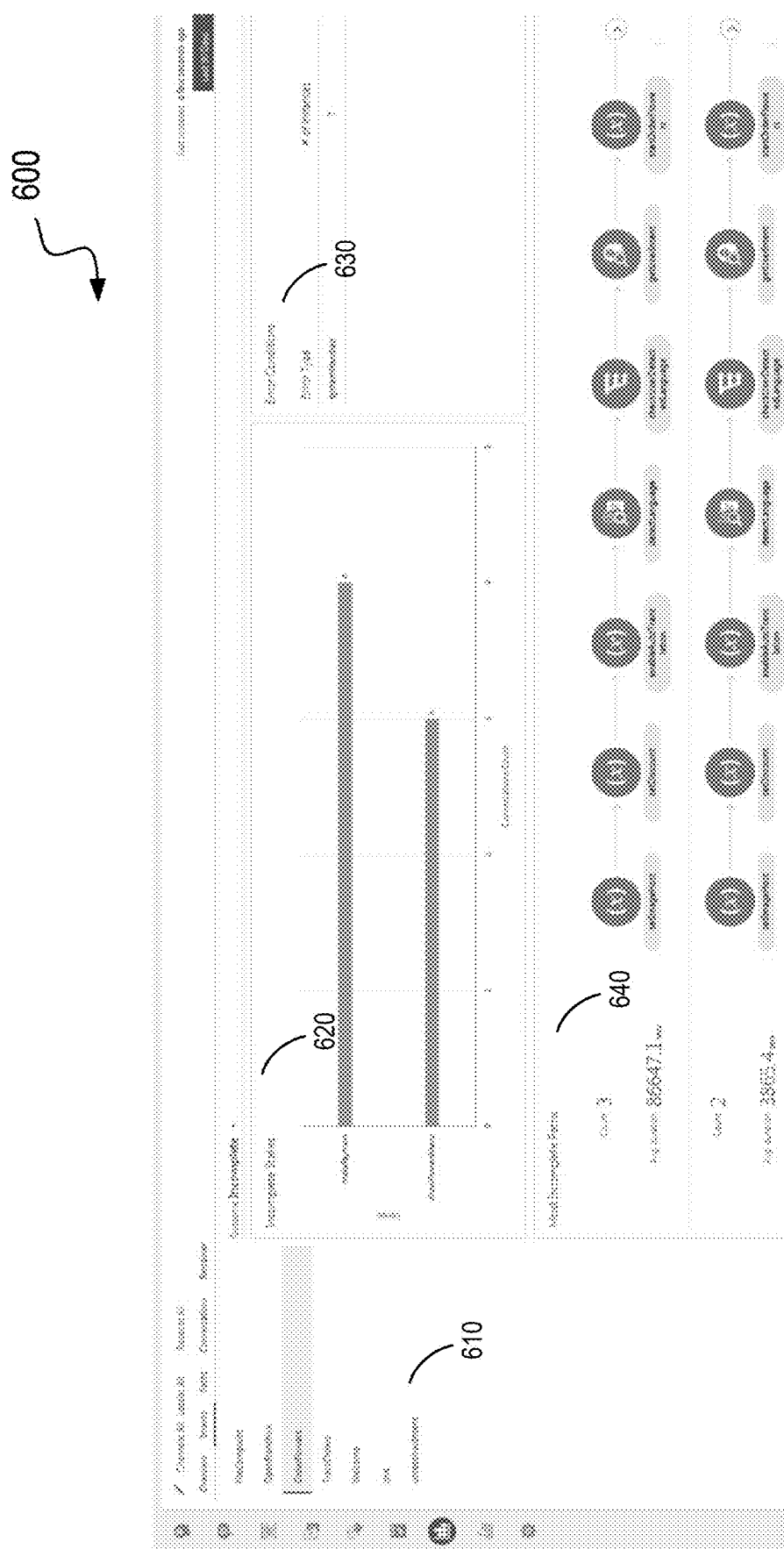
FIG. 6 depicts an example of a graphical user interface screen displaying summarized information regarding end user intents for incomplete conversations associated with a bot system according to certain embodiments.

FIG. 6 depicts an example of a graphical user interface screen 600 displaying summarized information regarding end user intents for incomplete conversations associated with a bot system according to certain embodiments. The summarized information may be generated for conversations associated with any channel and any locale or any combination of channels and locales. The summarized information may also be generated for conversations occurred within a specific time period, such as the last 90 days. GUI screen 600 may include a first panel 610 showing all intents associated with incomplete conversations. GUI screen 600 may also include a second panel 620 that displays a bar chart showing the number of conversations that are abandoned at each state. A click on the bar chart may cause the display of a third panel 630 showing the error conditions and the number of instances associated with each error condition. GUI screen 600 may further include a fourth panel 640 that displays a linear path diagram for each of the incomplete paths having the highest numbers of instances (e.g., incomplete conversations), including the number of incomplete conversations and the average duration of conversations for the incomplete path. Each linear path diagram may represent a conversation flow and show transitions between states during the conversation as described above.

Figure 7:
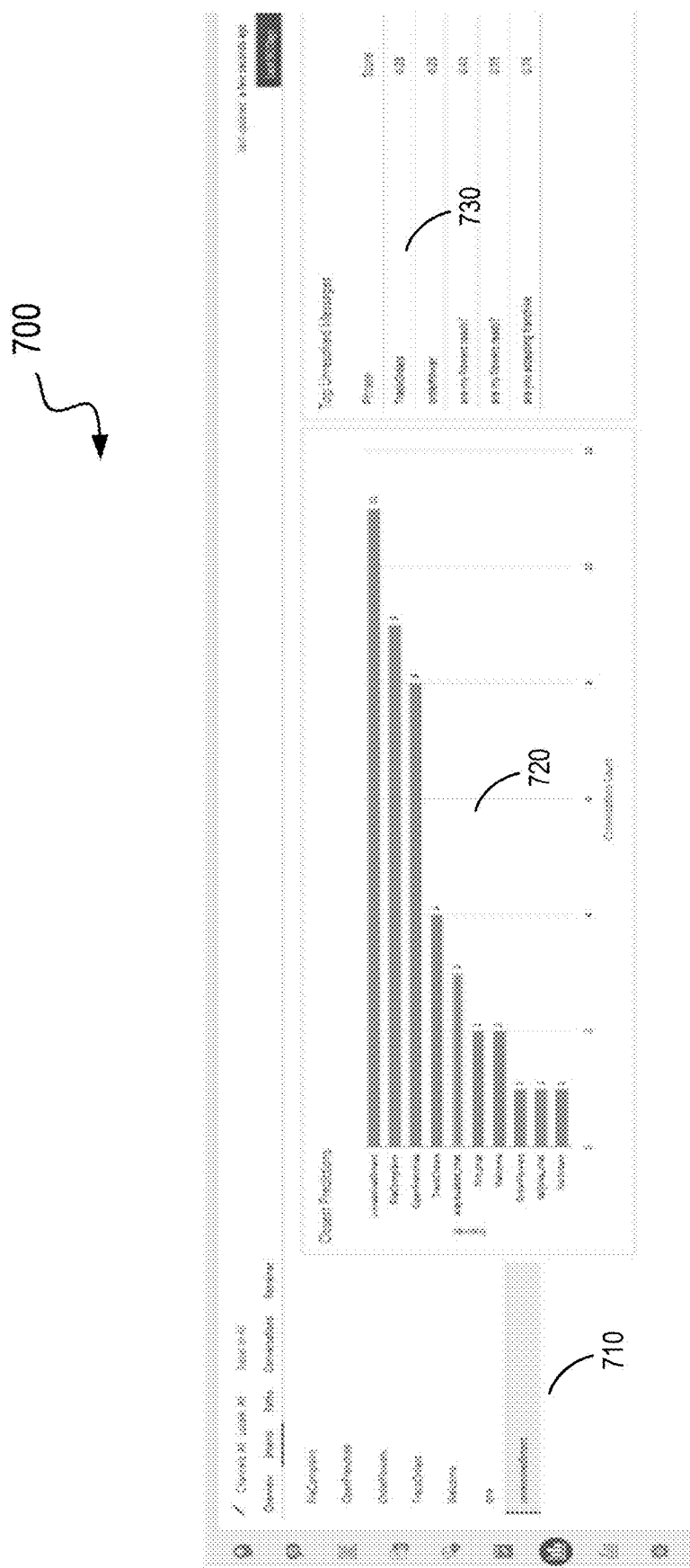
FIG. 7 depicts an example of a graphical user interface screen displaying summarized information regarding unresolved end user intents for conversations associated with a bot system according to certain embodiments.
Figure 8:
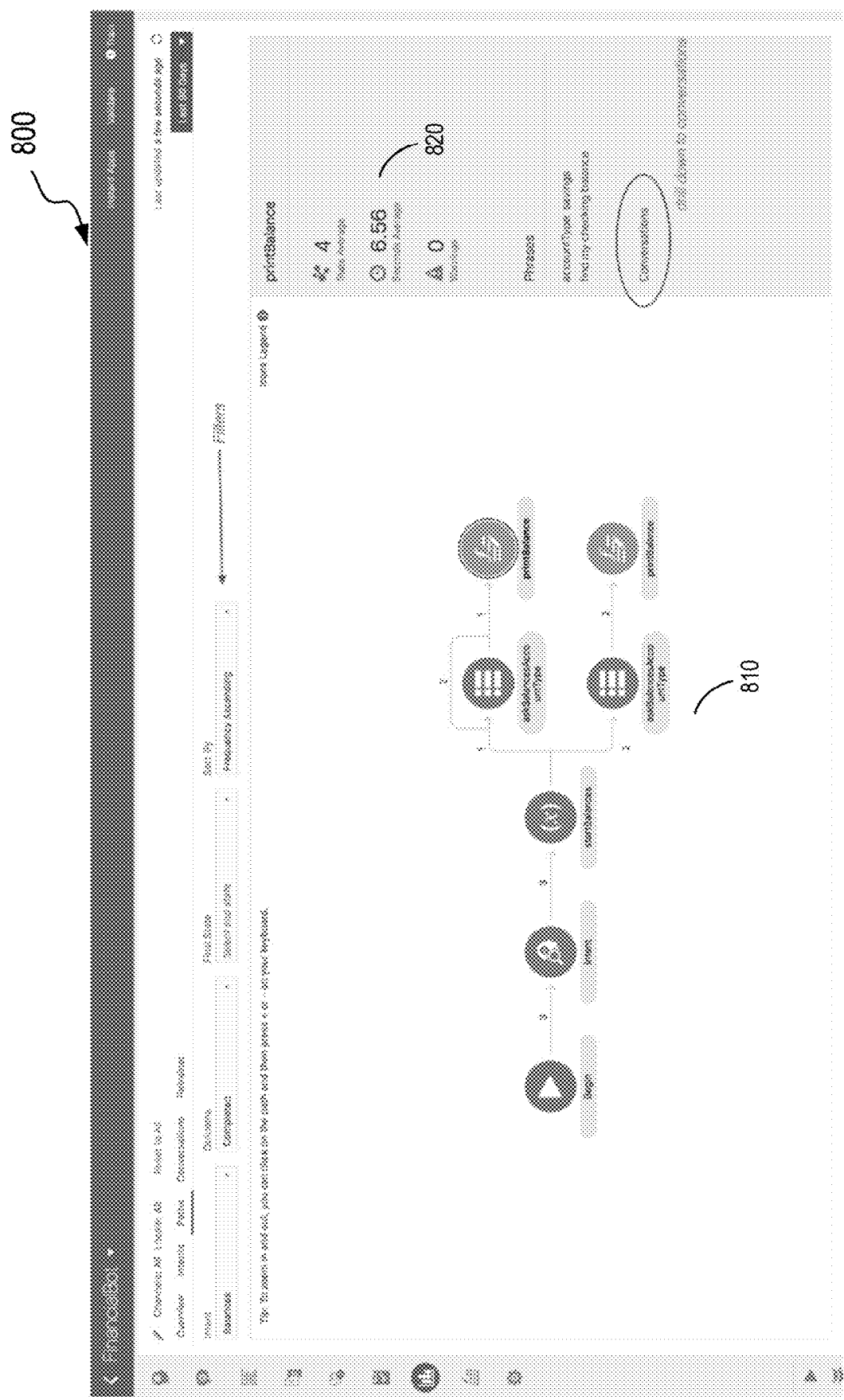
FIG. 8 depicts an example of a graphical user interface screen displaying summarized information regarding paths of conversations associated with a bot system according to certain embodiments.

FIG. 7 depicts an example of a graphical user interface screen 700 displaying summarized information regarding unresolved end user intents for conversations associated with a bot system according to certain embodiments. The summarized information may be generated for conversations associated with any channel and any locale or any combination of channels and locales. The summarized information may also be generated for conversations occurred within a specific time period, such as the last 90 days. GUI screen 700 may include a first panel 710 showing possible intents. GUI screen 700 may also include a second panel 720 that includes a bar chart showing the number of conversations that are unresolved by the intent classification module (e.g., intent modeler 214) and are associated with each closest matching intent. A third panel 730 may show the top unresolved messages (end user utterances) and the corresponding scores in FIG. 8 depicts an example of a graphical user interface screen 800 displaying summarized information regarding paths of conversations associated with a bot system according to certain embodiments. The summarized information may be generated for conversations associated with any channel and any locale or any combination of channels and locales. The summarized information may also be generated for conversations occurred within a specific time period, such as the last 90 days. The conversations may be filtered based on, for example, the intent, the status (e.g., completed or incomplete), and the final state of the conversation, and may be sorted according to a user selected order. GUI screen 800 may include a first panel 810 showing an aggregate view of selected conversations with the bot system in the format of an aggregated path diagram. Each node in the aggregated path diagram corresponds to a state of the bot system or a stage of a conversation flow. Each outgoing transition represents a successful state execution by the bot system. Each path from a start state to an end state represents a conversation flow that may have multiple instances (e.g., conversations that follow the conversation flow). Successful conversations may end in a "completed" state, while unsuccessful conversations may stop at an intermediate state. The aggregate view may show the "popular paths" and the states where the most "drop-offs" (i.e., failure to progress to the next state) may occur. GUI screen 800 may also show the average number of states and the average duration of the selected conversations in a second panel 820. GUI screen 800 may also show options to navigate to the individual conversations associated with the state.

Figure 9:
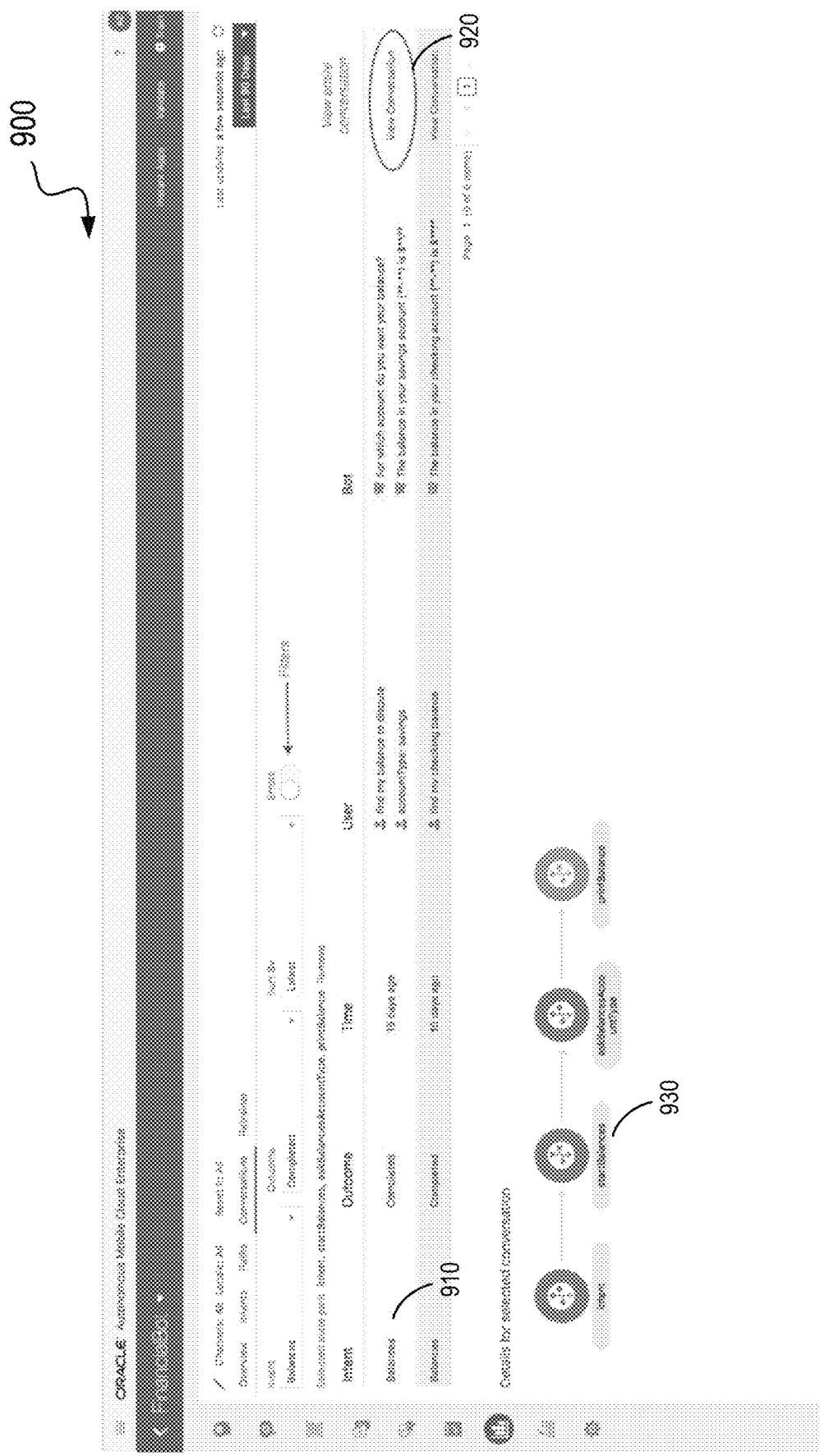
FIG. 9 depicts an example of a graphical user interface screen displaying information regarding conversations associated with a bot system according to certain embodiments.

FIG. 9 depicts an example of a graphical user interface screen 900 displaying information regarding selected conversations associated with a bot system according to certain embodiments. A user may navigate to GUI screen 900 from, for example, GUI screens 400, 500, 600, 700, and 800. The conversations may be selected or filtered based on, for example, the channel, locale, time period, intent, the status (e.g., completed or incomplete), and the final state, and may be sorted according to a user selected order. GUI screen 900 may show a list of conversations 910 that meet the filtering criteria. In some embodiments, the conversations may be filtered using text search, such as matching a search term or phrase with text in the conversation content or error messages. In some embodiments, only a subset of messages in a conversation may be shown, and the entire set of messages for the conversation may be viewed by clicking a "View Conversation" tab 920. In some embodiments, a linear path diagram 930 for a selected conversation may be shown in GUI screen 900.

Figure 10:
FIG. 10 depicts an example of a graphical user interface screen displaying information for improving a bot system according to certain embodiments.

FIG. 10 depicts an example of a graphical user interface screen 1000 displaying information for improving a bot system according to certain embodiments. GUI screen 1000 may show utterances for which the bot system fails to classify or misclassifies. The utterances may be selected or filtered based on certain criteria. For example, the utterances may be selected or filtered by selecting conversations associated with unresolved intents. In some embodiments, additional criteria may be added to select the utterances. For each utterance for which the bot system fails to identify the intent or misclassifies the intent, the possible matching intents and the respective scores may be shown, for example, by a bar chart 1010. Each utterance for which the bot system fails to identify the intent or misclassifies the intent may be selected (e.g., by hovering a pointer over the corresponding bar chart), and the scores corresponding to the probabilities of matching between the utterance and the respective intents may be displayed in a pop-up tab 1020. In some embodiments, a bot developer or administrator may specify the appropriate intents for the utterances by clicking a "Select Intent" tab 1030. The bot system, more specifically, the intent classification module of the bot system, may then be re-trained using these utterances and the corresponding specified intents.

Figure 11:
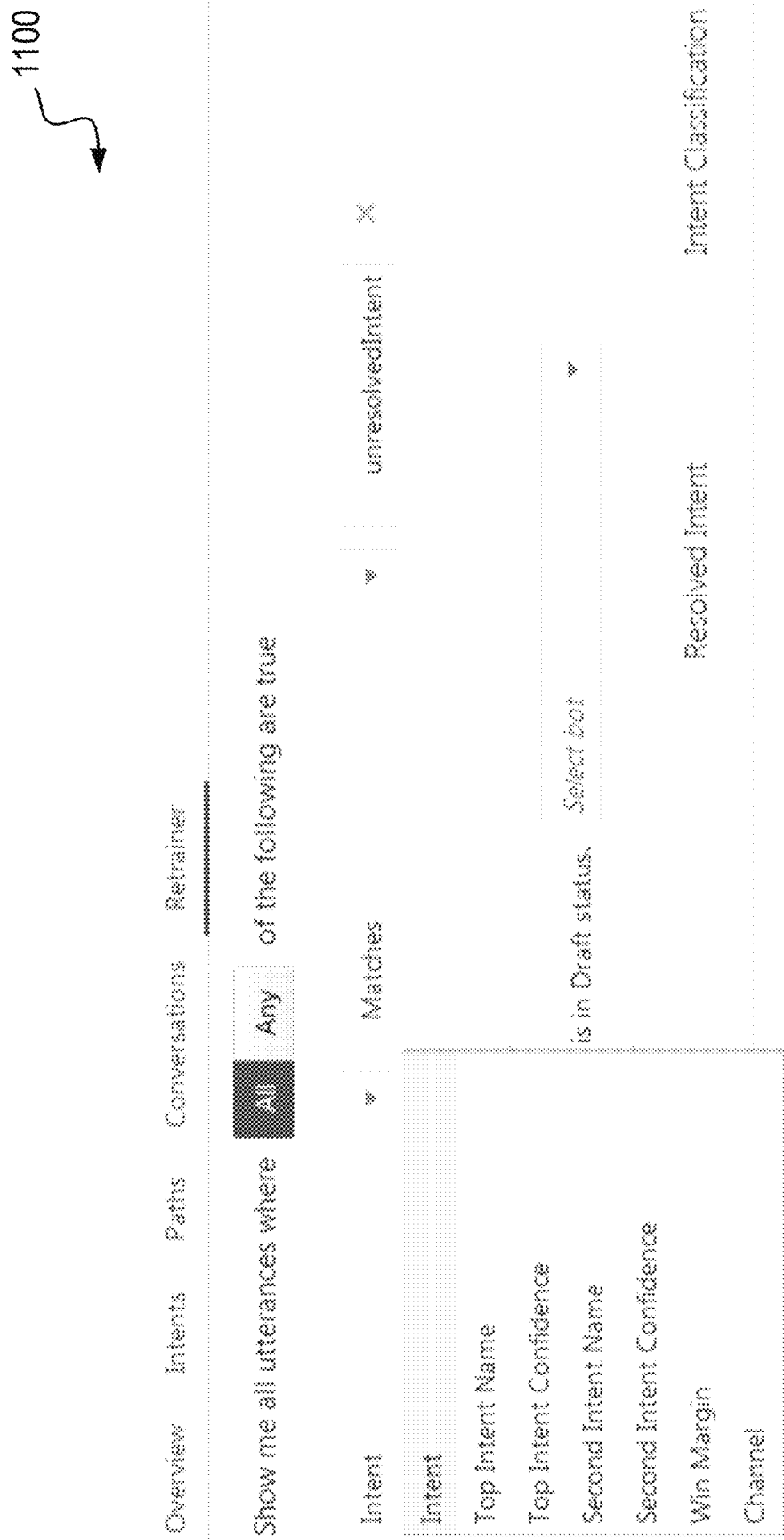
FIG. 11 depicts an example of a graphical user interface screen displaying filtered end user utterances associated with a bot system according to certain embodiments.

FIG. 11 depicts an example of a graphical user interface screen 1100 displaying options for filtering end user utterances associated with a bot system according to certain embodiments. As illustrated, a bot developer or administrator may identify utterances based on, for example, the top intent name, top intent confidence, second top intent name, second top intent confidence, channel, win margin (e.g., the difference in scores for the top intent and the second top intent), and the like. The utterances may be added individually or in batch for re-training the intent classification model.

Figure 12:
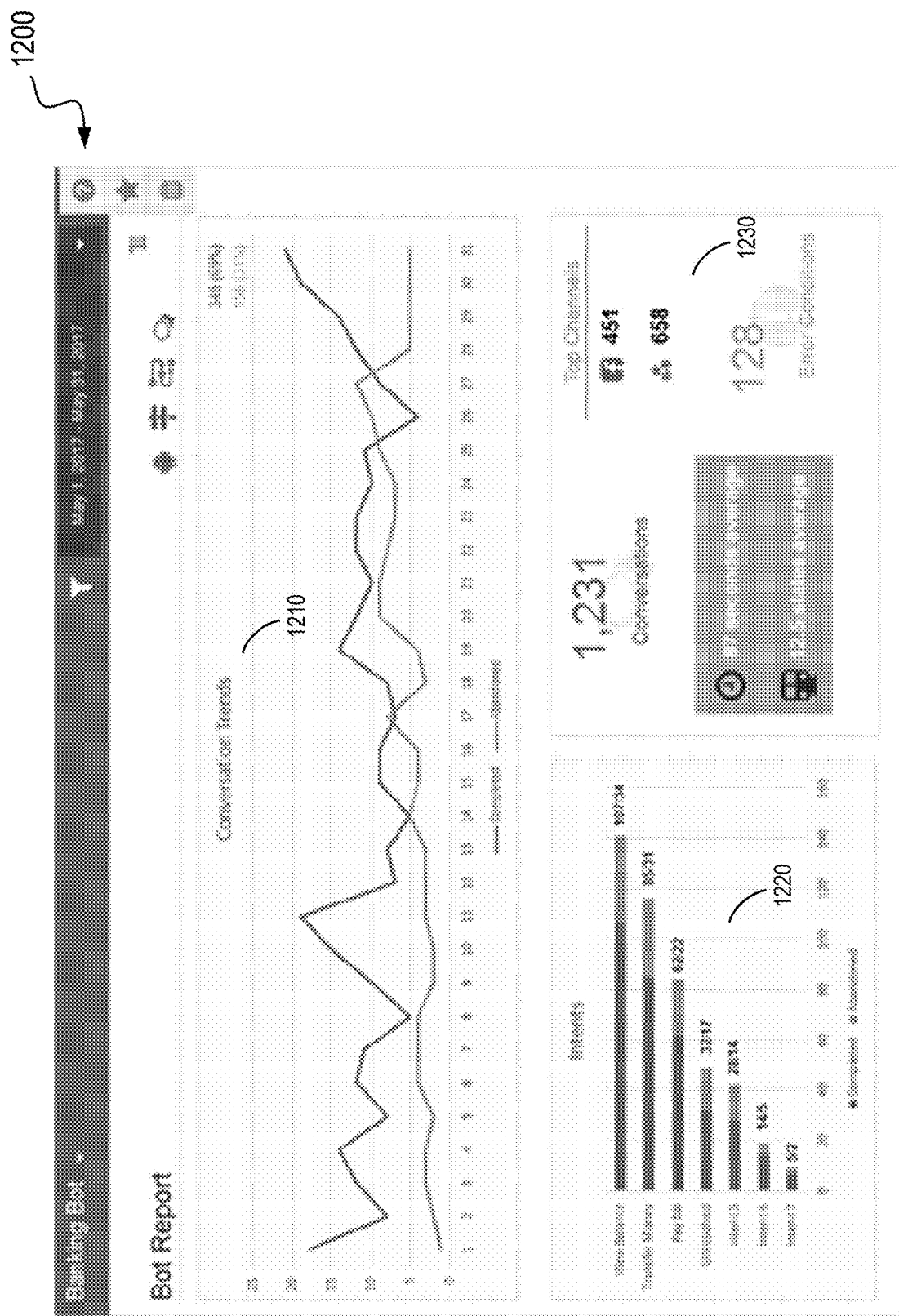
FIG. 12 depicts an example of a graphical user interface displaying summarized information of conversations associated with a bot system according to certain embodiments.

FIG. 12 depicts an example of a graphical user interface screen 1200 displaying summarized information of conversations associated with a bot system (e.g., a banking bot) according to certain embodiments. GUI screen 1200 may provide an overall bot report based on data and information across all intents collected within a certain time period. In some embodiments, conversations may be selected or filtered. The bot report may include a trend graph 1210 showing the trends of completed conversations and incomplete conversations over time. The bot report may also indicate the numbers (and/or percentage) of completed and abandoned conversations. The bot report may further include a stacked bar chart 1220 showing the number of conversations (completed and incomplete) for each intent. The bot report may further include a panel 1230 showing statistics for the conversations, such as the total number of conversations, the number of end users for each channel (e.g., Facebook, Webhook, etc.), the number of error conditions, the average number of states in the conversations, the average duration of the conversations, and the like. More details of the conversations may be accessed from the bot report to facilitate the debug and improvement of the bot system.

Figure 13:
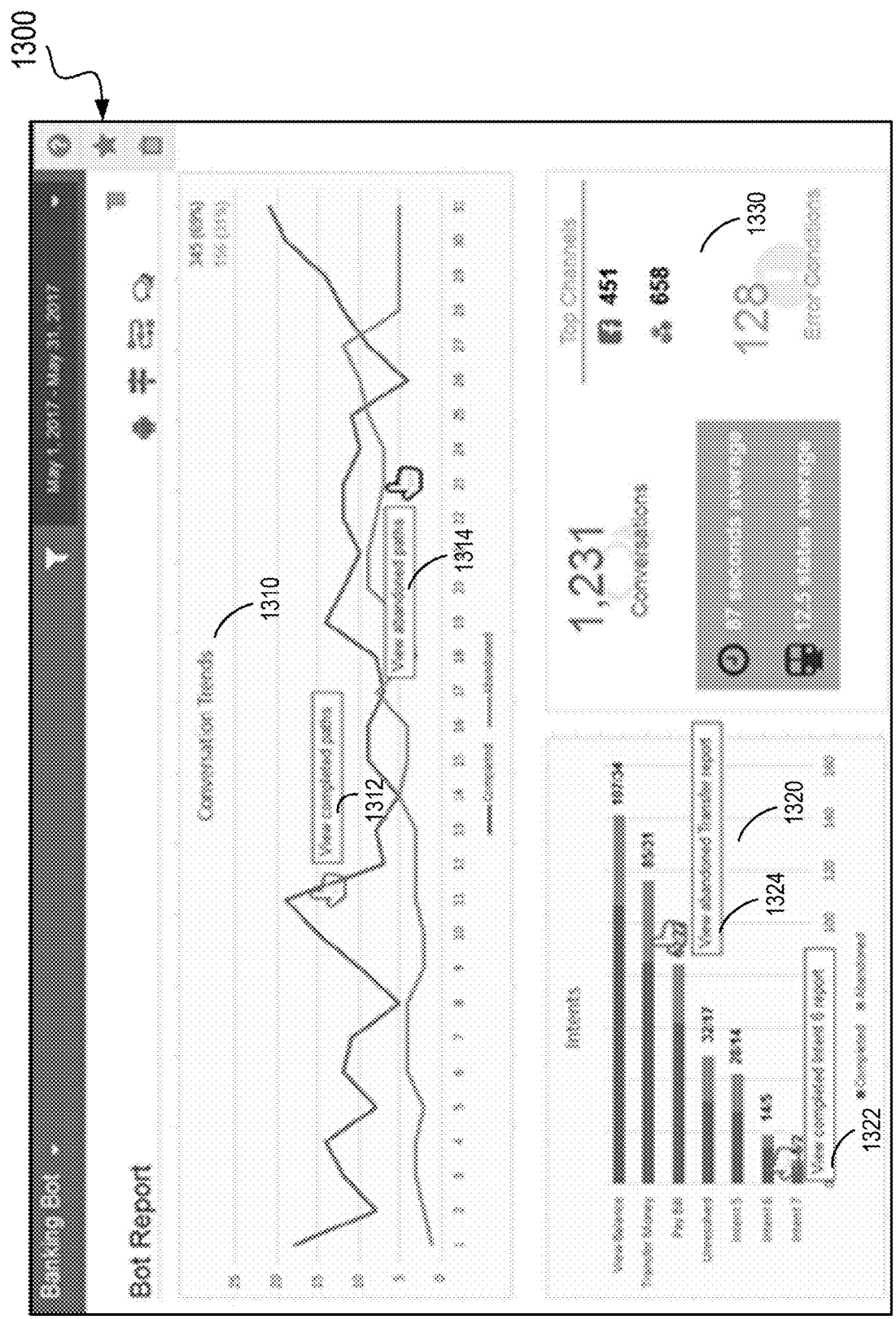
FIG. 13 depicts an example of a graphical user interface screen displaying options for viewing detailed conversation information associated with a bot system from a bot report according to certain embodiments.

FIG. 13 depicts an example of a graphical user interface screen 1300 displaying options for viewing detailed conversation information associated with a bot system from a bot report according to certain embodiments. GUI screen 1300 may show a bot report including a trend graph 1310, a stacked bar chart 1320, and a panel 1330 showing the statistics as described above with respect to GUI screen 1200. More details of the conversations may be accessed from the bot report. For example, hovering a pointer over the trend chart for the completed conversations may cause a "View Completed Paths" tab 1312 to pop up. Selecting "View Completed Paths" tab 1312 may cause a report for the completed conversations to be generated and displayed. Similarly, hovering the pointer over the trend chart for the incomplete conversations may cause a "View Abandoned Paths" tab 1314 to pop up. Selecting "View Abandoned Paths" tab 1314 may cause a report for the incomplete conversations to be generated and displayed. Hovering the pointer over a portion of a stacked bar for a potential intent in stacked bar chart 1320 may cause a tab 1322 or 1324 to pop up. Selecting tab 1322 or 1324 may cause a report for the completed or incomplete conversations associated with the intent to be generated and displayed.

Figure 14:
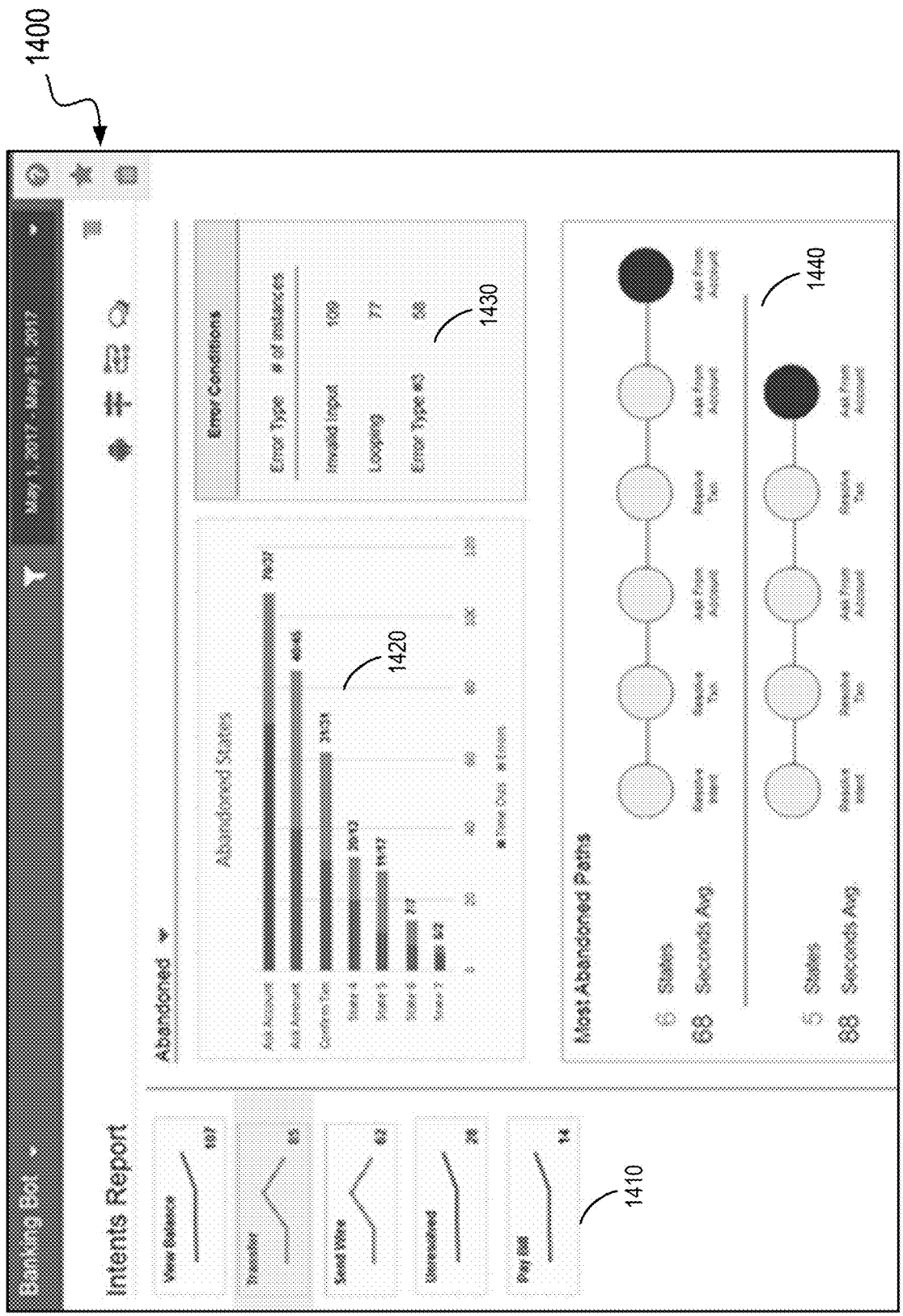
FIG. 14 depicts an example of a graphical user interface screen displaying summarized information regarding end user intents for abandoned conversations associated with a bot system according to certain embodiments.

FIG. 14 depicts an example of a graphical user interface screen 1400 displaying summarized information regarding end user intents for abandoned conversations associated with a bot system according to certain embodiments. GUI screen 1400 may include an intent report showing summarized information about a specific intent. The available intents are shown on a panel 1410. GUI screen 1400 may also include a bar chart 1420 showing the states where the incomplete conversations stop and the number of conversations that stop at each corresponding state. The incomplete conversations may include conversations that are inactive for a period of time (timeout) and conversations that have errors. The statistics of the error conditions for an intent may be shown in a panel 1430. The most common incomplete paths (e.g., abandoned paths) may be shown in a panel 1440. More details of the conversations associated with each intent may be accessed from the intent report to facilitate the debug and improvement of the bot system.

Figure 15:
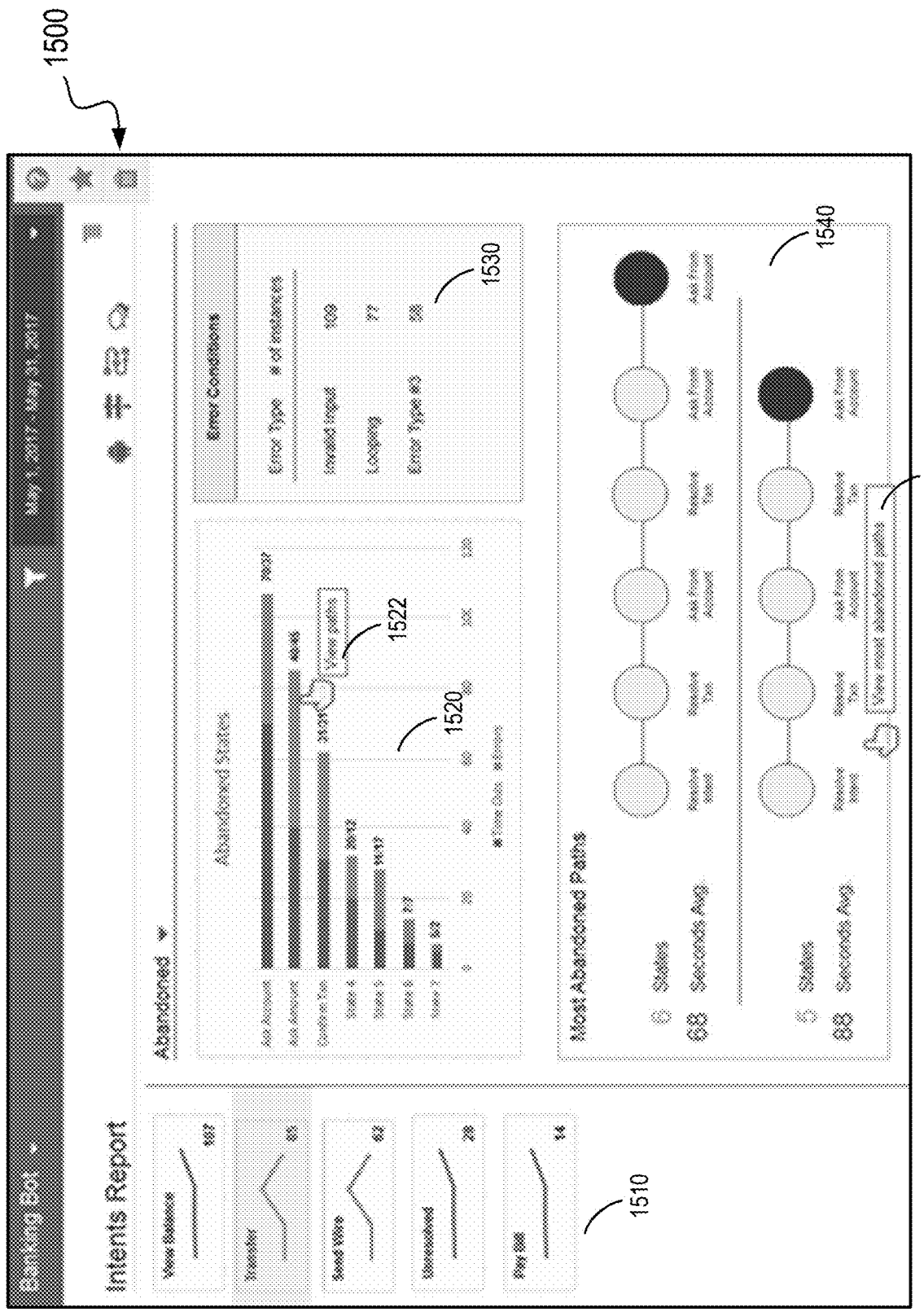
FIG. 15 depicts an example of a graphical user interface screen displaying options for viewing detailed information regarding abandoned conversations associated with a bot system from an intent report according to certain embodiments.

FIG. 15 depicts an example of a graphical user interface screen 1500 displaying options for selectively viewing detailed information regarding abandoned conversations associated with a bot system from an intent report according to certain embodiments. GUI screen 1500 may show an intent report including a panel 1510, a bar chart 1520, a panel 1530 showing the statistics of error conditions, and a panel 1540 showing the most common incomplete paths as described above with respect to panel 1410, bar chart 1420, panel 1430, and panel 1440 in GUI screen 1400. More details of the conversations may be accessed from the intent report. For example, hovering a pointer over a bar in bar chart 1520 may cause a "View Paths" tab 1522 to pop up. Selecting "View Paths" tab 1522 may cause a report for the incomplete conversations (e.g., conversations with errors) to be generated and displayed in panel 1530. Similarly, hovering the pointer over the most common incomplete paths may cause a "View Most Abandoned Paths" tab 1542 to pop up. Selecting "View Most Abandoned Paths" tab 1542 may cause a report for the incomplete conversations (e.g., abandoned conversations) to be generated and displayed.

Figure 16:
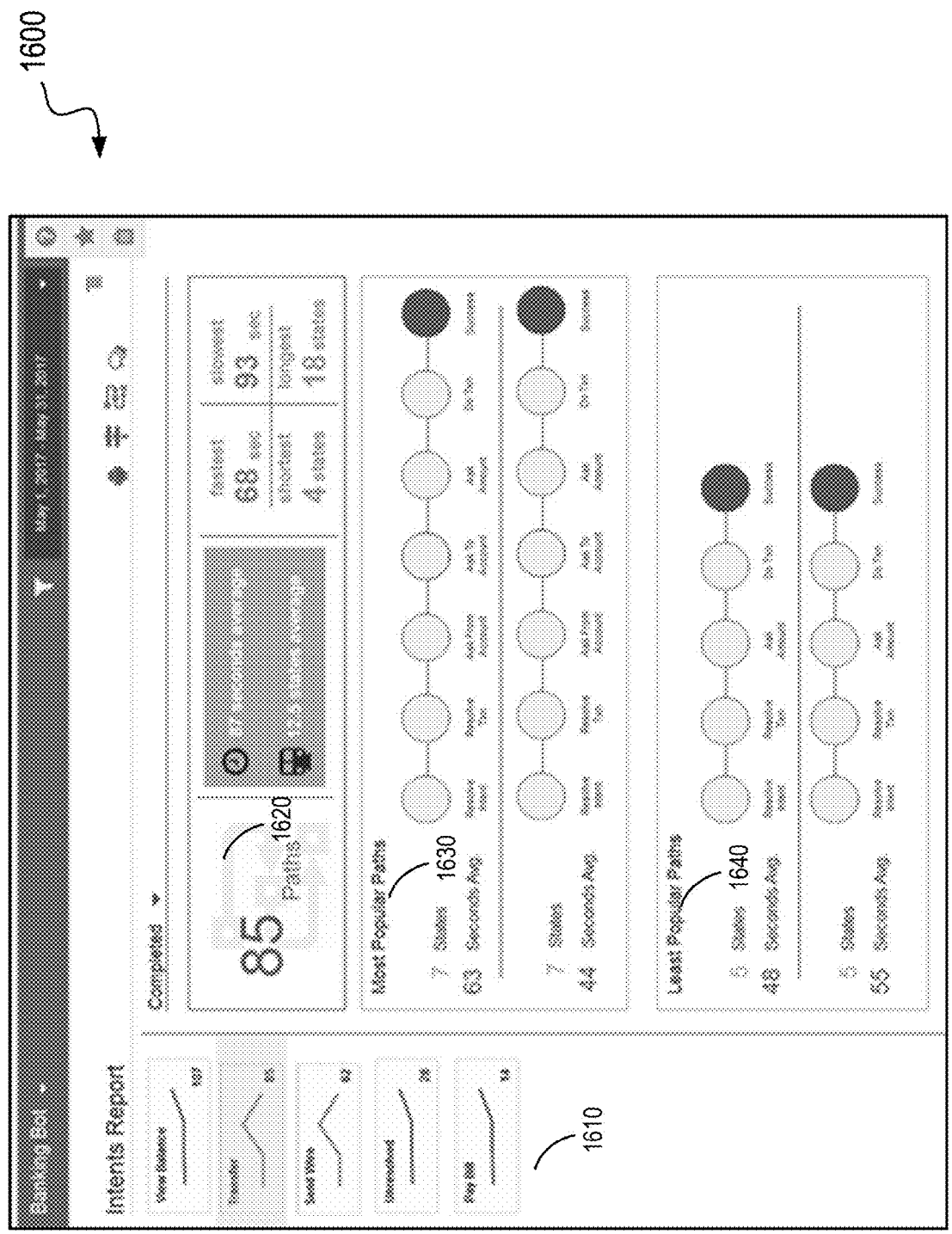
FIG. 16 depicts an example of a graphical user interface screen displaying summarized information regarding end user intents for completed conversations associated with a bot system according to certain embodiments.

FIG. 16 depicts an example of a graphical user interface screen 1600 displaying summarized information regarding end user intents for completed conversations associated with a bot system according to certain embodiments. GUI screen 1600 may show an intent report and may include a panel 1610 that shows the intents and the trend graphs for the respective intents. A user can select any of the intents to view more detail about conversations associated with the selected intent. For example, statistics regarding conversations associated with the selected intent may be displayed in a panel 1620. The statistics may include, for example, the total number of completed conversations associated with the intent, average state length, average duration, duration of the fastest path, duration of the slowest path, number of states in the shortest path, number of states in the longest path, and the like for the completed conversations associated with the intent. GUI screen 1600 may also include a panel 1630 showing the linear path diagrams for one or more most popular paths, and a panel 1640 showing the linear path diagrams for one or more least popular paths.

Figure 17:
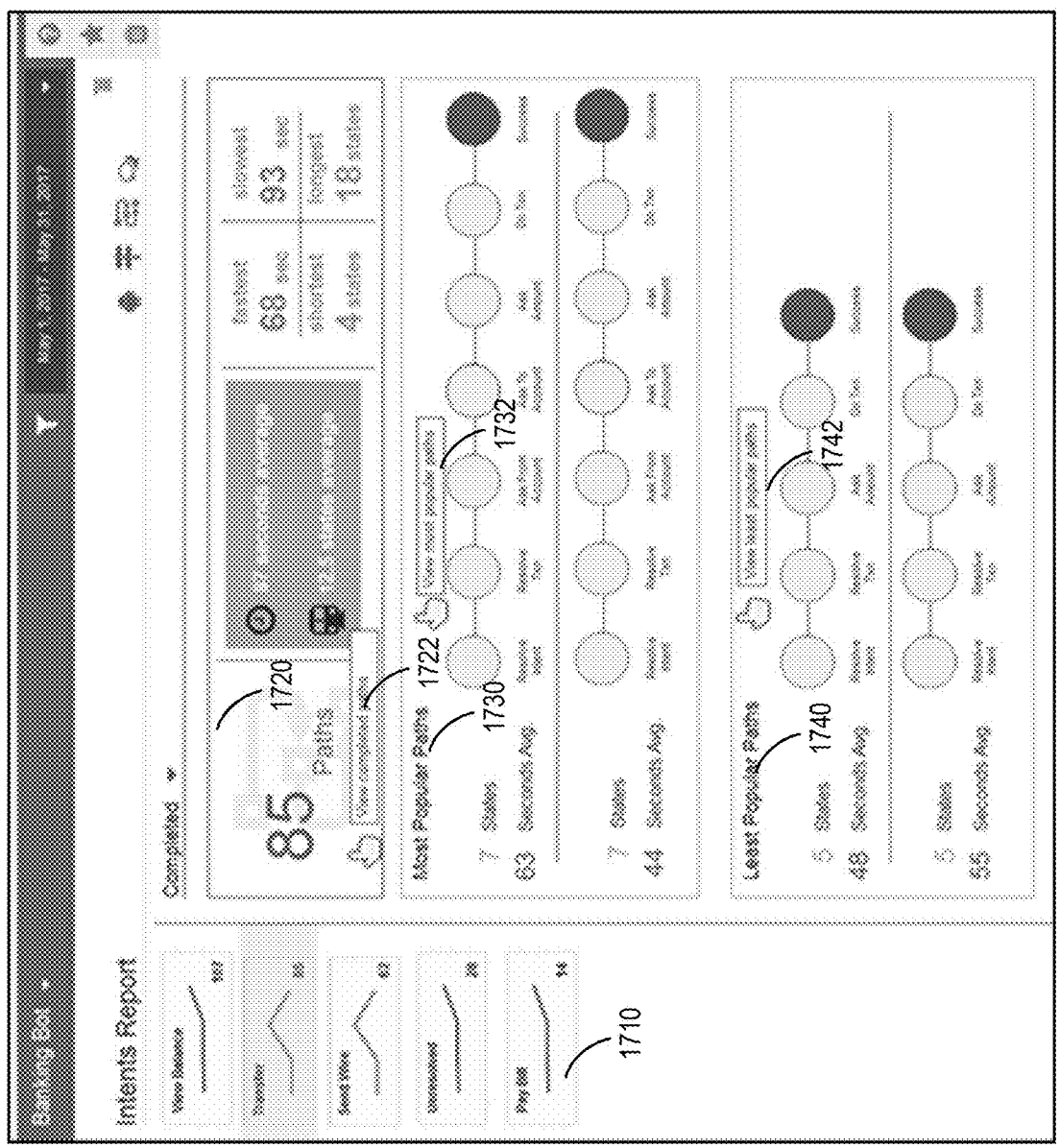
FIG. 17 depicts an example of a graphical user interface screen displaying options for viewing detailed information regarding completed conversations associated with a bot system from an intent report according to certain embodiments.

FIG. 17 depicts an example of a graphical user interface screen 1700 displaying options for viewing detailed information regarding completed conversations associated with a bot system from an intent report according to certain embodiments. GUI screen 1700 may also show an intent report including panels 1710, 1720, 1730, and 1740 as described above with respect to GUI screen 1600. More details of the completed conversations associated with an intent may be accessed from the intent report. For example, hovering a pointer in different areas in GUI screen 1700 may cause clickable tab 1722, 1732, or 1742 to pop up, and selecting the clickable tab 1722, 1732, or 1742 may cause, for example, the completed conversations, the most popular paths, or the least popular paths to be displayed.

Figure 18:
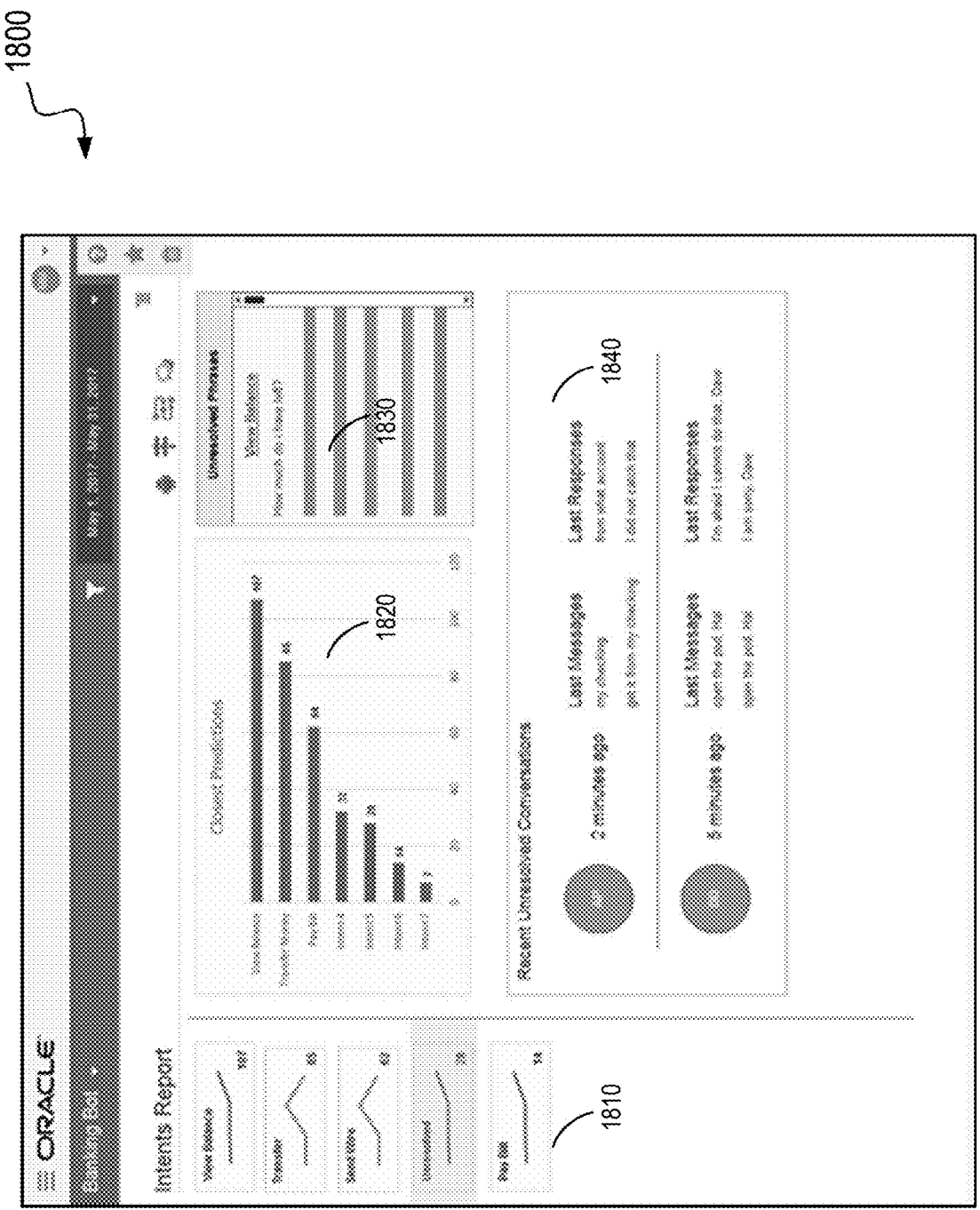
FIG. 18 depicts an example of a graphical user interface screen displaying summarized information regarding unresolved end user intents for conversations associated with a bot system according to certain embodiments.

FIG. 18 depicts an example of a graphical user interface screen 1800 displaying summarized information regarding unresolved end user intents for conversations associated with a bot system according to certain embodiments. GUI screen 1800 may show an unresolved intent report and may include a panel 1810 that shows the intents and the trend graphs for the respective intents. A user can select any of the intents to view more detail about conversation associated with the selected intent. For example, when the unresolved intent is selected, the numbers of conversations without a resolved intent that are most likely associated with the respective intents may be displayed as a bar chart in a panel 1820. A panel 1830 may display the final phrases in conversations without a successfully classified intent. One or more most recent conversations that are not successfully classified as associated with an intent may be displayed in a panel 1840.

Figure 19:
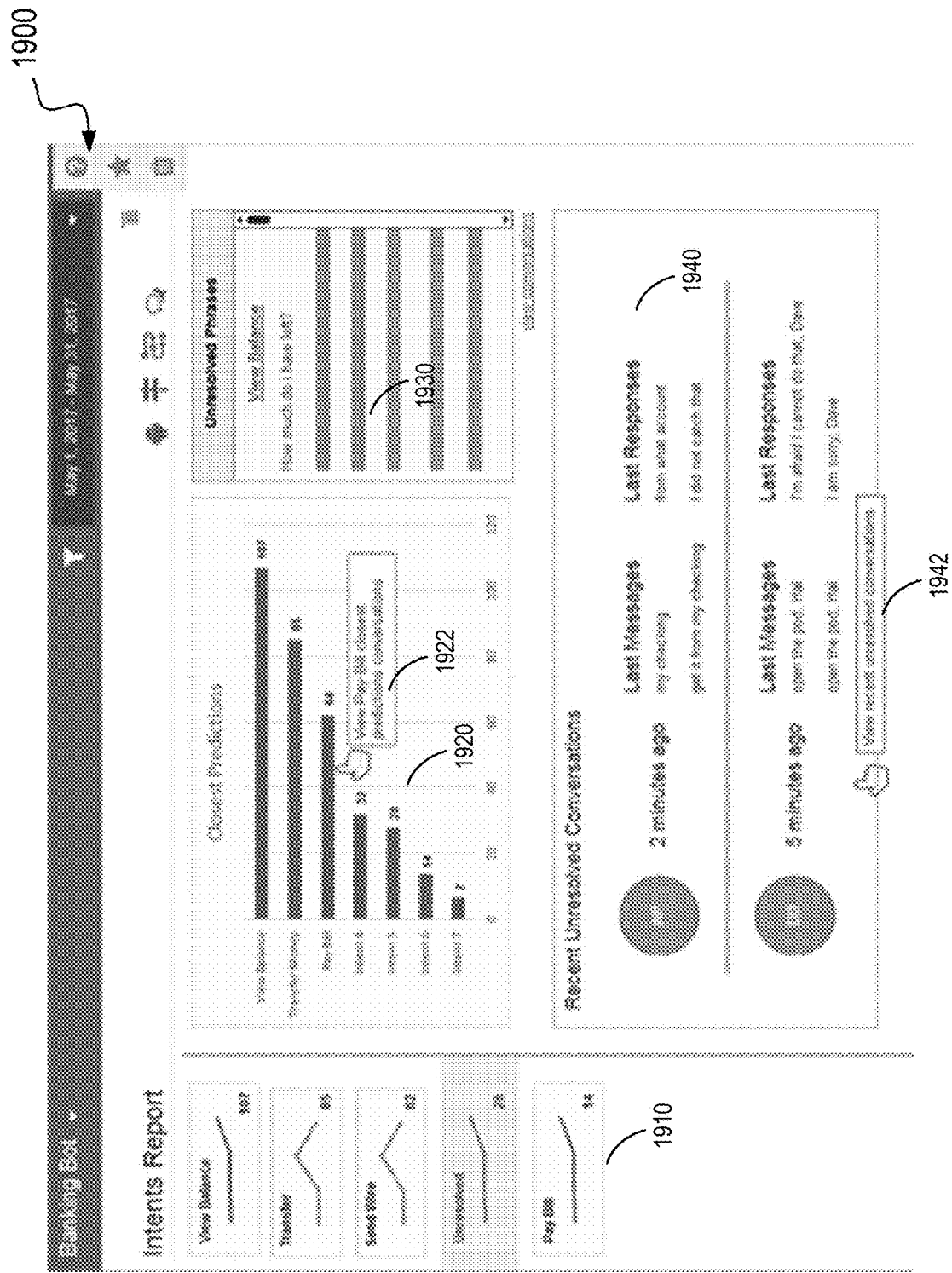
FIG. 19 depicts an example of a graphical user interface screen displaying options for viewing detailed information regarding unresolved end user intents for conversations associated with a bot system from an intent report according to certain embodiments.

FIG. 19 depicts an example of a graphical user interface screen 1900 displaying options for viewing detailed information regarding unresolved end user intents for conversations associated with a bot system from an intent report according to certain embodiments. GUI screen 1900 may also show an unresolved intent report including panels 1910, 1920, 1930, and 1940 as described above with respect to panels 1810, 1820, 1830, and 1840 in GUI screen 1800. More details of the conversations without a resolved intent may be accessed from the unresolved intent report. For example, hovering a pointer in different areas in GUI screen 1900 may cause clickable tab 1922 or 1942 to pop up, and selecting the clickable tab 1922 or 1932 may cause, for example, conversations that are not successfully classified but are most likely associated with a particular event, or the most recent conversations that are not successfully classified to be displayed.

Figure 20:
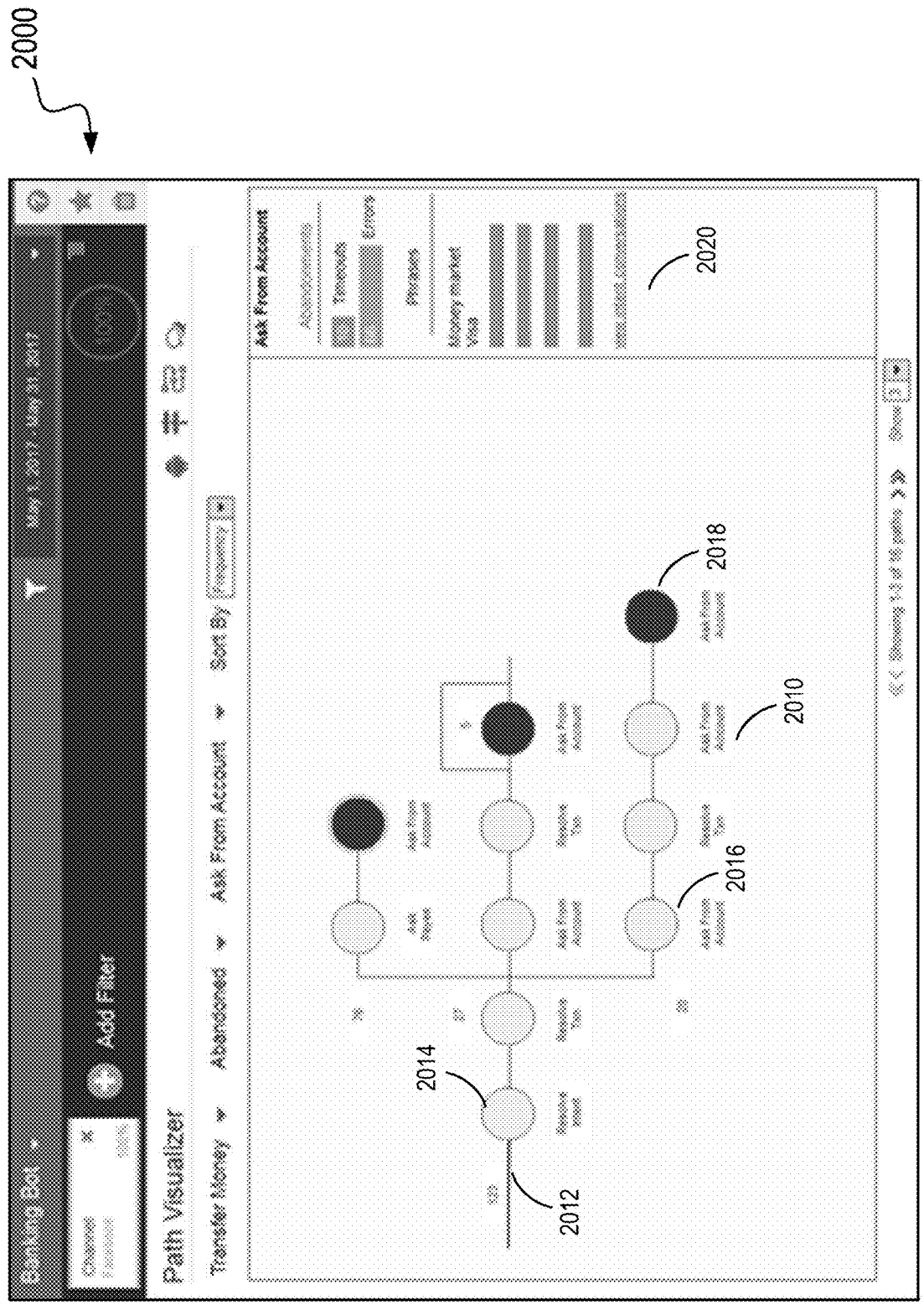
FIG. 20 depicts an example of a graphical user interface screen displaying summarized information regarding paths of conversations associated with a bot system according to certain embodiments.

FIG. 20 depicts an example of a graphical user interface screen 2000 displaying summarized information regarding paths of conversations associated with a bot system according to certain embodiments. GUI screen 2000 may display an aggregated path diagram 2010 showing paths selected according to a set of one or more filtering criteria. A user may select one or more intents and one or more categories of paths (e.g., completed, incomplete, abandoned, timeout, or all) during a certain time period. A user may also select a particular end state (e.g., "Ask From Account" as shown in the example) and sort the paths by, for example, frequency, length (e.g., number of states), and/or duration (e.g., time to completion). A user may also select the number of paths to shown on a same GUI screen and may navigate to one or more GUI screens to view all paths. Aggregated path diagram 2010 may include multiple states 2016 (each represented by a node) and connections 2012 between states (representing transitions between states). Aggregated path diagram 2010 may show conversation flows that start at a start state 2014, go through some intermediate states, and end at an end state 2018. The conversations may be completed or may be incomplete. A number shown with a connection 2012 or a state 2016 may indicate the total number of conversations that go through the particular transition or state. In some embodiments, metadata for a path, a node, or a connection selected by a user may be viewed by clicking on the path, node, or connection. A panel 2020 may show the number of abandoned conversations due to, for example, timeout or errors. Panel 2020 may also show the end user utterances at a selected state.

Figure 21:
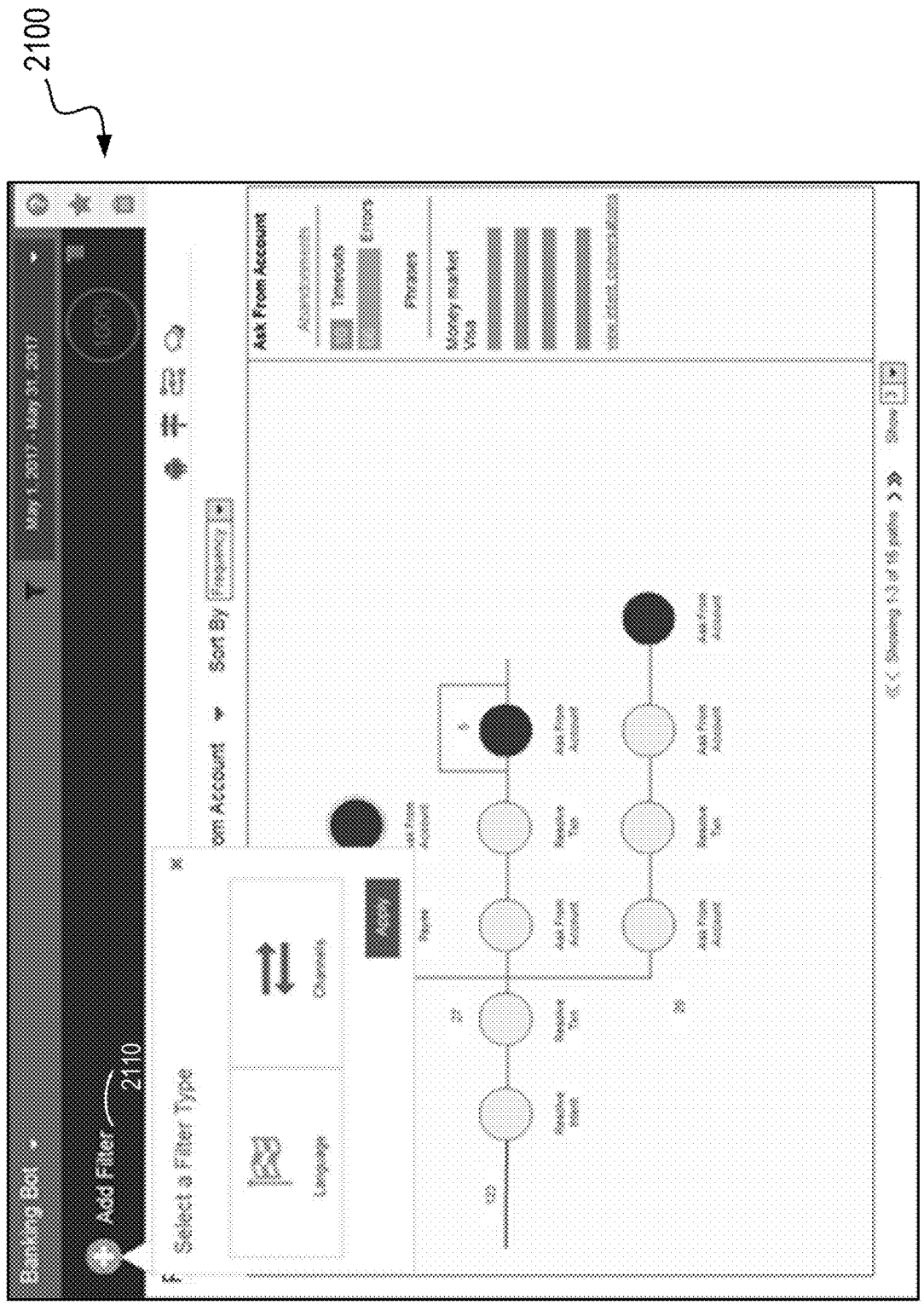
FIG. 21 depicts an example of a graphical user interface screen displaying options for filtering conversations according to certain embodiments.

FIG. 21 depicts an example of a graphical user interface screen 2100 displaying options for filtering conversations according to certain embodiments. One or more filters may be used for filtering conversations. In the example shown in FIG. 21, a filter may be selected by clicking on a filter icon 2110, and two types of filters based on the language or channel may be shown for selection.

Figure 22:
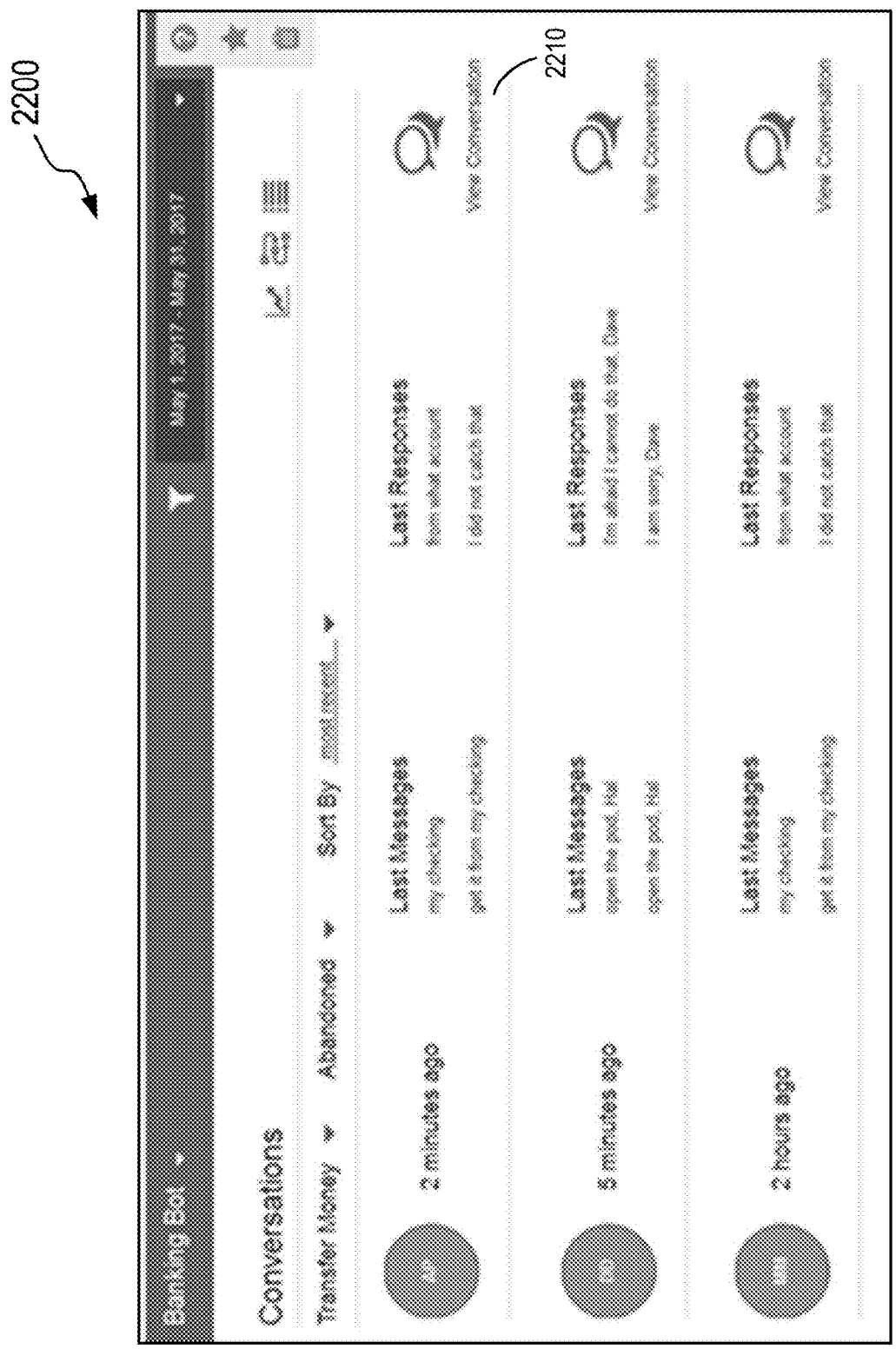
FIG. 22 depicts an example of a graphical user interface screen displaying a conversation report for a bot system according to certain embodiments.

FIG. 22 depicts an example of a graphical user interface screen 2200 displaying a conversation report for a bot system according to certain embodiments. GUI screen 2200 may present a list of conversations selected or filtered according to a given filtering criterion, such as any combination of an intent, an end status, and a time period. The conversation may be sorted based on, for example, the time of each conversation. A user may select a specific conversation to view by clicking on a "view conversation" icon 2210.

Figure 23:
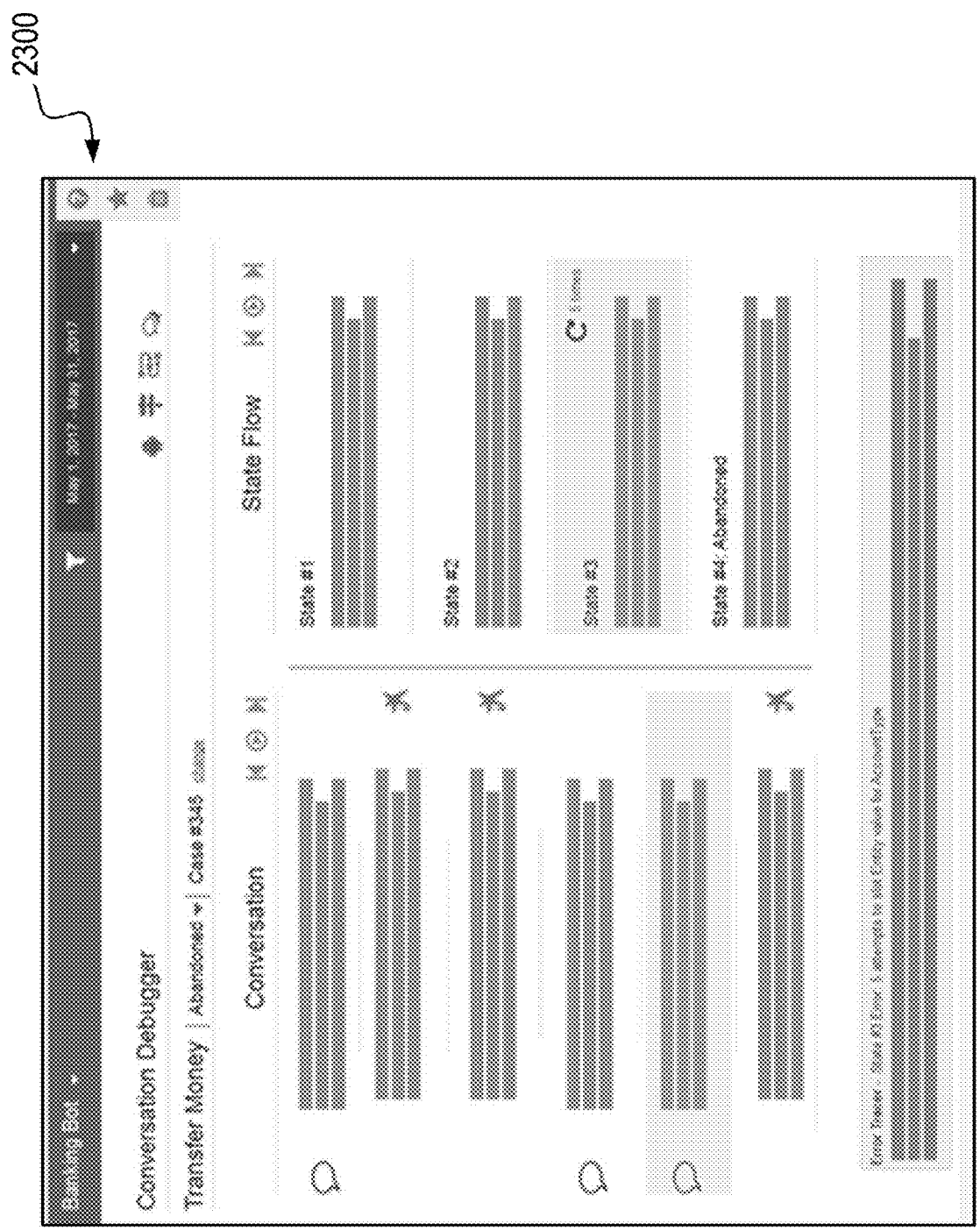
FIG. 23 depicts an example of a graphical user interface screen displaying an individual conversation associated with a bot system according to certain embodiments.

FIG. 23 depicts an example of a graphical user interface screen 2300 displaying an individual conversation associated with a bot system according to certain embodiments. GUI screen 2300 may show the conversation transcript, the flow of states during the conversation, and/or any error conditions associated with individual messages (or end user utterances).

FIG. 24 depicts some icons used in some of the graphic user interface screens described above, such as the examples of GUI screens shown in FIGS. 12-23.

As shown in FIGS. 20 and 21 described above, an aggregated path diagram may be provided on a GUI screen by, for example, a path visualization component (referred to herein as a "path visualizer") of the bot analytic system. The path visualizer may allow an administrator or a developer of the bot system to monitor and analyze how end users are interacting with the bot system in order to diagnose underperforming elements of the bot system. For example, sessions of end user interactions (e.g., text, audio, or video conversations) with the bot system may be represented by paths in the path visualizer. The path visualizer may allow an administrator or developer to select the paths or conversations based on different filtering criteria. Statistics of the end user conversation can also be generated and displayed graphically by the path visualizer to facilitate the monitoring, analysis, diagnosis, and improvement of the performance of the bot system. By identifying underperforming elements and improving the bot system accordingly, end user frustrations from interactions with the bot system may be reduced or prevented.

An aggregated path diagram may include one or more paths represented by one or more linear path diagrams. Each conversation flow may be represented by a linear path diagram, which may include one or more start nodes, one or more intermediate nodes, and one or more end nodes, where each node may represent a state of the bot system. Different types of nodes may be presented in different way (e.g., different colors, different symbols, etc.) such that they can be easily identified. For example, the node where the conversation is abandoned may be shown in red color, while the end node of a complete conversation may be shown in green color. The nodes can be associated with information, such as the detailed end user utterances and corresponding intents of the end users, that is accessible though the GUI. For example, when a mouse is moved over or clicked on a node, the associated information may be displayed. Menus or other GUI components may also be provided such that the administrator or developer of the bot system can select paths (end user conversations) based on different filtering criteria, such as end user intents (e.g., order pizza, cancel order, etc.), types of end nodes (e.g., completed or abandoned), end states of the conversations (e.g., pizza ordered, resolve pizza type, resolve crust, check age, payment authorization, etc.), and the frequency of the types of conversations, etc. For example, conversations for different intents may be selected using a pull-down menu; conversations having different types of end nodes (e.g., completed or abandoned) may be selected using a pull-down menu; and conversations having different end states may be selected using a pull-down menu. The paths can be sorted using a pull-down menu, such as based on the frequencies of end user conversations going through the respective paths. In this way, an administrator or developer can view the conversations of interest, such as examining only the abandoned conversations and/or the end states of the abandoned conversations, in order to determine why end users did not complete certain types of transactions.

Figure 25:
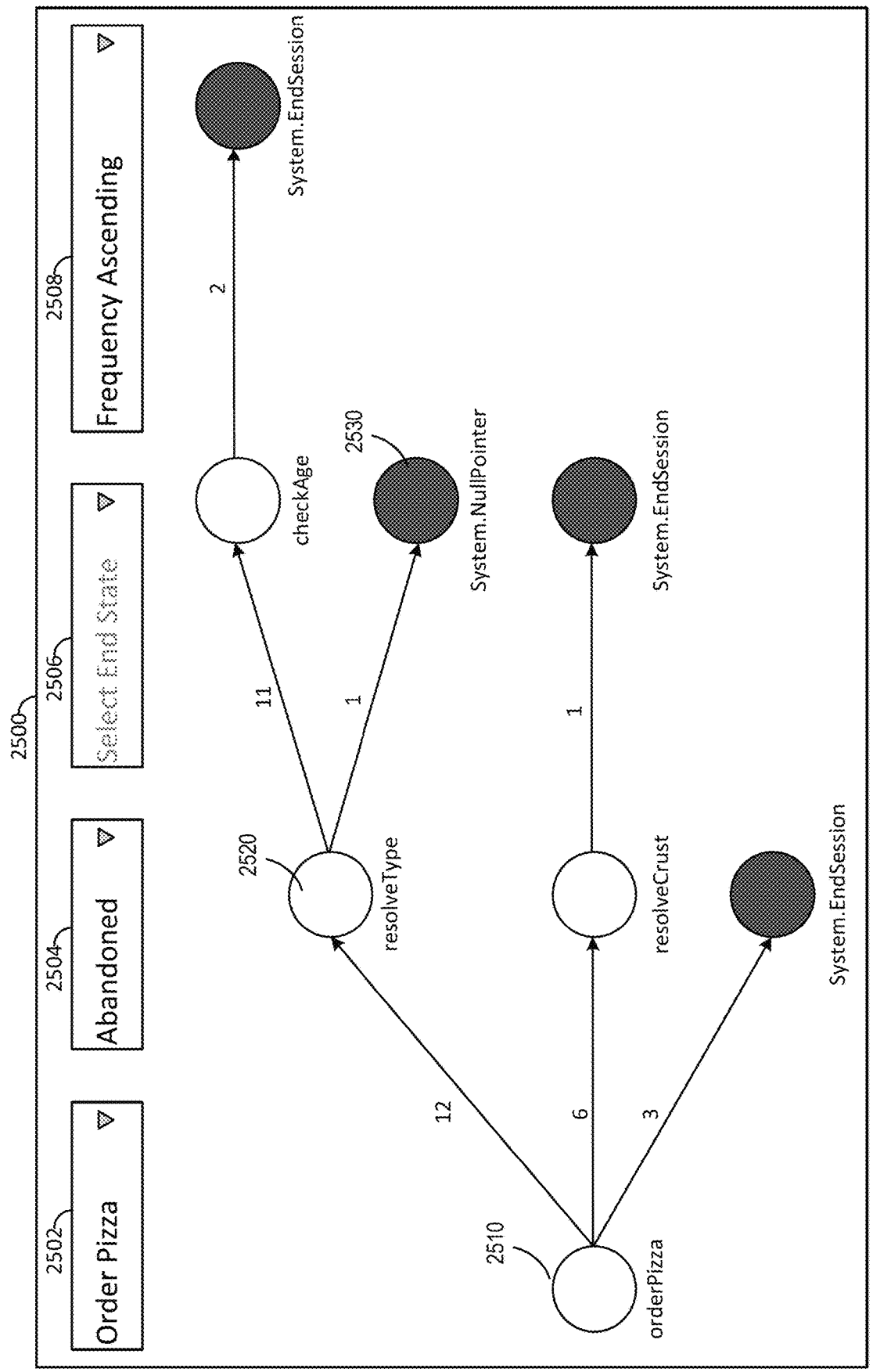
FIG. 25 depicts an example of a graphical user interface screen displaying visualized paths of conversations associated with a bot system according to certain embodiments.

FIG. 25 depicts an example of a graphical user interface screen 2500 displaying visualized paths of conversations associated with a bot system according to certain embodiments. GUI screen 2500 may include an aggregated path diagram that includes one or more nodes and one or more linear path diagrams, where each node may represent a state in a state machine for the bot system, and each linear path diagram may represent a conversation flow that may have multiple instances (e.g., individual conversations). The aggregated path diagram may include one or more start nodes (e.g., a node that does not have any preceding node), one or more intermediate nodes (e.g., a node that has at least one connection going into the node and at least one connection going out of the node), and one or more end nodes (e.g., a node that does not have any connections going out of the node). For example, a linear path diagram in the aggregated path diagram in GUI screen 2500 may have a start node 2510 labeled "orderPizza," an intermediate node 2520 labeled "resolveCrust," and an end node 2530 labeled "System.EndSession."

In some embodiments, each node in the aggregated path diagram may be represented by a particular color to indicate a type of node and/or whether the node is an end node. For example, the aggregated path diagram in GUI screen 2500 shows the start node and each of the intermediate nodes in white color. However, it should be recognized that a different color or something other than color (e.g., unique filling pattern) may be used to represent different types of nodes. In addition, it should be recognized that the start nodes and intermediate nodes may be distinguished by different colors or different ways to indicate that they are different. For example, the start nodes may be shown in a first color and the intermediate nodes may be shown in a second color.

In some embodiments, an end node may be made a particular color to indicate whether the end node represents a successful or an unsuccessful outcome (as defined by the bot system). For example, the aggregated path diagram in GUI screen 2500 may show each of the end nodes associated with an unsuccessful outcome or incomplete conversation in red. However, it should be recognized that successful and unsuccessful outcomes (and completed or incomplete conversations) may be indicated by colors other than red and/or in ways other than by color.

As described above, the bot system may use one or more state machines to guide the execution of the bot system during conversations with end users. Each node may represent a state of the bot system during a conversation between an end user (using an end user device) and the bot system. In some embodiments, each node may represent an end user intent determined by the bot system. When a first node is connected to a second node by an arrow from the first node to the second node, the first node may be associated with a first state and the second node may be associated with a second state, and the arrow from the first node to the second node may indicate the transition from the first state to the second state. For example, the aggregated path diagram in GUI screen 2500 may indicate that the conversation flow may transit from a state "orderPizza" to a state "resolveCrust".

A number associated with a connection in the aggregated path diagram in GUI screen 2500 may indicate a number of conversations (i.e., instances of conversation flow) that progressed from one node (state) to another node (state). For example, the aggregated path diagram in GUI screen 2500 may indicate that, in six conversations, the conversations between the end users and the bot system may have transitioned from an "orderPizza" state to a "resolveCrust" state.

In some embodiments, each node in the aggregated path diagram in GUI screen 2500 may be user-selectable. When a node is selected, additional information regarding the node may be presented in a GUI screen. For example, a list of conversations may be presented, where the list of conversations may include some or all conversations associated with the node (e.g., an intent). In another example, statistics for the node as compared to other nodes may be presented, such as a percentage of conversations with the bot system that are determined to have a particular start node.

GUI screen 2500 may further include one or more user-selectable options for changing the aggregated path diagram. For example, a first user-selectable option 2502 may be used to change a start node for the aggregated path diagram, as described below with respect to FIGS. 26 and 27. In another example, a second user-selectable option 2504 may be used to change one or more end nodes for the aggregated path diagram based upon a status of the conversation (e.g., completed or incomplete), as described below with respect to FIGS. 28 and 29. In another example, a third user-selectable option 2506 may be used to change one or more end nodes for the aggregated path diagram based upon selection of information indicating a particular end node, as described below with respect to FIGS. 30 and 31. In another example, a fourth user-selectable option 2508 may be used to change how the aggregated path diagram is displayed, such as displaying the paths according to the numbers of instances for the paths.

Figure 26:
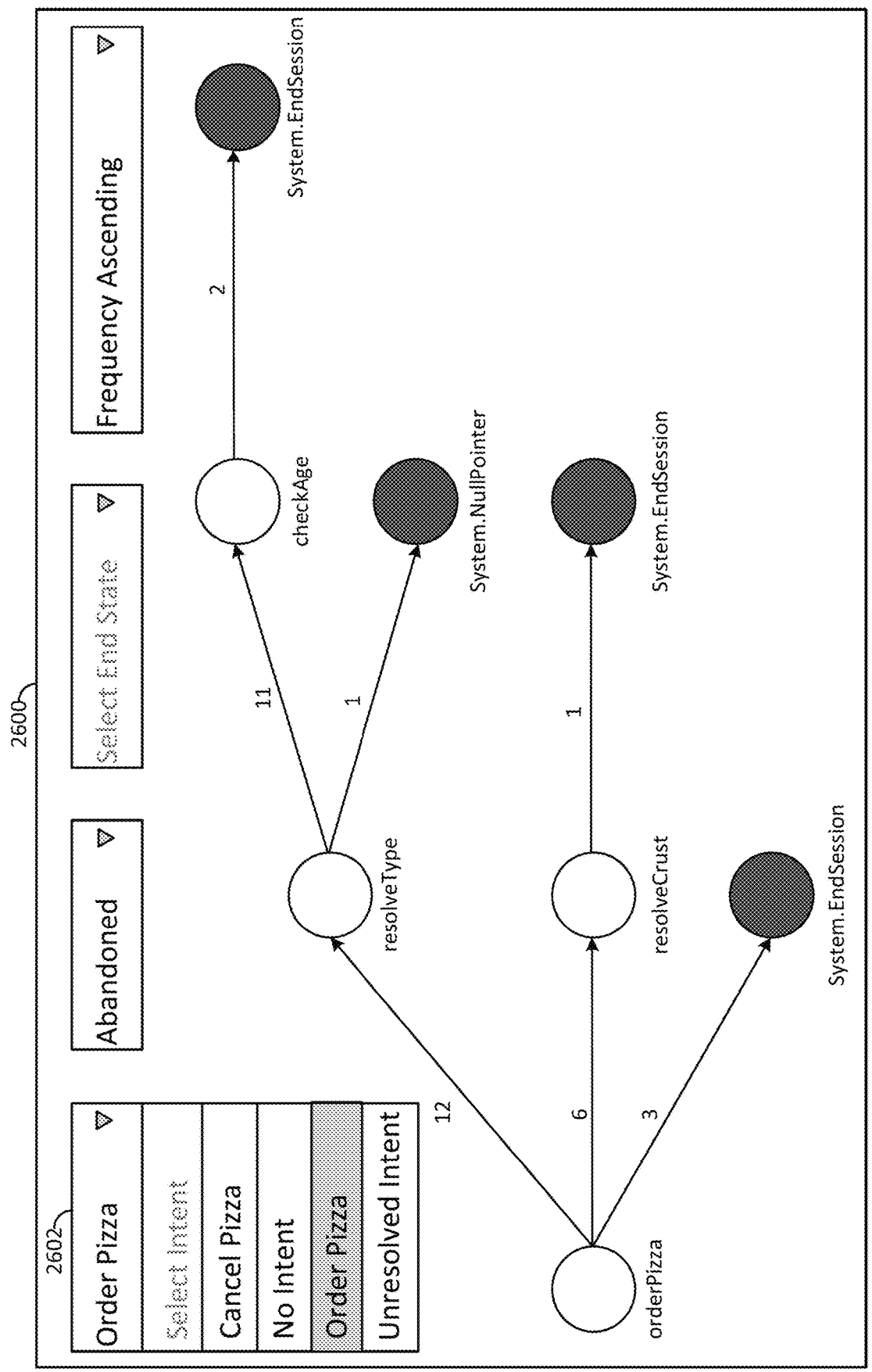
FIG. 26 depicts an example of a graphical user interface screen displaying a drop-down menu for selecting visualized paths of conversations associated with a bot system according to certain embodiments.

FIG. 26 depicts an example of a graphical user interface screen 2600 displaying a drop-down menu 2602 for selecting visualized paths of conversations associated with a bot system according to certain embodiments. GUI 2600 may result from a user selecting first user-selectable option 2502 in FIG. 25. Drop down menu 2602 may include one or more potential intents that may be used as a start node for an aggregated path diagram. In some examples, the one or more potential intents may be used to filter the conversations included in the aggregated path diagram. After the filtering, one or more nodes may be removed from the aggregated path diagram to produce a new aggregated path diagram. In some embodiments, the one or more potential intents may be used to add conversations included in the aggregated path diagram. When the new conversations are added, one or more new nodes may be added to the aggregated path diagram. For example, as illustrated, drop down menu 2602 may include "Cancel Pizza," "No Intent," "Order Pizza," and "Unresolved Intent." Selecting a different starting node from drop down menu 2602 may remove some nodes and/or add some nodes.

In the example shown in FIG. 26, the "No Intent" state may indicate that the bot system has determined that an end user utterance may not have a particular intent. The "Unresolved Intent" state may indicate that the bot system is unable to determine an intent based on an end user utterance. The difference between "No Intent" and "Unresolved Intent" may be that, in "Unresolved Intent," there may be multiple potential intents that may be the actual intent of the end user, while in "No Intent," there may not be a single defined intent that is likely to be the actual intent of the end user. Upon selection of a particular state or intent in drop down menu 2602, GUI screen 2600 may be updated as depicted in FIG. 27.

Figure 27:
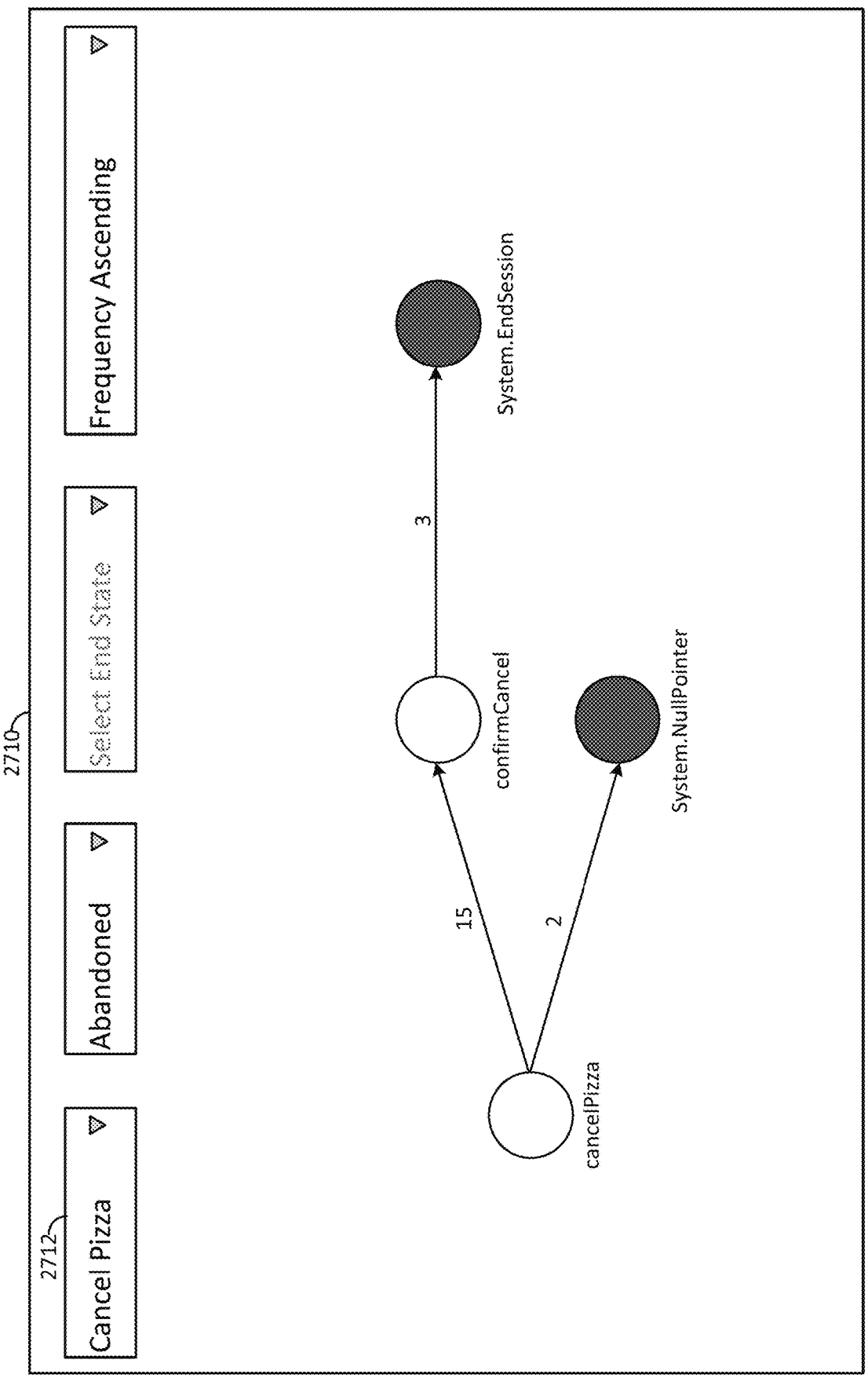
FIG. 27 depicts an example of a graphical user interface screen displaying visualized paths of selected conversations associated with a bot system according to certain embodiments.

FIG. 27 depicts an example of a graphical user interface screen 2700 displaying visualized paths of selected conversations associated with a bot system according to certain embodiments. In the example shown in FIG. 27, the starting node selected is "Cancel Pizza" as indicated by a user-selectable option 2712. Thus, the start node in the aggregated path diagram is changed to "Cancel Pizza" from, for example, "Order Pizza." Because the start node is changed, the intermediate nodes and the end nodes of the aggregated path diagram may be changed as well as compared with the aggregated path diagram shown in FIG. 26.

Figure 28:
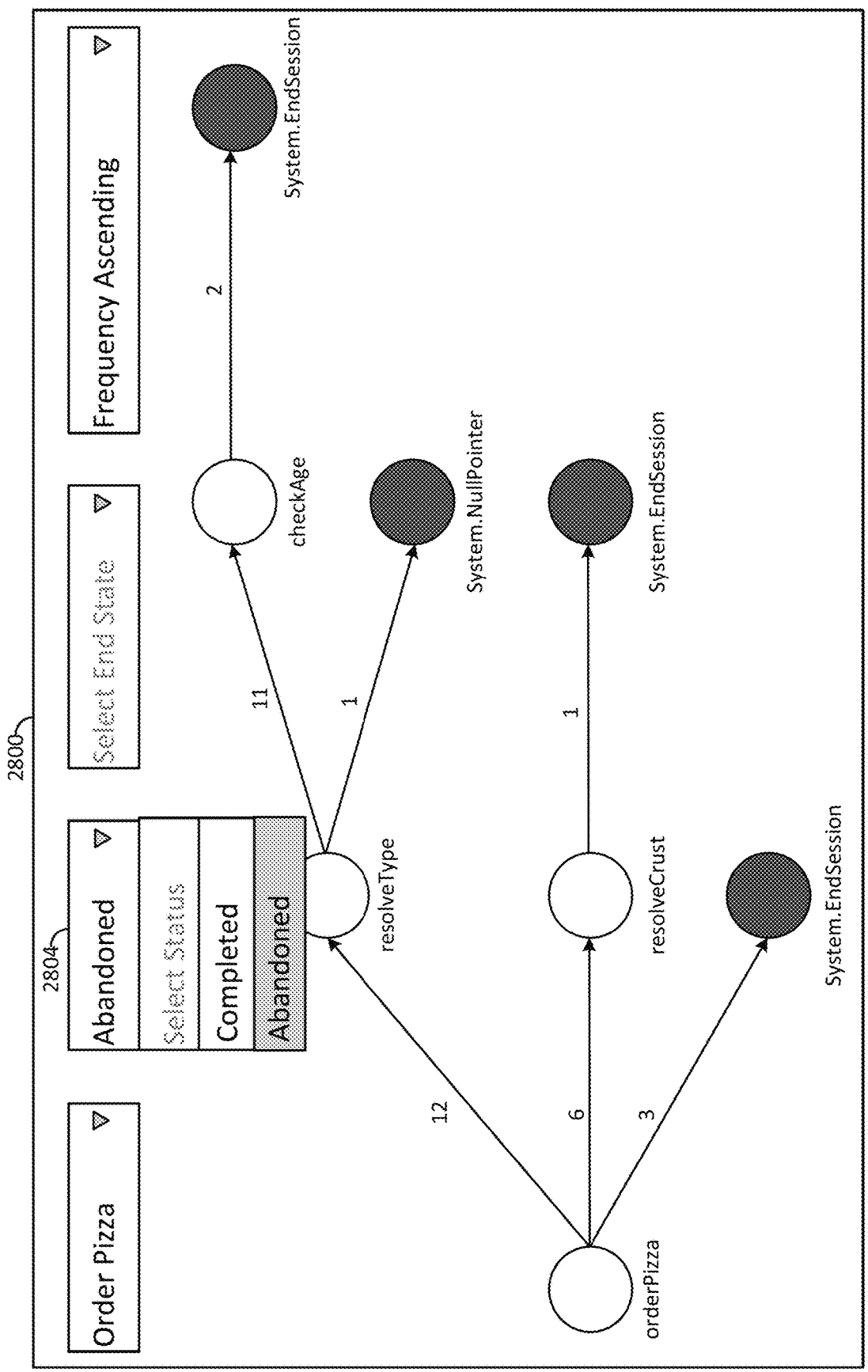
FIG. 28 depicts an example of a graphical user interface screen displaying a drop-down menu for selecting conversations associated with a bot system for path visualization according to certain embodiments.
Figure 29:
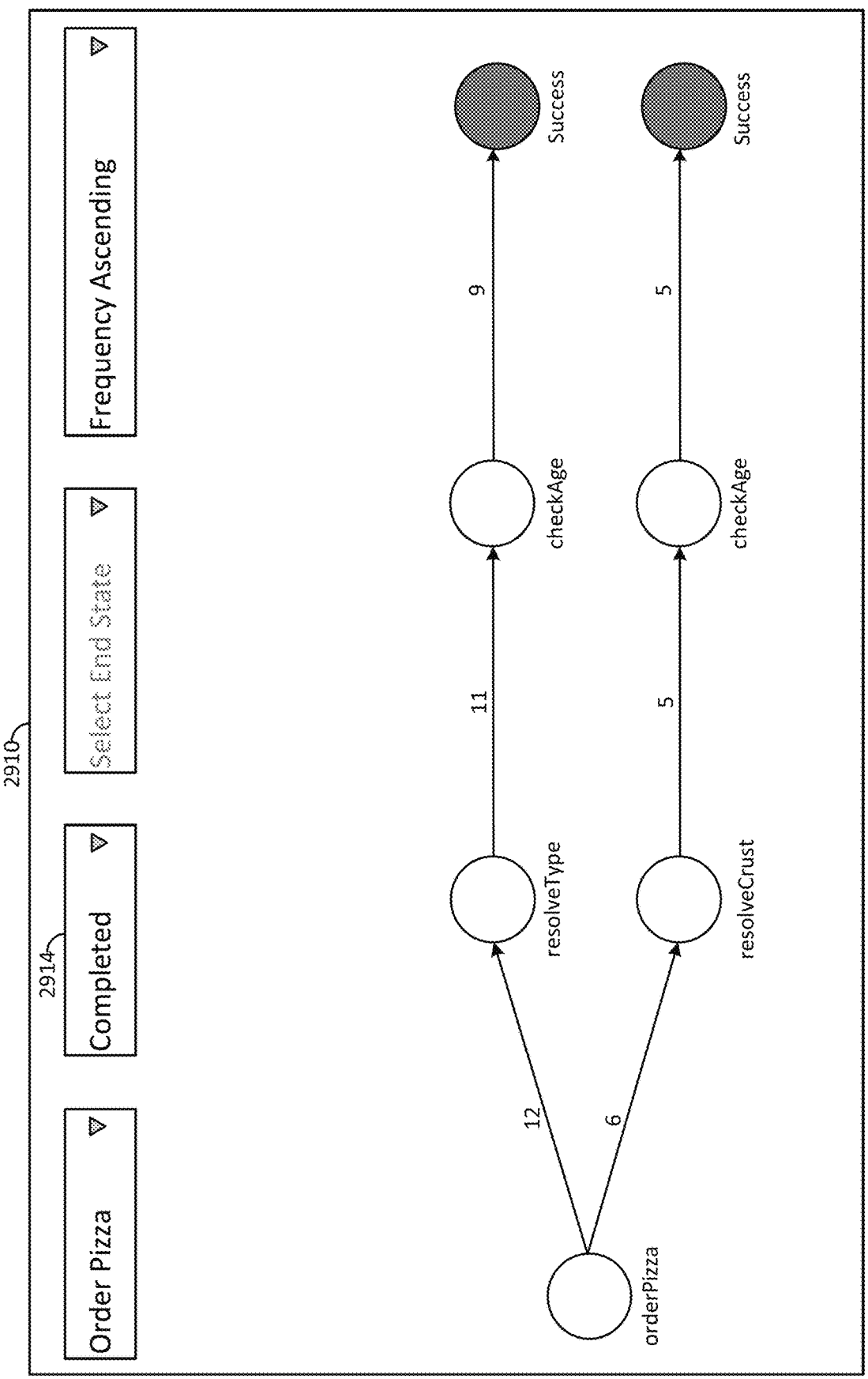
FIG. 29 depicts an example of a graphical user interface screen displaying visualized paths of selected conversations associated with a bot system according to certain embodiments.

FIG. 28 depicts an example of a graphical user interface screen 2800 displaying a drop-down menu 2804 for selecting conversations associated with a bot system for path visualization according to certain embodiments. GUI screen 2800 may result from a user selecting second user-selectable option 2504 in FIG. 25. Drop down menu 2804 may include the end status of the conversations to be included in a aggregated path diagram. Examples of the end status of the conversation may include "completed" and "abandoned." Selecting the "completed" status may cause the aggregated path diagram to include only completed conversations as shown in FIG. 29 and described below. Selecting the "abandoned" status may cause the aggregated path diagram to include only incomplete or abandoned conversations. In some examples, the end status of the conversations may be used to change (remove or add) conversations included in the aggregated path diagram.

FIG. 29 depicts an example of a graphical user interface screen 2900 displaying visualized paths of selected conversations associated with a bot system according to certain embodiments. In the example shown ion FIG. 29, the end status selected is "Completed," as indicated by a user-selectable option 2914. Selecting the "Completed" status may cause the aggregated path diagram in GUI screen 2500 to be updated such that conversations that are incomplete may be excluded from the aggregated path diagram. Thus, the end nodes in the aggregated path diagram may all be a "success" state, which may be indicated by a particular color, such as green, as opposed to red for end nodes of incomplete conversations. It should be recognized that a "success" end node may be distinguished from other end nodes in other manners, such as by a different color, a particular fill pattern, and the like. Because the end nodes have been changed, one or more start nodes and/or one or more intermediate nodes may also be changed. The number of conversations associated with each transition between states in the aggregated path diagram may be changed as well.

Figure 30:
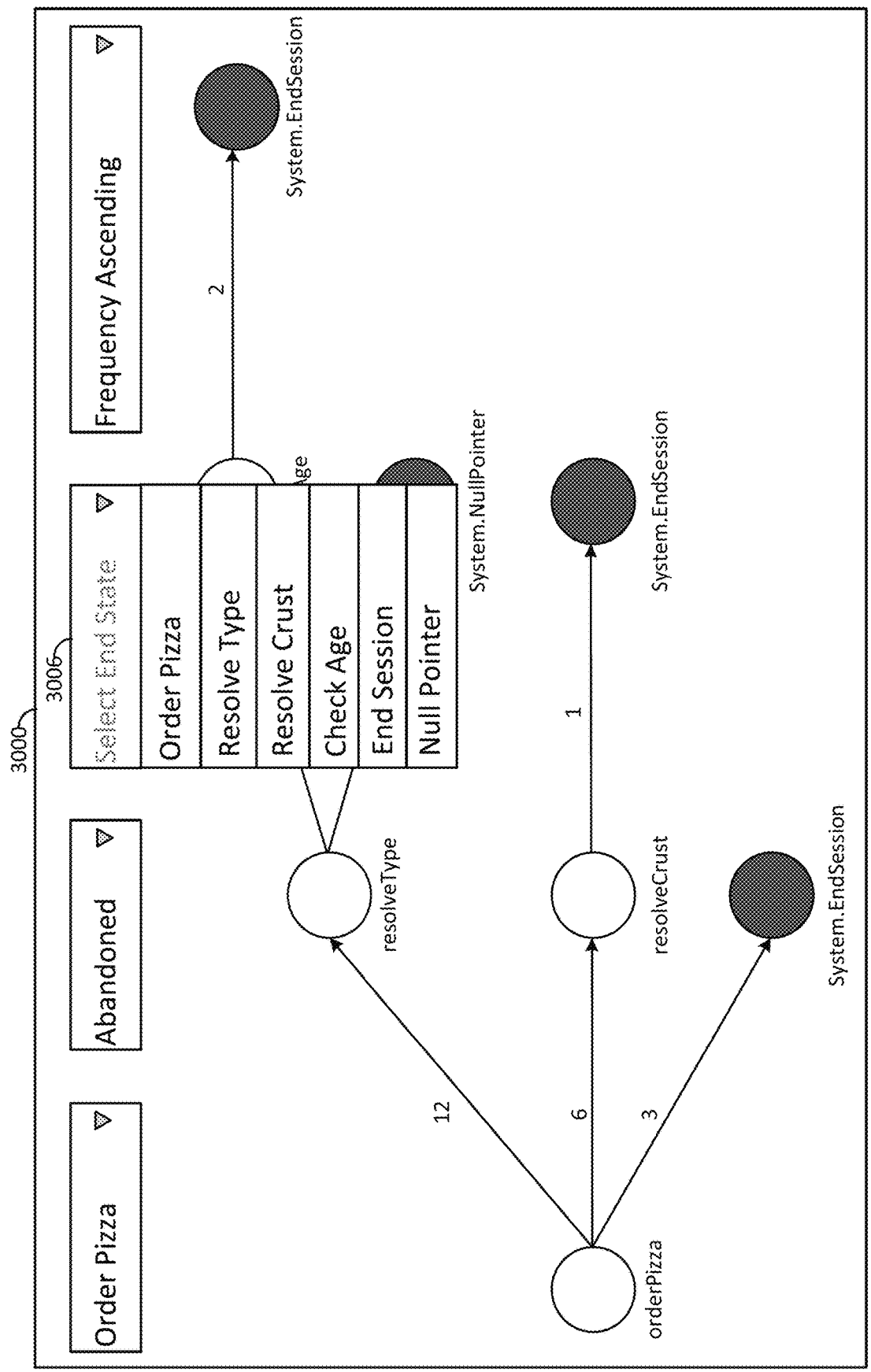
FIG. 30 depicts an example of a graphical user interface screen displaying a drop-down menu for selecting conversations associated with a bot system for path visualization according to certain embodiments.

FIG. 30 depicts an example of a graphical user interface screen 3000 displaying a drop-down menu 3006 for selecting conversations associated with a bot system for path visualization according to certain embodiments. GUI screen 3000 may result from a user selecting third user-selectable option 2506 in FIG. 25. Drop down menu 3006 may include one or more potential end states that may be used as the end nodes for an aggregated path diagram. In some examples, the one or more potential end states may be used to filter or select the conversation to be included in the aggregated path diagram. For example, drop down menu 3006 may include options "Order Pizza," "Resolve Type," "Resolve Crust," "Check Age," "End Session," and "Null Pointer." When a different end node option is selected from drop down menu 3006, one or more nodes may be removed from or added to the aggregated path diagram.

Figure 31:
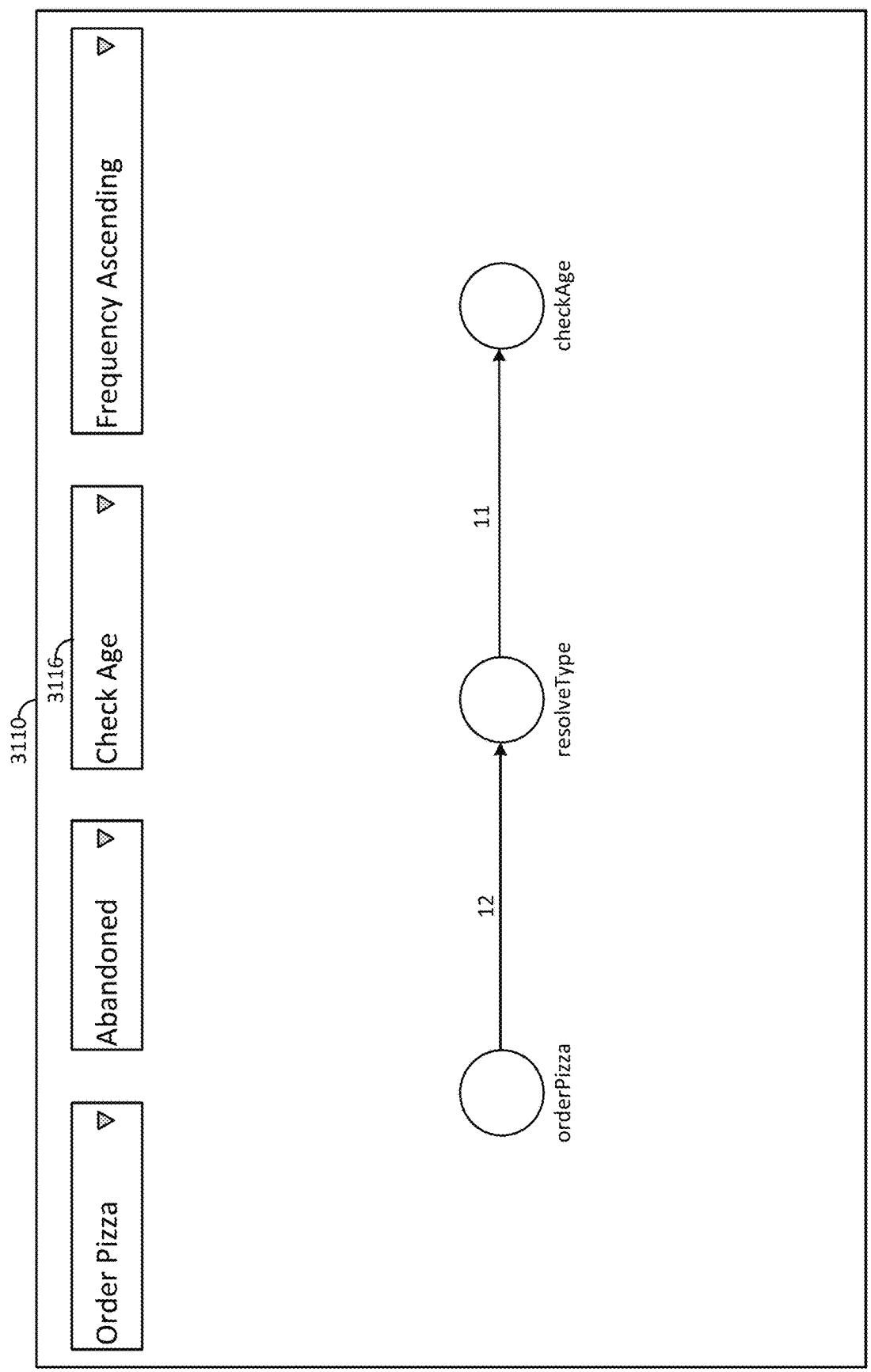
FIG. 31 depicts an example of a graphical user interface screen displaying visualized paths of selected conversations associated with a bot system according to certain embodiments.

FIG. 31 depicts an example of a graphical user interface screen 3100 displaying visualized paths of selected conversations associated with a bot system according to certain embodiments. In the example, the particular end state selected is "Check Age" as indicated by a user-selectable option 3116. The aggregated path diagram in GUI screen 3110 may include "checkAge" as the end state. One or more start nodes or intermediate nodes may be changed as well. The number of conversations associated with each transition between states in the aggregated path diagram may be changed as well.

Figure 32:
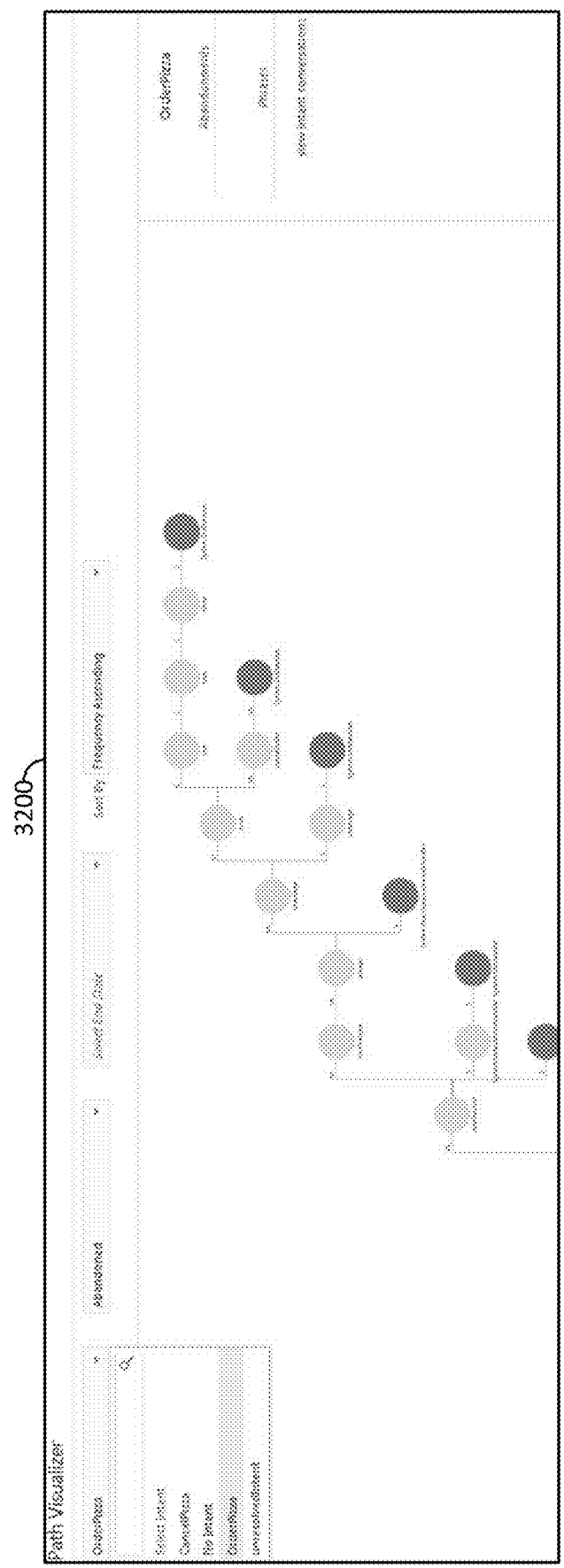
FIG. 32 depicts an example of a graphical user interface screen displaying examples of options for selecting conversations associated with a bot system for path visualization according to certain embodiments.
Figure 33:
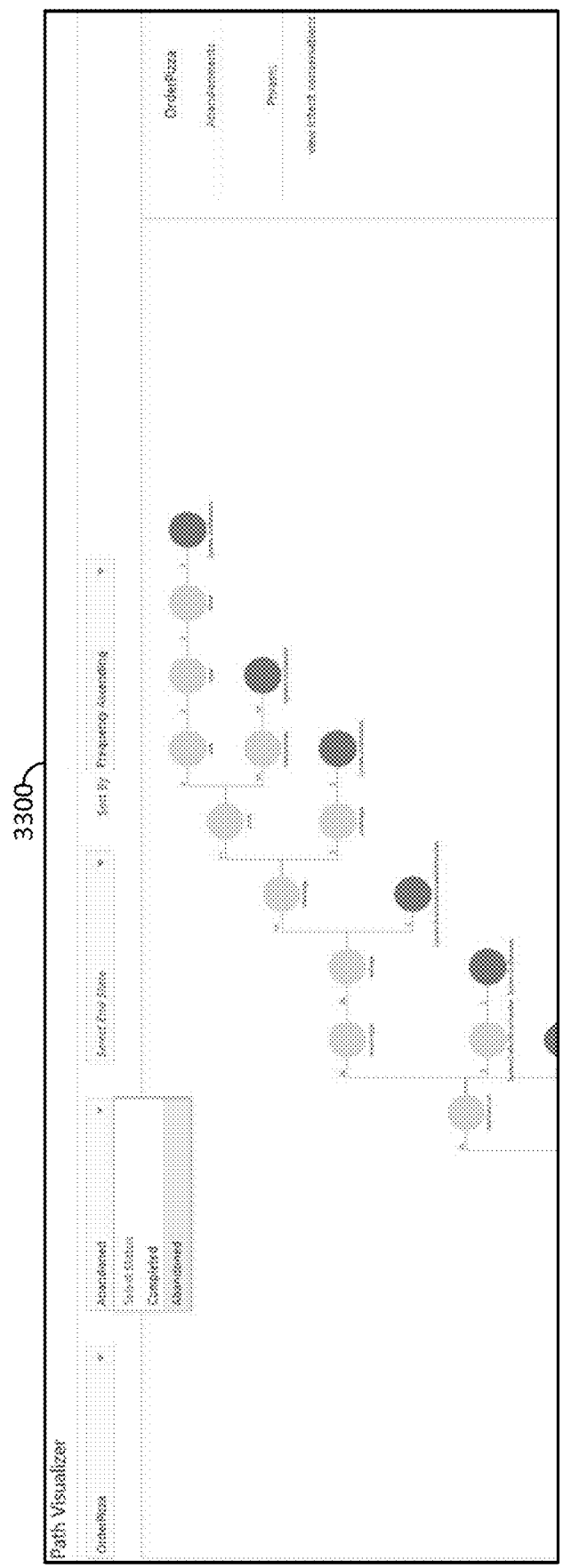
FIG. 33 depicts an example of a graphical user interface screen displaying examples of options for selecting conversations associated with a bot system for path visualization according to certain embodiments.
Figure 34:
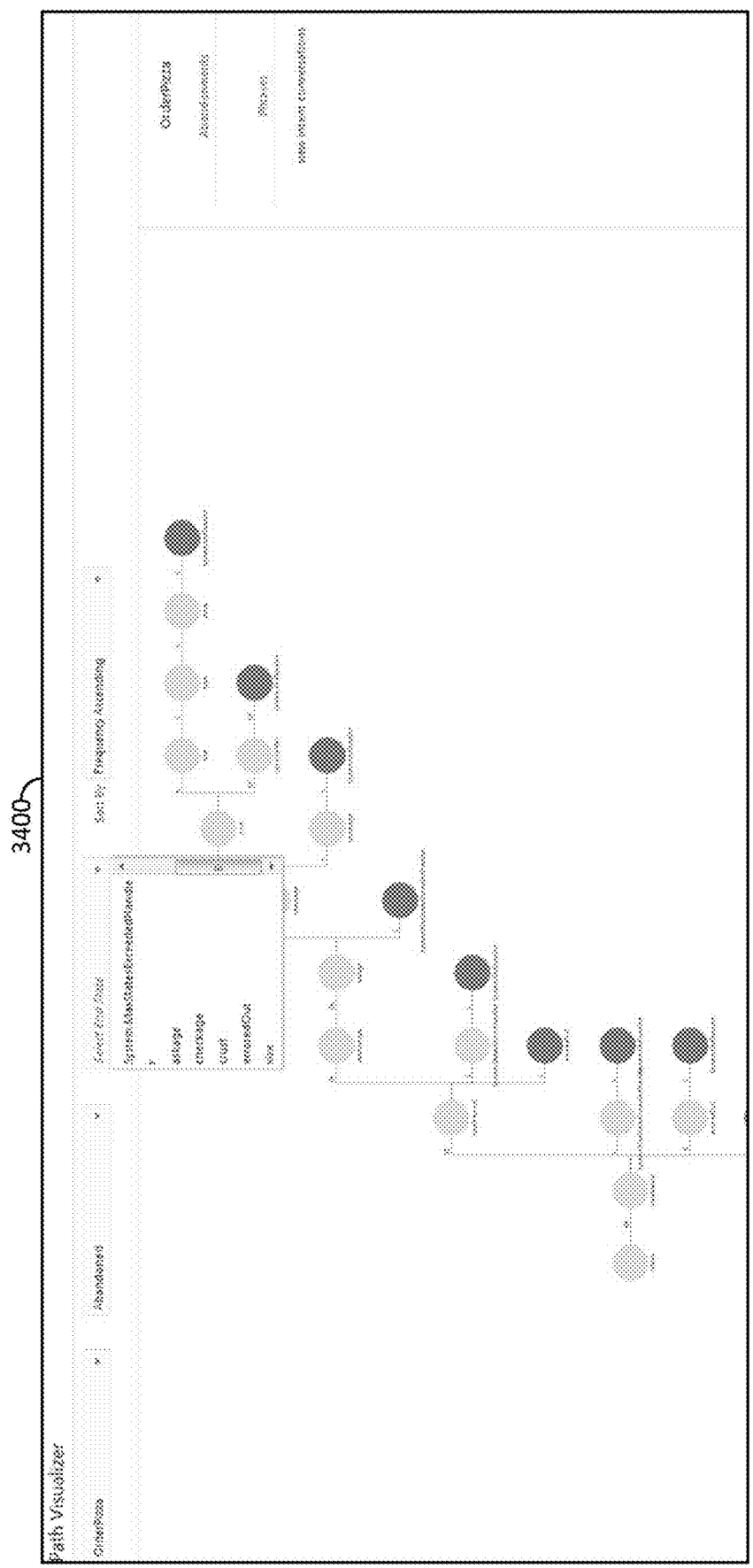
FIG. 34 depicts an example of a graphical user interface screen displaying examples of options for selecting conversations associated with a bot system for path visualization according to certain embodiments.

FIGS. 32-34 are examples of screenshots of graphical user interface (GUI) screens generated by a path visualizer according to certain embodiments. FIG. 32 depicts an example of a graphical user interface screen 3200 displaying example options for selecting conversations associated with a bot system for path visualization based on end user intents according to certain embodiments. FIG. 33 depicts an example of a graphical user interface screen 3300 displaying example options for selecting conversations associated with a bot system for path visualization based on the end status of the conversations according to certain embodiments. FIG. 34 depicts an example of a graphical user interface screen 3400 displaying example options for selecting conversations associated with a bot system for path visualization based on end states according to certain embodiments.

Figure 35:
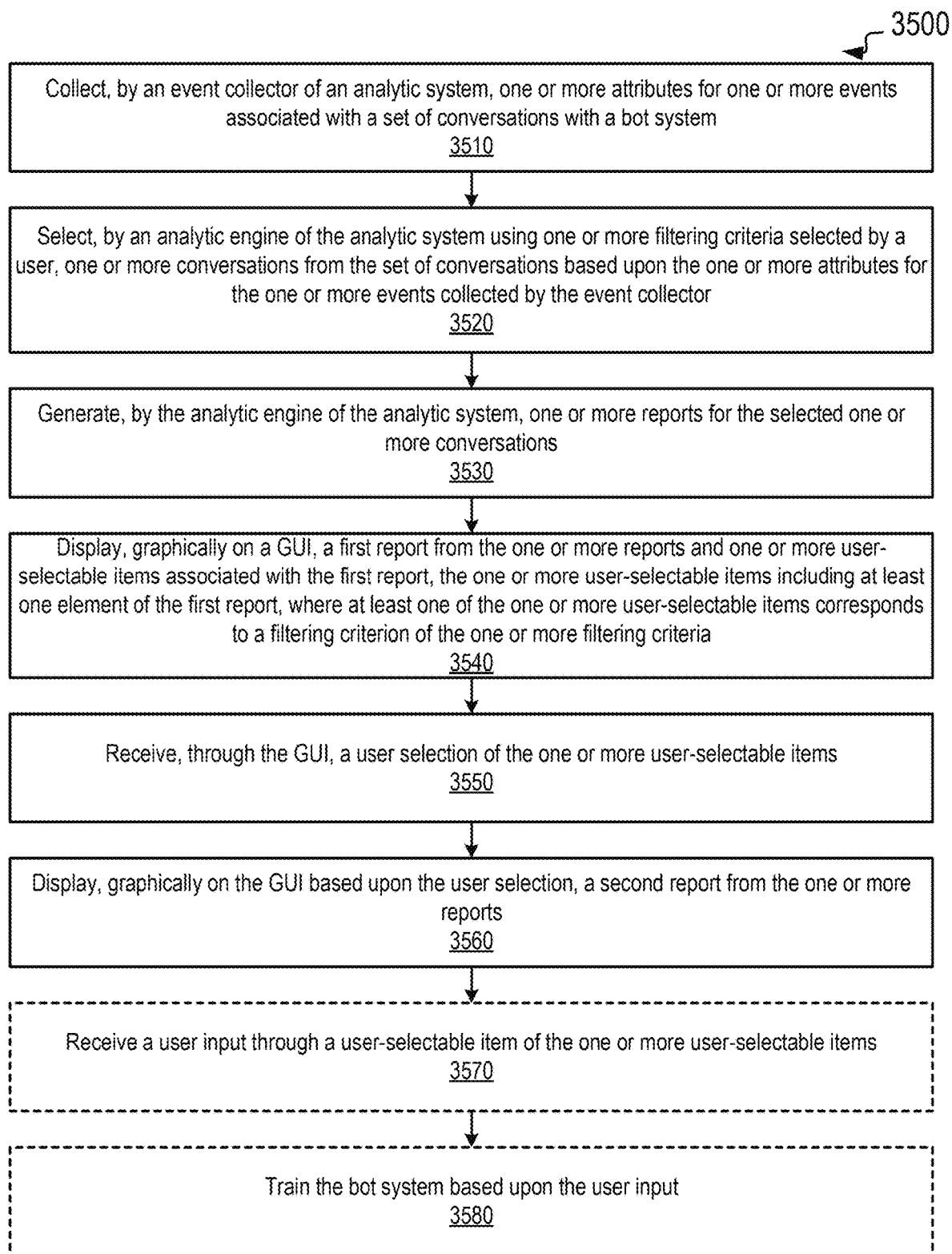
FIG. 35 is a simplified flow chart illustrating an example of processing for monitoring, analyzing, visualizing, and improving the performance of a performance of a bot system according to certain embodiments.

FIG. 35 is a simplified flow chart 3500 illustrating an example of processing for monitoring, analyzing, visualizing, and improving the performance of a bot system according to certain embodiments. The processing depicted in FIG. 35 may be implemented in software (e.g., code, instructions, program) executed by one or more processing units (e.g., processors, cores) of the respective systems, hardware, or combinations thereof. The software may be stored on a non-transitory storage medium (e.g., on a memory device). The processing presented in FIG. 35 and described below is intended to be illustrative and non-limiting. Although FIG. 35 depicts the various processing steps occurring in a particular sequence or order, this is not intended to be limiting. In certain alternative embodiments, the steps may be performed in some different order or some steps may also be performed in parallel. In certain embodiments, a graphical user interface produced according to the processing presented in FIG. 35 may appear as depicted in one of FIGS. 4-23 and 25-34.

At 3510, an event collector of an analytic system may collect one or more attributes for one or more events associated with a set of conversations with a bot system. As described above, the event collector may be reconfigurable to selectively collect desire attributes for desired events. The one or more events may include, for example, at least one of a conversation event, a bot state event, an intent resolution event, an entity resolution event, an error event, a timeout event, or a custom event. The one or more attributes may include the attributes described above with respect to, for example, FIG. 2. In some embodiments, the one or more attributes for one or more events associated with a set of conversations may be enriched and saved in a data store.

At 3520, an analytic engine of the analytic system may select, using one or more filtering criteria selected by a user, one or more conversations from the set of conversations based upon the one or more attributes for the one or more events collected by the event collector. The one or more filtering criteria may include, for example, conversations ended at a particular state, conversations started from a particular state, completed or incomplete conversations, conversations associated a particular end user intent, conversations from a particular channel or locale, conversations occurred during a certain time period, and the like.

At 3530, the analytic engine of the analytic system may generate one or more reports for the selected one or more conversations. In some embodiments, the analytic engine may include a REST server. The one or more reports may include, for example, a report including statistics of the set of conversations, a report including statistics of conversations associated with a particular end user intent, a report including conversations associated with the particular end user intent, a report including statistics of incomplete conversations, a report including incomplete conversations, a report including statistics of conversations for which no end user intent is determined, a report including conversations for which no end user intent is determined, or a report including options for improving the bot system. In some embodiments, the report including conversations for which no end user intent is determined may include, for each conversation of the conversations for which no end user intent is determined, a score indicating a matching between the conversation and each respective end user intent in a set of end user intents.

In some embodiments, the one or more reports may include an aggregated path diagram for the selected one or more conversations. The aggregated path diagram may include a plurality of nodes and a plurality of connections among the plurality of nodes. Each of the plurality of nodes may correspond to a respective state of the bot system. Each of the plurality of connections may represent a transition from one state of the bot system to another state of the bot system. The plurality of nodes may include a start node and an end node. In some embodiments, the aggregated path diagram may include a number associated with each respective connection, where the number may indicate a total number of conversations that include the transition represented by the respective connection. In some embodiments, each node of the plurality of nodes may be a user-selectable item of the one or more user-selectable items. In some embodiments, each connection of the plurality of connections may be a user-selectable item of the one or more user-selectable items.

At 3540, a GUI may graphically display a first report from the one or more reports and one or more user-selectable items associated with the first report. The one or more user-selectable items may include at least one element of the first report. At least one of the one or more user-selectable items may correspond to a filtering criterion of the one or more filtering criteria. In some embodiments, the one or more user-selectable items may include a user-selectable item, which, when selected, causes one or more individual conversations to be display on the GUI. In some embodiments, the one or more user-selectable items may include a menu for selecting conversations ended at a particular state from the set of conversations. In some embodiments, the one or more user-selectable items may include a menu for selecting conversations started from a particular state from the set of conversations. In some embodiments, the one or more user-selectable items may include a menu for selecting completed or incomplete conversations from the set of conversations. In some embodiments, the one or more user-selectable items may include a menu for selecting conversations associated a particular end user intent from the set of conversations.

At 3550, a GUI server may receive, through the GUI, a user selection of the one or more user-selectable items. At 3560, a second report from the one or more reports may be displayed graphically on the GUI based upon the user selection. In some embodiments, the second report may include, for example, utterances associated with an individual conversation, and user intents associated with the utterances.

Optionally, at 3570, a user input may be received through a user-selectable item of the one or more user-selectable items. For example, the one or more user-selectable items may include a user-editable item, such as an utterance and/or an intent associated with the utterance. An administrator or developer of the bot system may add, remove, or edit the utterance and/or add, remove, or edit the intent for the utterance. The user input may include a revised utterance or a revised intent for the utterance.

Optionally, at 3580, the bot system may be retrained using the user input to improve the performance of the bot system, such as retraining the intent classification models of the bot system to more accurately determining the user intents.

Figure 36:
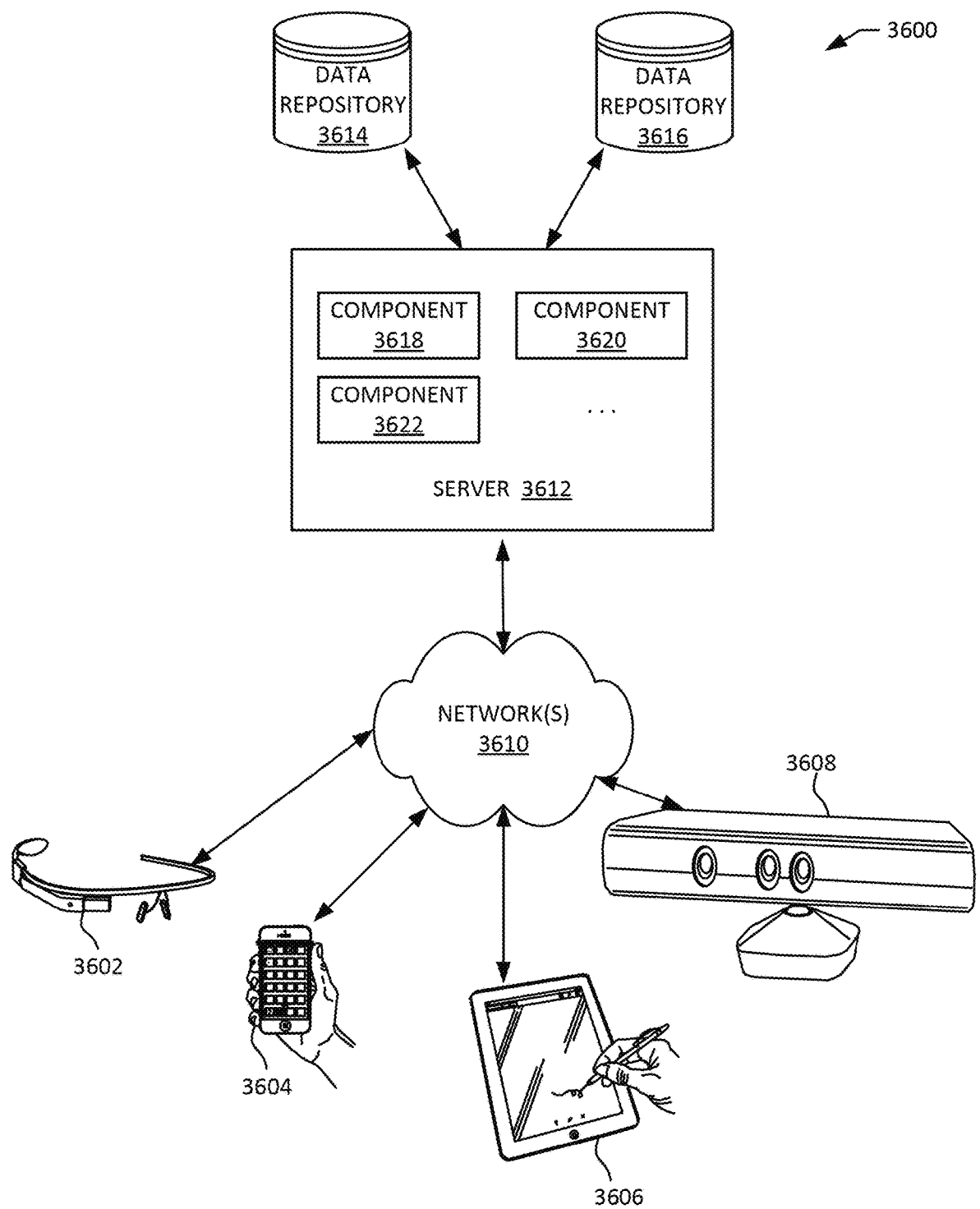
FIG. 36 depicts a simplified block diagram of an example of a distributed system for implementing some embodiments.

FIG. 36 depicts a simplified diagram of a distributed system 3600. In the illustrated example, distributed system 3600 includes one or more client computing devices 3602, 3604, 3606, and 3608, coupled to a server 3612 via one or more communication networks 3610. Clients computing devices 3602, 3604, 3606, and 3608 may be configured to execute one or more applications.

In various examples, server 3612 may be adapted to run one or more services or software applications that enable one or more embodiments described in this disclosure. In certain examples, server 3612 may also provide other services or software applications that may include non-virtual and virtual environments. In some examples, these services may be offered as web-based or cloud services, such as under a Software as a Service (SaaS) model to the users of client computing devices 3602, 3604, 3606, and/or 3608. Users operating client computing devices 3602, 3604, 3606, and/or 3608 may in turn utilize one or more client applications to interact with server 3612 to utilize the services provided by these components.

In the configuration depicted in FIG. 36, server 3612 may include one or more components 3618, 3620 and 3622 that implement the functions performed by server 3612. These components may include software components that may be executed by one or more processors, hardware components, or combinations thereof. It should be appreciated that various different system configurations are possible, which may be different from distributed system 3600. The example shown in FIG. 36 is thus one example of a distributed system for implementing an example system and is not intended to be limiting.

Users may use client computing devices 3602, 3604, 3606, and/or 3608 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 36 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 3610 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 3610 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 3612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 3612 may include one or more virtual machines running virtual operating systems, or other computing architectures involving virtualization such as one or more flexible pools of logical storage devices that may be virtualized to maintain virtual storage devices for the server. In various examples, server 3612 may be adapted to run one or more services or software applications that provide the functionality described in the foregoing disclosure.

The computing systems in server 3612 may run one or more operating systems including any of those discussed above, as well as any commercially available server operating system. Server 3612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 3612 may include one or more applications to analyze and consolidate data feeds and/or event updates received from users of client computing devices 3602, 3604, 3606, and 3608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 3612 may also include one or more applications to display the data feeds and/or real-time events via one or more display devices of client computing devices 3602, 3604, 3606, and 3608.

Distributed system 3600 may also include one or more data repositories 3614, 3616. These data repositories may be used to store data and other information in certain examples. For example, one or more of the data repositories 3614, 3616 may be used to store information such as information related to storage virtual machines, information mapping application IDs to application to selected storage virtual machines, and other information used by server 3612 when performing authentication functions. Data repositories 3614, 3616 may reside in a variety of locations. For example, a data repository used by server 3612 may be local to server 3612 or may be remote from server 3612 and in communication with server 3612 via a network-based or dedicated connection. Data repositories 3614, 3616 may be of different types. In certain examples, a data repository used by server 3612 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 3614, 3616 may also be used by applications to store application data. The data repositories used by applications may be of different types such as, for example, a key-value store repository, an object store repository, or a general storage repository supported by a file system.

Figure 37:
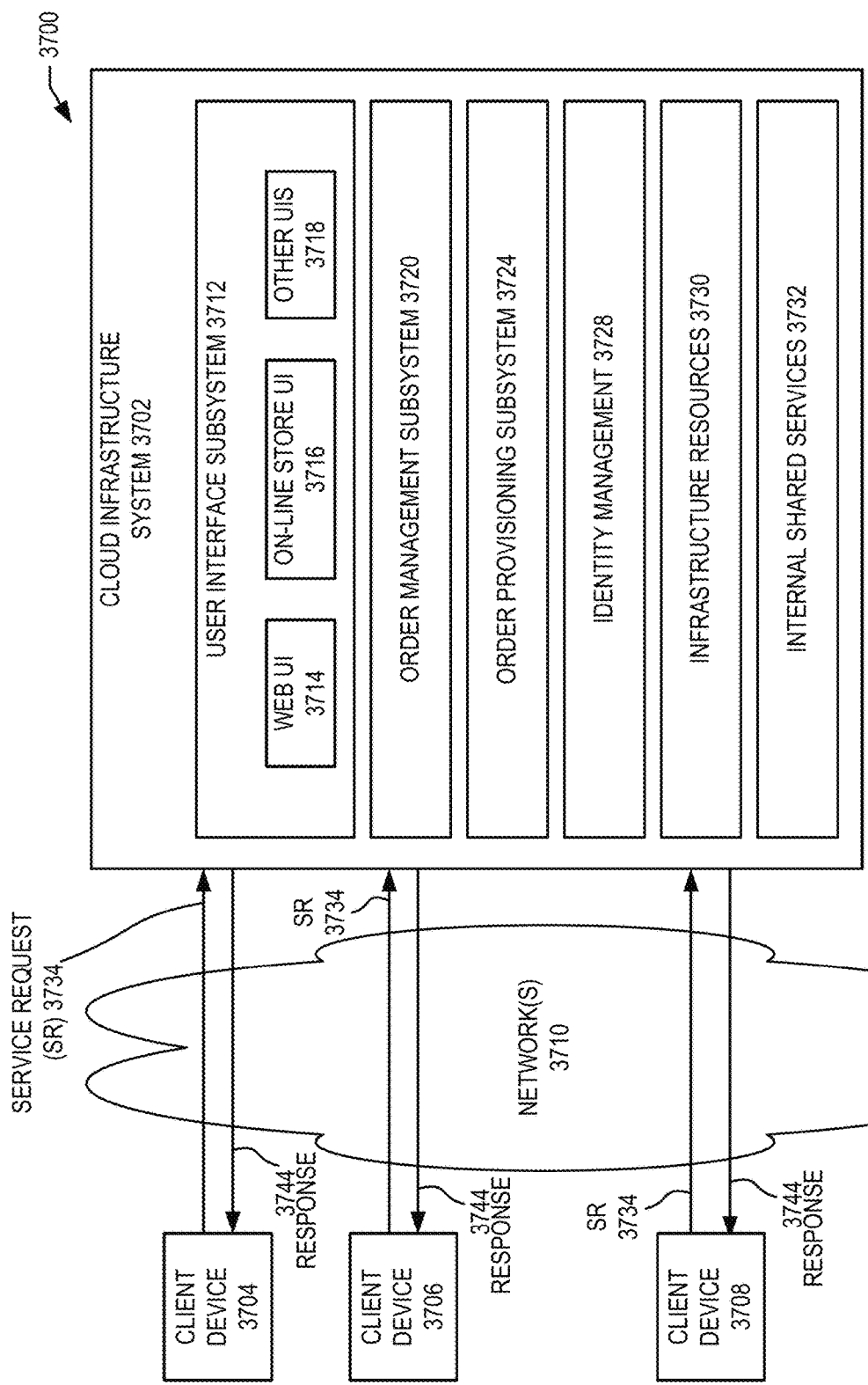
FIG. 37 is a simplified block diagram of an example of a cloud-based system environment for implementing some embodiments.

In certain examples, the functionalities described in this disclosure may be offered as services via a cloud environment. FIG. 37 is a simplified block diagram of a cloud-based system environment in which various services may be offered as cloud services in accordance with certain examples. In the example depicted in FIG. 37, cloud infrastructure system 3702 may provide one or more cloud services that may be requested by users using one or more client computing devices 3704, 3706, and 3708. Cloud infrastructure system 3702 may comprise one or more computers and/or servers that may include those described above for server 1612. The computers in cloud infrastructure system 3702 may be organized as general purpose computers, specialized server computers, server farms, server clusters, or any other appropriate arrangement and/or combination.

Network(s) 3710 may facilitate communication and exchange of data between clients 3704, 3706, and 3708 and cloud infrastructure system 3702. Network(s) 3710 may include one or more networks. The networks may be of the same or different types. Network(s) 3710 may support one or more communication protocols, including wired and/or wireless protocols, for facilitating the communications.

The example depicted in FIG. 37 is only one example of a cloud infrastructure system and is not intended to be limiting. It should be appreciated that, in some other examples, cloud infrastructure system 3702 may have more or fewer components than those depicted in FIG. 37, may combine two or more components, or may have a different configuration or arrangement of components. For example, although FIG. 37 depicts three client computing devices, any number of client computing devices may be supported in alternative examples.

The term cloud service is generally used to refer to a service that is made available to users on demand and via a communication network such as the Internet by systems (e.g., cloud infrastructure system 3702) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain examples, cloud infrastructure system 3702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 3702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 3702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 3702. Cloud infrastructure system 3702 then performs processing to provide the services requested in the customer's subscription order. For example, a user may request the cloud infrastructure system to register an application, as described above, and provide services to the application per the application's specified requirements. Cloud infrastructure system 3702 may be configured to provide one or even multiple cloud services.

Cloud infrastructure system 3702 may provide the cloud services via different deployment models. In a public cloud model, cloud infrastructure system 3702 may be owned by a third party cloud services provider and the cloud services are offered to any general public customer, where the customer may be an individual or an enterprise. In certain other examples, under a private cloud model, cloud infrastructure system 3702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 3702 and the services provided may be shared by several organizations in a related community. Various other models such as hybrids of the above mentioned models may also be used.

Client computing devices 3704, 3706, and 3708 may be of different types (such as client computing devices 1602, 1604, 1606, and 1608 depicted in FIG. 16) and may be capable of operating one or more client applications. A user may use a client device to interact with cloud infrastructure system 3702, such as to request a service provided by cloud infrastructure system 3702. For example, a user may use a client device to request an authentication-related service described in this disclosure.

In some examples, the processing performed by cloud infrastructure system 3702 for providing services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 3702 for determining which storage virtual machine is to be selected for a particular application based upon the application's stated authentication-related requirements. The data used for this analysis may include structured data (e.g., data stored in a database or structured according to a structured model) and/or unstructured data (e.g., data blobs (binary large objects)).

As depicted in the example in FIG. 37, cloud infrastructure system 3702 may include infrastructure resources 3730 that are utilized for facilitating the provision of various cloud services offered by cloud infrastructure system 3702. Infrastructure resources 3730 may include, for example, processing resources, storage or memory resources, networking resources, and the like. In certain examples, the storage virtual machines that are available for servicing storage requested from applications may be part of cloud infrastructure system 3702. In other examples, the storage virtual machines may be part of different systems.

In certain examples, to facilitate efficient provisioning of these resources for supporting the various cloud services provided by cloud infrastructure system 3702 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 3702 may itself internally use services 3732 that are shared by different components of cloud infrastructure system 3702 and which facilitate the provisioning of services by cloud infrastructure system 3702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 3702 may comprise multiple subsystems. These subsystems may be implemented in software, or hardware, or combinations thereof. As depicted in FIG. 37, the subsystems may include a user interface subsystem 3712 that enables users or customers of cloud infrastructure system 3702 to interact with cloud infrastructure system 3702. User interface subsystem 3712 may include various different interfaces such as a web interface 3714, an online store interface 3716 where cloud services provided by cloud infrastructure system 3702 are advertised and are purchasable by a consumer, and other interfaces 3718. For example, a customer may, using a client device, request (service request 3734) one or more services provided by cloud infrastructure system 3702 using one or more of interfaces 3714, 3716, and 3718. For example, a customer may access the online store, browse cloud services offered by cloud infrastructure system 3702, and place a subscription order for one or more services offered by cloud infrastructure system 3702 that the customer wishes to subscribe to. The service request may include information identifying the customer and one or more services that the customer desires to subscribe to. For example, a customer may place a subscription order for a service offered by cloud infrastructure system 3702. As part of the order, the customer may provide information identifying an application for which the service is to be provided and the one or more credentials for the application.

In certain examples, such as the example depicted in FIG. 37, cloud infrastructure system 3702 may comprise an order management subsystem (OMS) 3720 that is configured to process the new order. As part of this processing, OMS 3720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 3720 may then invoke the order provisioning subsystem (OPS) 3724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 3724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 3702 as part of the provisioning process. Cloud infrastructure system 3702 may generate an application ID and select a storage virtual machine for an application from among storage virtual machines provided by cloud infrastructure system 3702 itself or from storage virtual machines provided by other systems other than cloud infrastructure system 3702.

Cloud infrastructure system 3702 may send a response or notification 3744 to the requesting customer to indicate when the requested service is now ready for use. In some instances, information (e.g., a link) may be sent to the customer that enables the customer to start using and availing the benefits of the requested services. In certain examples, for a customer requesting the service, the response may include an application ID generated by cloud infrastructure system 3702 and information identifying a virtual machine selected by cloud infrastructure system 3702 for an application corresponding to the application ID.

Cloud infrastructure system 3702 may provide services to multiple customers. For each customer, cloud infrastructure system 3702 is responsible for managing information related to one or more subscription orders received from the customer, maintaining customer data related to the orders, and providing the requested services to the customer. Cloud infrastructure system 3702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 3702 may provide services to multiple customers in parallel. Cloud infrastructure system 3702 may store information for these customers, including possibly proprietary information. In certain examples, cloud infrastructure system 3702 comprises an identity management subsystem (IMS) 3728 that is configured to manage customer information and provide the separation of the managed information such that information related to one customer is not accessible by another customer. IMS 3728 may be configured to provide various security-related services such as identity services, such as information access management, authentication and authorization services, services for managing customer identities and roles and related capabilities, and the like.

Figure 38:
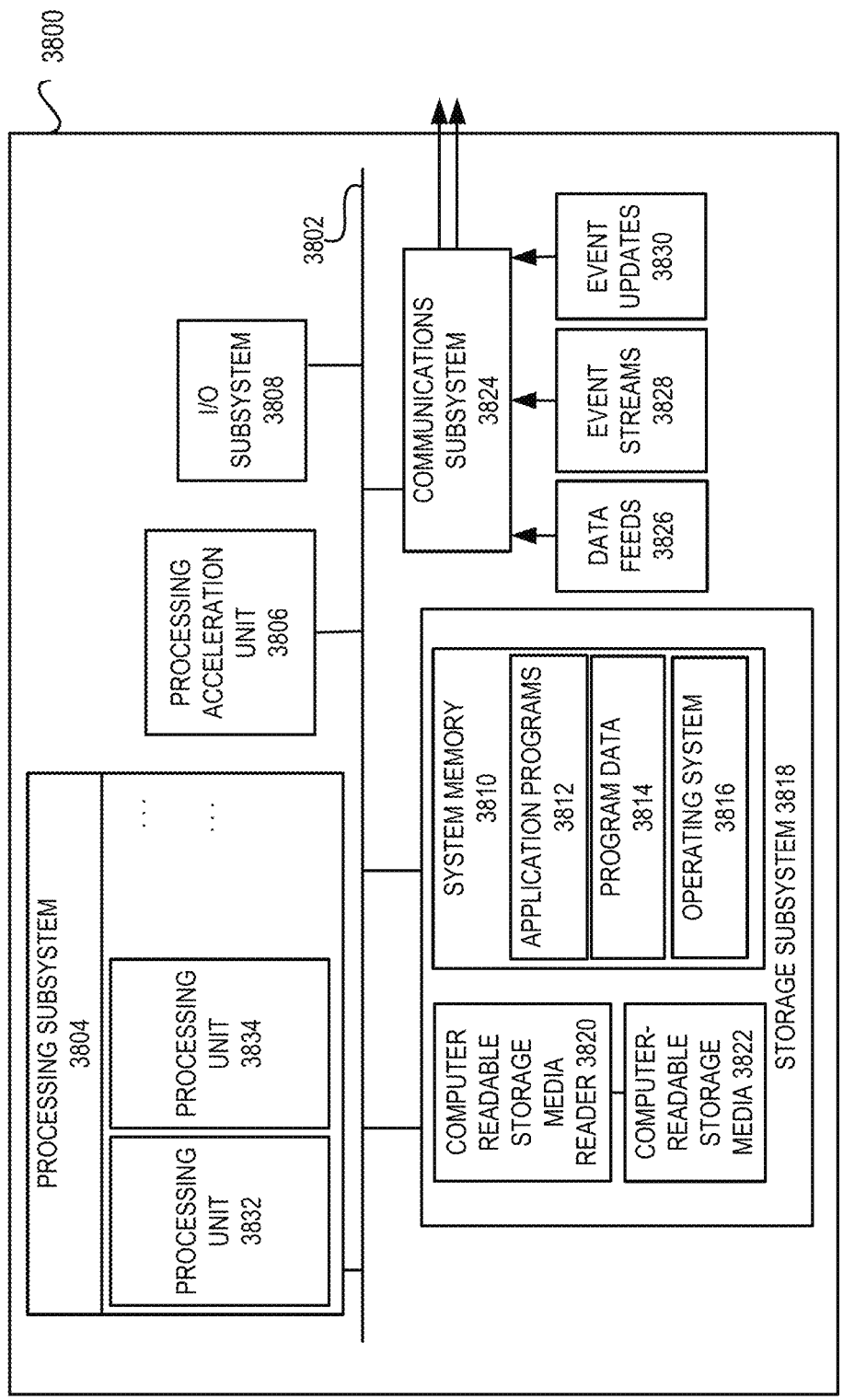
FIG. 38 illustrates an example of a computer system for implementing some embodiments.

FIG. 38 illustrates an example of computer system 3800. In some examples, computer system 3800 may be used to implement any of the application system, access management system, systems within a data center, and various servers and computer systems described above. As shown in FIG. 38, computer system 3800 includes various subsystems including a processing subsystem 3804 that communicates with a number of other subsystems via a bus subsystem 3802. These other subsystems may include a processing acceleration unit 3806, an I/O subsystem 3808, a storage subsystem 3818, and a communications subsystem 3824. Storage subsystem 3818 may include non-transitory computer-readable storage media including storage media 3822 and a system memory 3810.

Bus subsystem 3802 provides a mechanism for letting the various components and subsystems of computer system 3800 communicate with each other as intended. Although bus subsystem 3802 is shown schematically as a single bus, alternative examples of the bus subsystem may utilize multiple buses. Bus subsystem 3802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 3804 controls the operation of computer system 3800 and may comprise one or more processors, application specific integrated circuits (ASICs), or field programmable gate arrays (FPGAs). The processors may include be single core or multicore processors. The processing resources of computer system 3800 may be organized into one or more processing units 3832, 3834, etc. A processing unit may include one or more processors, one or more cores from the same or different processors, a combination of cores and processors, or other combinations of cores and processors. In some examples, processing subsystem 3804 may include one or more special purpose co-processors such as graphics processors, digital signal processors (DSPs), or the like. In some examples, some or all of the processing units of processing subsystem 3804 may be implemented using customized circuits, such as application specific integrated circuits (ASICs), or field programmable gate arrays (FPGAs).

In some examples, the processing units in processing subsystem 3804 may execute instructions stored in system memory 3810 or on computer readable storage media 3822. In various examples, the processing units may execute a variety of programs or code instructions and may maintain multiple concurrently executing programs or processes. At any given time, some or all of the program code to be executed may be resident in system memory 3810 and/or on computer-readable storage media 3822 including potentially on one or more storage devices. Through suitable programming, processing subsystem 3804 may provide various functionalities described above. In instances where computer system 3800 is executing one or more virtual machines, one or more processing units may be allocated to each virtual machine.

In certain examples, a processing acceleration unit 3806 may optionally be provided for performing customized processing or for off-loading some of the processing performed by processing subsystem 3804 so as to accelerate the overall processing performed by computer system 3800.

I/O subsystem 3808 may include devices and mechanisms for inputting information to computer system 3800 and/or for outputting information from or via computer system 3800. In general, use of the term input device is intended to include all possible types of devices and mechanisms for inputting information to computer system 3800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google)Glass®. Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 3800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 3818 provides a repository or data store for storing information and data that is used by computer system 3800. Storage subsystem 3818 provides a tangible non-transitory computer-readable storage medium for storing the basic programming and data constructs that provide the functionality of some examples. Storage subsystem 3818 may store software (e.g., programs, code modules, instructions) that when executed by processing subsystem 3804 provides the functionality described above. The software may be executed by one or more processing units of processing subsystem 3804. Storage subsystem 3818 may also provide authentication in accordance with the teachings of this disclosure.

Storage subsystem 3818 may include one or more non-transitory memory devices, including volatile and non-volatile memory devices. As shown in FIG. 38, storage subsystem 3818 includes a system memory 3810 and a computer-readable storage media 3822. System memory 3810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 3800, such as during start-up, may typically be stored in the ROM. The RAM typically contains data and/or program modules that are presently being operated and executed by processing subsystem 3804. In some implementations, system memory 3810 may include multiple different types of memory, such as static random access memory (SRAM), dynamic random access memory (DRAM), and the like.

By way of example, and not limitation, as depicted in FIG. 38, system memory 3810 may load application programs 3812 that are being executed, which may include various applications such as Web browsers, mid-tier applications, relational database management systems (RDBMS), etc., program data 3814, and an operating system 3816. By way of example, operating system 3816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 3822 may store programming and data constructs that provide the functionality of some examples. Computer-readable media 3822 may provide storage of computer-readable instructions, data structures, program modules, and other data for computer system 3800. Software (programs, code modules, instructions) that, when executed by processing subsystem 3804 provides the functionality described above, may be stored in storage subsystem 3818. By way of example, computer-readable storage media 3822 may include non-volatile memory such as a hard disk drive, a magnetic disk drive, an optical disk drive such as a CD ROM, DVD, a Blu-Ray® disk, or other optical media. Computer-readable storage media 3822 may include, but is not limited to, Zip® drives, flash memory cards, universal serial bus (USB) flash drives, secure digital (SD) cards, DVD disks, digital video tape, and the like. Computer-readable storage media 3822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 3818 may also include a computer-readable storage media reader 3820 that may further be connected to computer-readable storage media 3822. Reader 3820 may receive and be configured to read data from a memory device such as a disk, a flash drive, etc.

In certain examples, computer system 3800 may support virtualization technologies, including but not limited to virtualization of processing and memory resources. For example, computer system 3800 may provide support for executing one or more virtual machines. In certain examples, computer system 3800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 3800. Accordingly, multiple operating systems may potentially be run concurrently by computer system 3800.

Communications subsystem 3824 provides an interface to other computer systems and networks. Communications subsystem 3824 serves as an interface for receiving data from and transmitting data to other systems from computer system 3800. For example, communications subsystem 3824 may enable computer system 3800 to establish a communication channel to one or more client devices via the Internet for receiving and sending information from and to the client devices. For example, when computer system 3800 is used to implement bot system 120 depicted in FIG. 1, the communication subsystem may be used to communicate with an application system and also a system executing a storage virtual machine selected for an application.

Communication subsystem 3824 may support both wired and/or wireless communication protocols. In certain examples, communications subsystem 3824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 3824 may provide wired network connectivity (e.g., Ethernet) in addition to or instead of a wireless interface.

Communication subsystem 3824 may receive and transmit data in various forms. In some examples, in addition to other forms, communications subsystem 3824 may receive input communications in the form of structured and/or unstructured data feeds 3826, event streams 3828, event updates 3830, and the like. For example, communications subsystem 3824 may be configured to receive (or send) data feeds 3826 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 3824 may be configured to receive data in the form of continuous data streams, which may include event streams 3828 of real-time events and/or event updates 3830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 3824 may also be configured to communicate data from computer system 3800 to other computer systems or networks. The data may be communicated in various different forms such as structured and/or unstructured data feeds 3826, event streams 3828, event updates 3830, and the like to one or more databases that may be in communication with one or more streaming data source computers coupled to computer system 3800.

Computer system 3800 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 3800 depicted in FIG. 38 is intended only as a specific example. Many other configurations having more or fewer components than the system depicted in FIG. 38 are possible. Based on the disclosure and teachings provided herein, a person of ordinary skill in the art will appreciate other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A system comprising:
an event collector configurable to collect one or more attributes for one or more events associated with a set of conversations with a bot system;
an analytic engine configured to, using one or more filtering criteria selected by a user:
select one or more conversations from the set of conversations based upon the one or more attributes for the one or more events; and
generate one or more reports for the selected one or more conversations; and
a graphic user interface (GUI) server communicatively coupled to the analytic engine and configured to:
display, graphically on a GUI, a first report from the one or more reports and one or more user-selectable items associated with the first report, wherein the one or more user-selectable items include at least one element of the first report, and wherein at least one of the one or more user-selectable items corresponds to a filtering criterion of the one or more filtering criteria;
receive a user selection of the one or more user-selectable items; and
display, graphically on the GUI based upon the user selection, a second report from the one or more reports,
wherein the one or more reports include an aggregated path diagram for the selected one or more conversations, the aggregated path diagram including:
a plurality of nodes that includes a start node and an end node, each of the plurality of nodes corresponding to a respective state of the bot system; and
a plurality of connections among the plurality of nodes, each of the plurality of connections representing a transition from one state of the bot system to another state of the bot system.

2. The system of claim 1, further comprising an interface with the bot system, wherein:
the one or more user-selectable items include a user-editable item;
the GUI server is further configured to receive a user input through the user-editable item; and
the interface with the bot system is configured to send the user input to the bot system for improving the bot system.

3. The system of claim 2, wherein:
the user-editable item includes an end user utterance or an intent associated with the end user utterance;
the user input includes a revised end user utterance or a revised intent for the end user utterance; and
improving the bot system includes retraining the bot system based upon the user input.

4. The system of claim 1, wherein the one or more user-selectable items include a user-selectable item, which, when selected, causes one or more individual conversations to be displayed on the GUI.

5. The system of claim 1, wherein the one or more user-selectable items include a menu for selecting, from the set of conversations, conversations ended at a particular state.

6. The system of claim 1, wherein the one or more user-selectable items include a menu for selecting, from the set of conversations, conversations started from a particular state.

7. The system of claim 1, wherein the one or more user-selectable items include a menu for selecting, from the set of conversations, completed or incomplete conversations.

8. The system of claim 1, wherein the one or more user-selectable items include a menu for selecting, from the set of conversations, conversations associated with a particular end user intent.

9. The system of claim 1, wherein the aggregated path diagram includes a number associated with each respective connection, the number indicating a total number of conversations that include the transition represented by the respective connection.

10. The system of claim 1, wherein each node of the plurality of nodes is a user-selectable item of the one or more user-selectable items.

11. The system of claim 1, wherein each connection of the plurality of connections is a user-selectable item of the one or more user-selectable items.

12. The system of claim 1, wherein the one or more reports include:
a report including statistics of the set of conversations;
a report including statistics of conversations associated with a particular end user intent;
a report including conversations associated with the particular end user intent;
a report including statistics of incomplete conversations;
a report including incomplete conversations;
a report including statistics of conversations for which no end user intent is determined;
a report including conversations for which no end user intent is determined; or
a report including options for improving the bot system.

13. The system of claim 12, wherein the report including conversations for which no end user intent is determined comprises, for each conversation of the conversations for which no end user intent is determined, a score indicating a matching between the conversation and each respective end user intent in a set of end user intents.

14. The system of claim 1, wherein the one or more events include at least one of a conversation event, a bot state event, an intent resolution event, an entity resolution event, an error event, a timeout event, or a custom event.

15. The system of claim 1, further comprising:
a data store configured to store the one or more attributes for the one or more events; and
an enrichment engine configured to:
generate additional attributes based upon the one or more attributes for the one or more events; and
save the additional attributes and the one or more attributes for the one or more events to the data store.

16. The system of claim 1, wherein the analytic engine comprises a representational state transfer (REST) server.

17. A computer-implemented method comprising:
collecting, by an event collector of an analytic system, one or more attributes for one or more events associated with a set of conversations with a bot system;
selecting, by an analytic engine of the analytic system using one or more filtering criteria selected by a user, one or more conversations from the set of conversations based upon the one or more attributes for the one or more events;
generating, by the analytic engine of the analytic system, one or more reports for the selected one or more conversations;
displaying, graphically on a GUI, a first report from the one or more reports and one or more user-selectable items associated with the first report, wherein the one or more user-selectable items include at least one element of the first report, and wherein at least one of the one or more user-selectable items corresponds to a filtering criterion of the one or more filtering criteria;

receiving, through the GUI, a user selection of the one or more user-selectable items; and displaying, graphically on the GUI based upon the user selection, a second report from the one or more reports, wherein the one or more reports include an aggregated path diagram for the selected one or more conversations, the aggregated path diagram including:

a plurality of nodes that includes a start node and an end node, each of the plurality of nodes corresponding to a respective state of the bot system; and a plurality of connections among the plurality of nodes, each of the plurality of connections representing a transition from one state of the bot system to another state of the bot system.

18. The computer-implemented method of claim 17, further comprising:

receiving a user input through a user-selectable item of the one or more user-selectable items; and training the bot system based upon the user input.

19. A system comprising:

one or more processors; and a memory coupled to the one or more processors, the memory storing instructions, which, when executed by the one or more processors, cause the system to:

collect, by an event collector of the system, one or more attributes for one or more events associated with a set of conversations with a bot system;

select, by an analytic engine of the system using one or more filtering criteria selected by a user, one or more conversations from the set of conversations based upon the one or more attributes for the one or more events;

generate, by the analytic engine, one or more reports for the selected one or more conversations;

display, graphically on a GUI, a first report from the one or more reports and one or more user-selectable items associated with the first report, wherein the one or more user-selectable items include at least one element of the first report, and wherein at least one of the one or more user-selectable items corresponds to a filtering criterion of the one or more filtering criteria;

receive, through the GUI, a user selection of the one or more user-selectable items; and display, graphically on the GUI based upon the user selection, a second report from the one or more reports, wherein the one or more reports include an aggregated path diagram for the selected one or more conversations, the aggregated path diagram including:

a plurality of nodes that includes a start node and an end node, each of the plurality of nodes corresponding to a respective state of the bot system; and a plurality of connections among the plurality of nodes, each of the plurality of connections representing a transition from one state of the bot system to another state of the bot system.

* * * * *